FIG. 12A

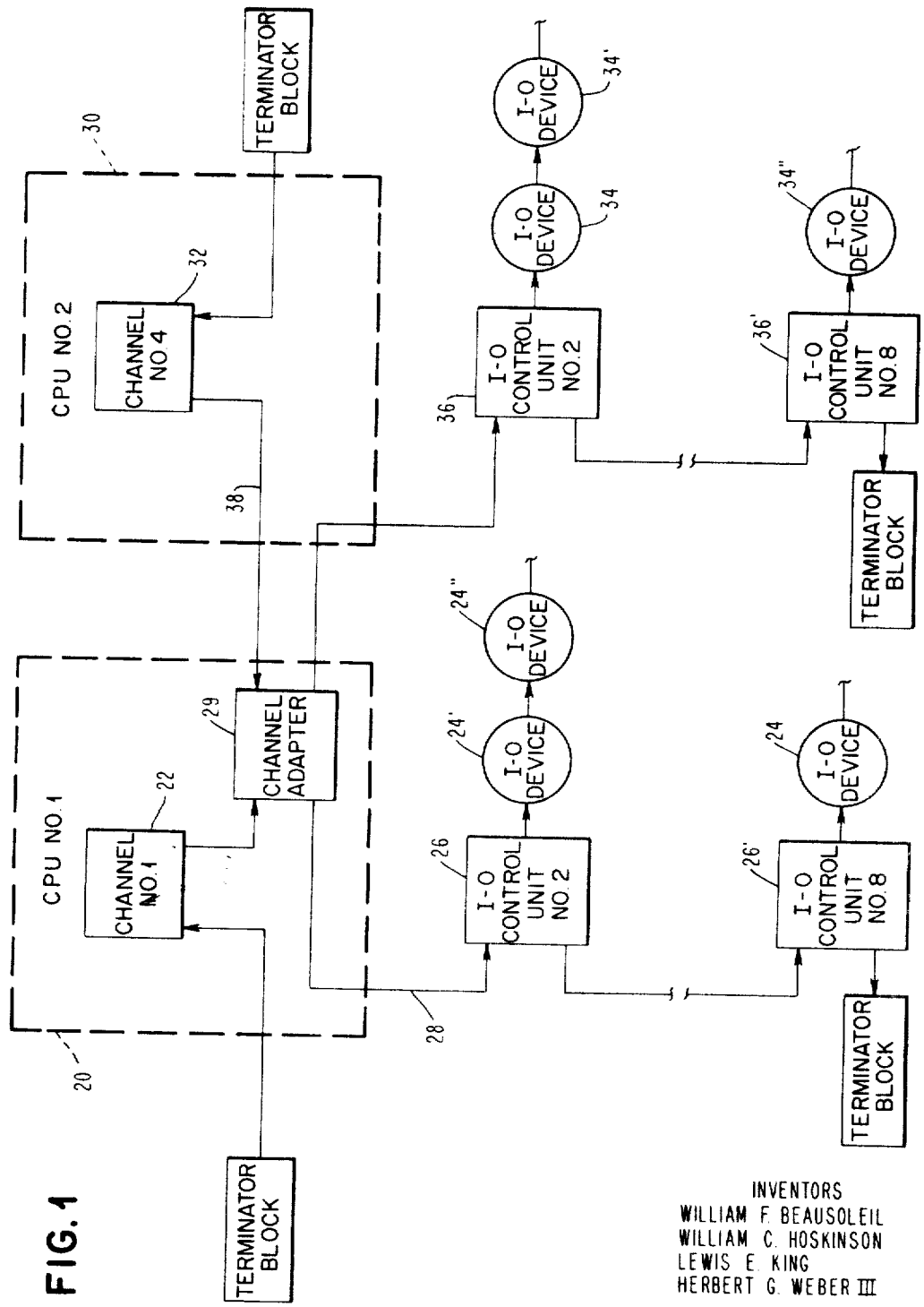

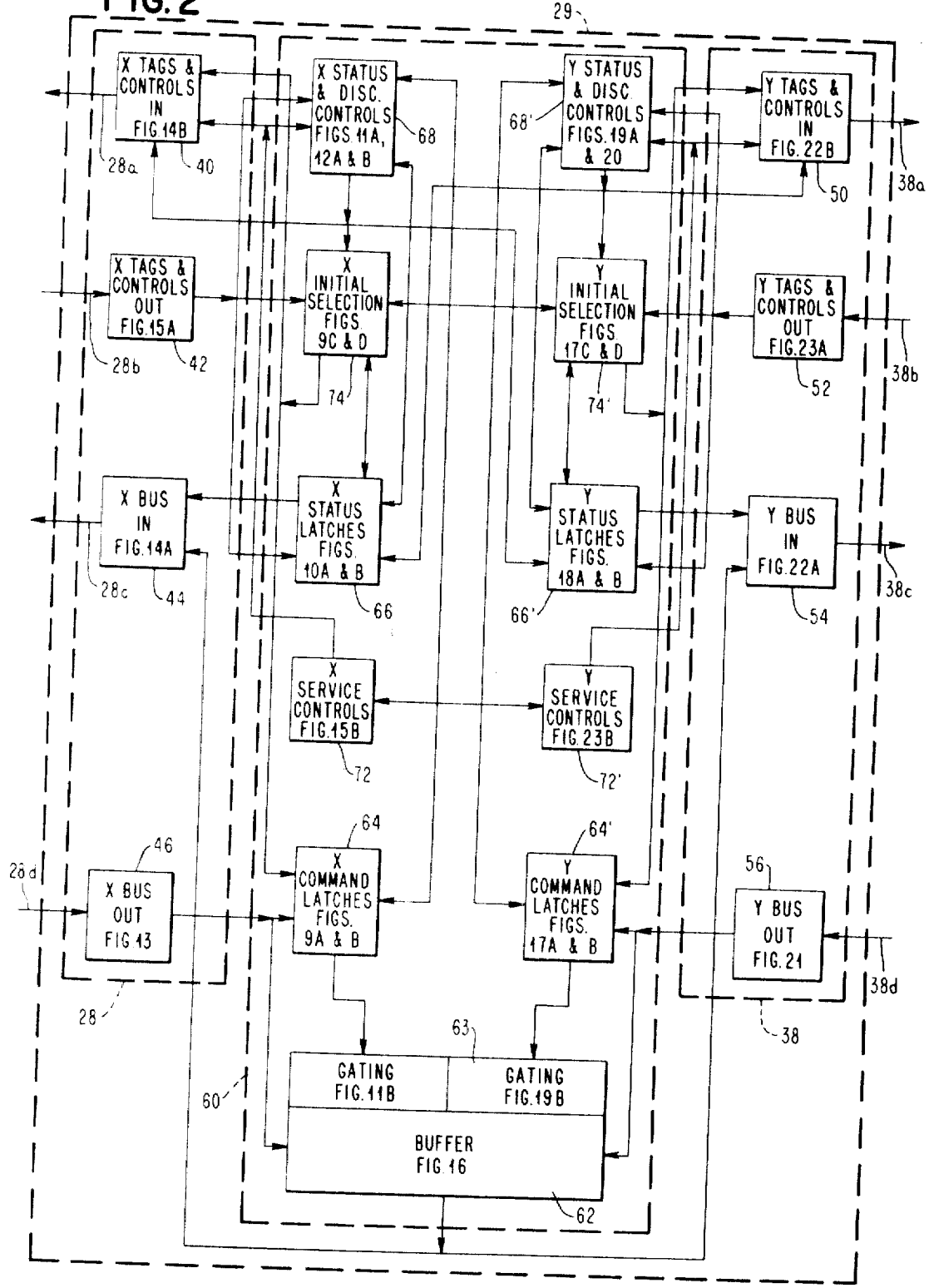

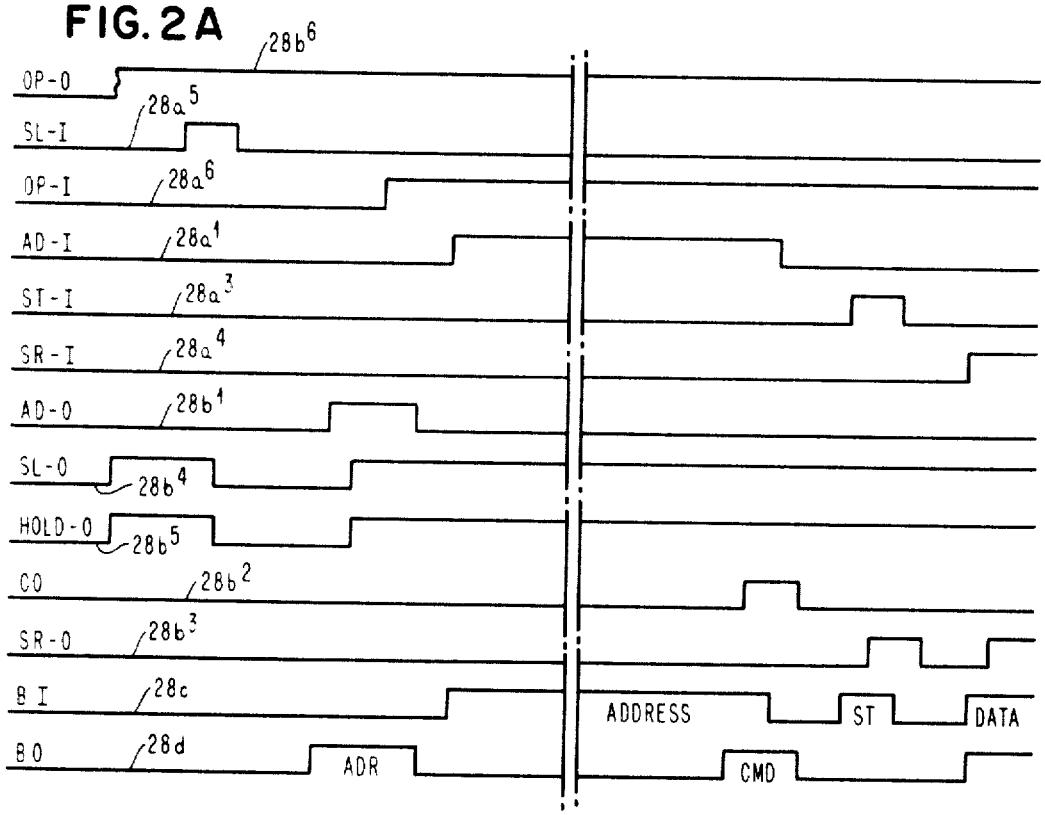
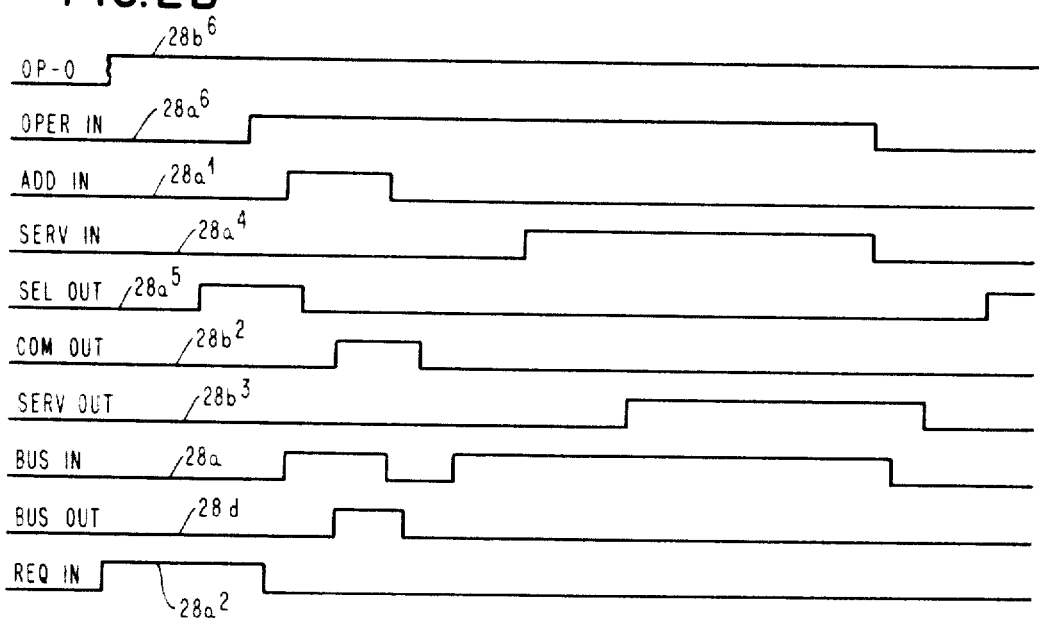

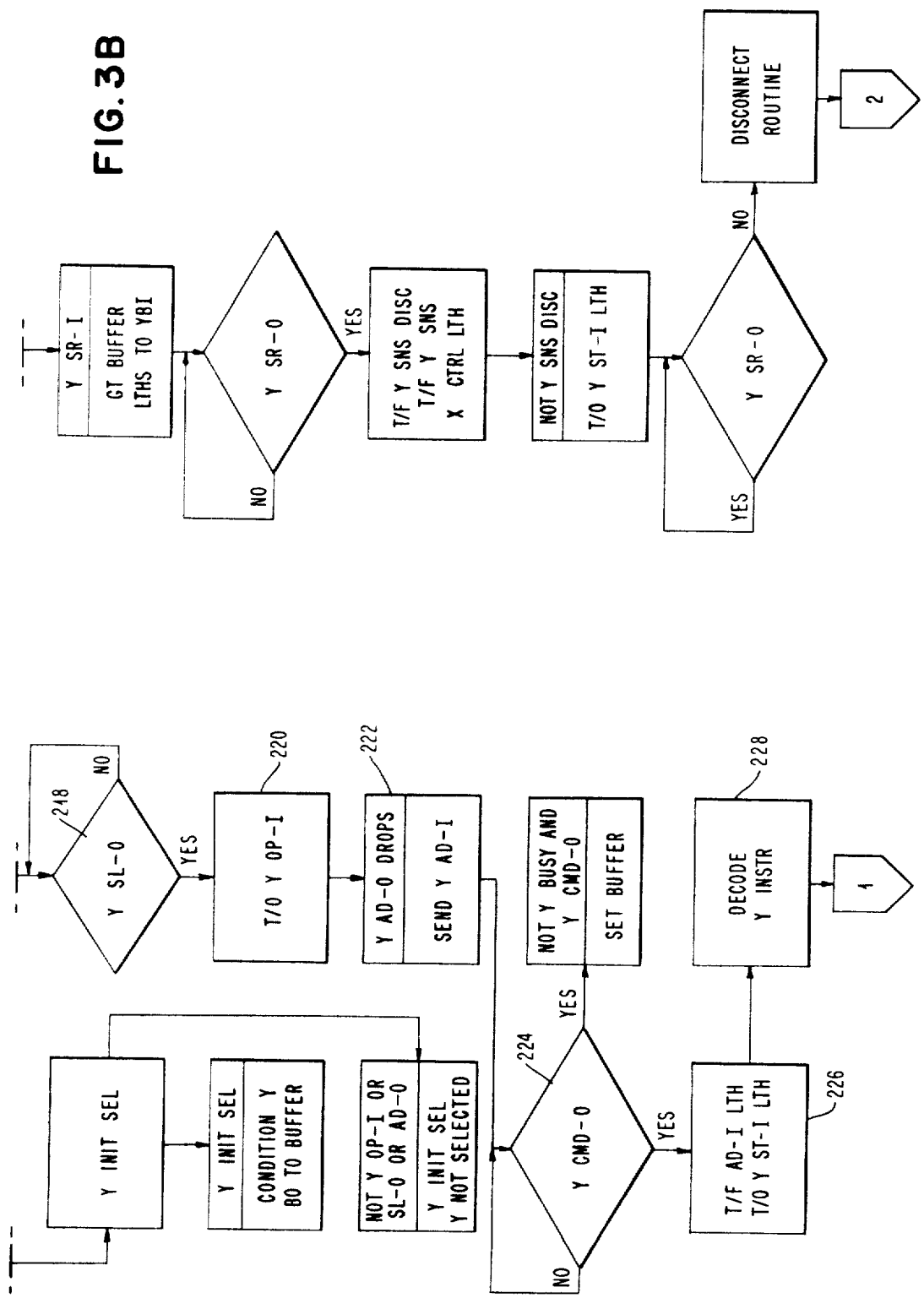

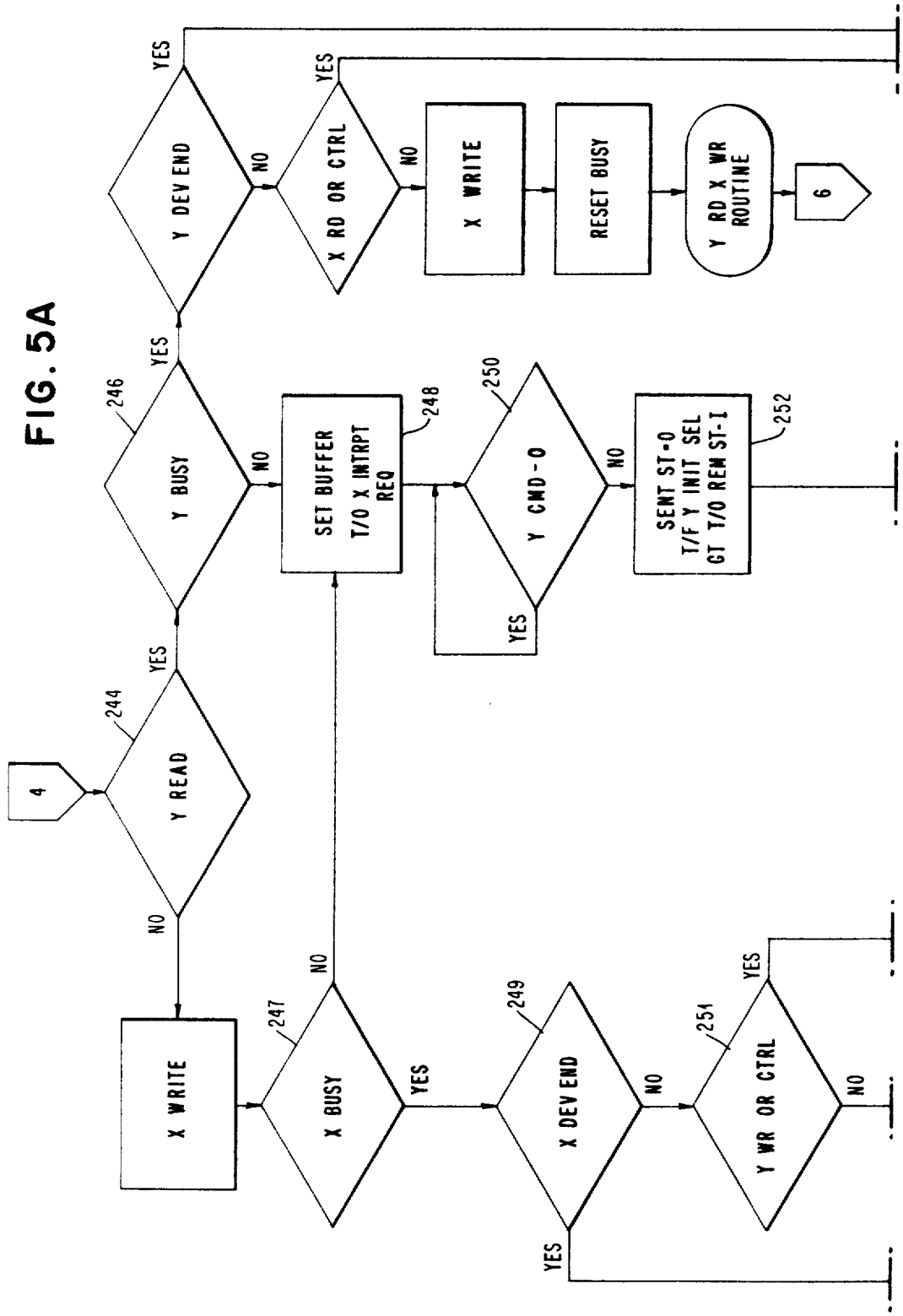

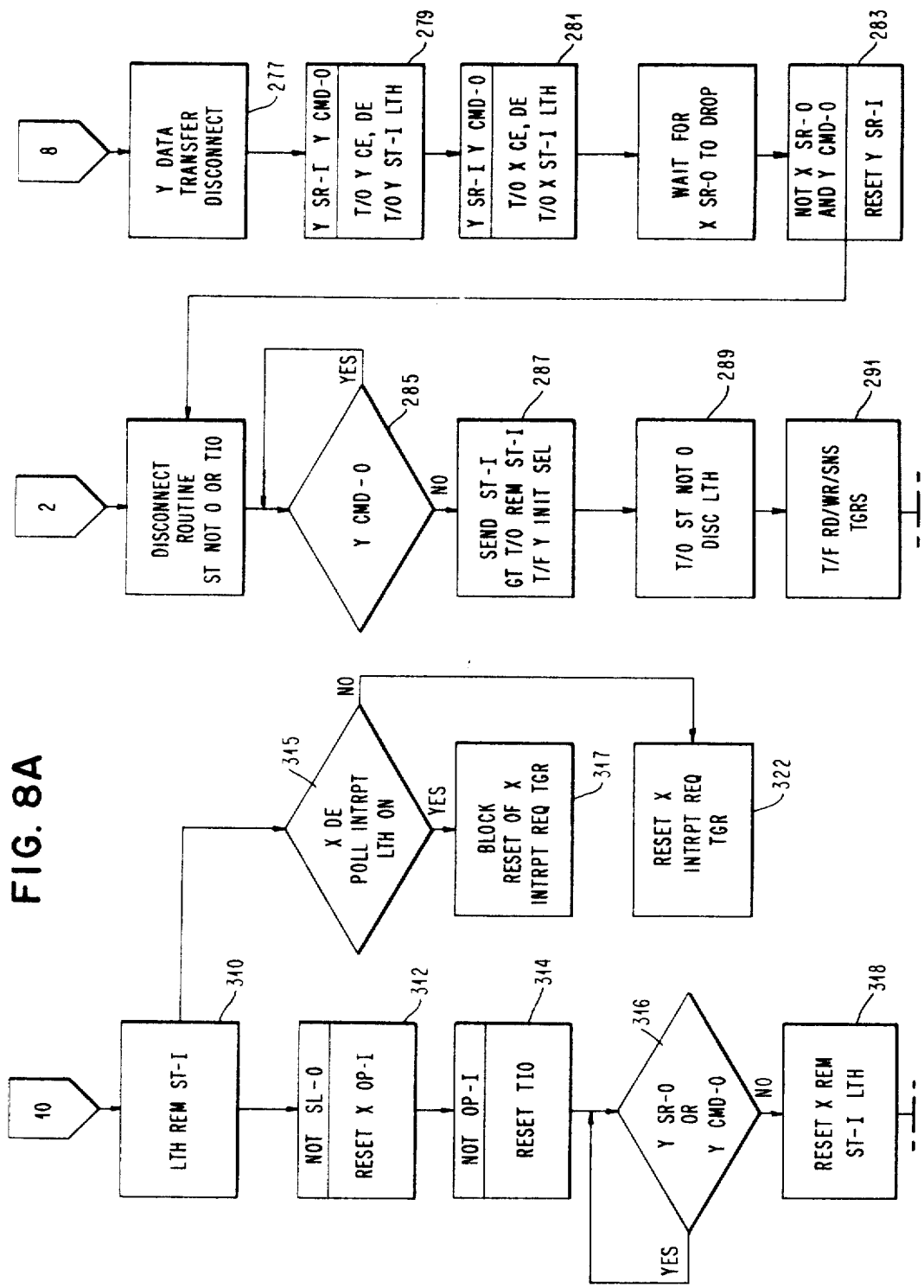

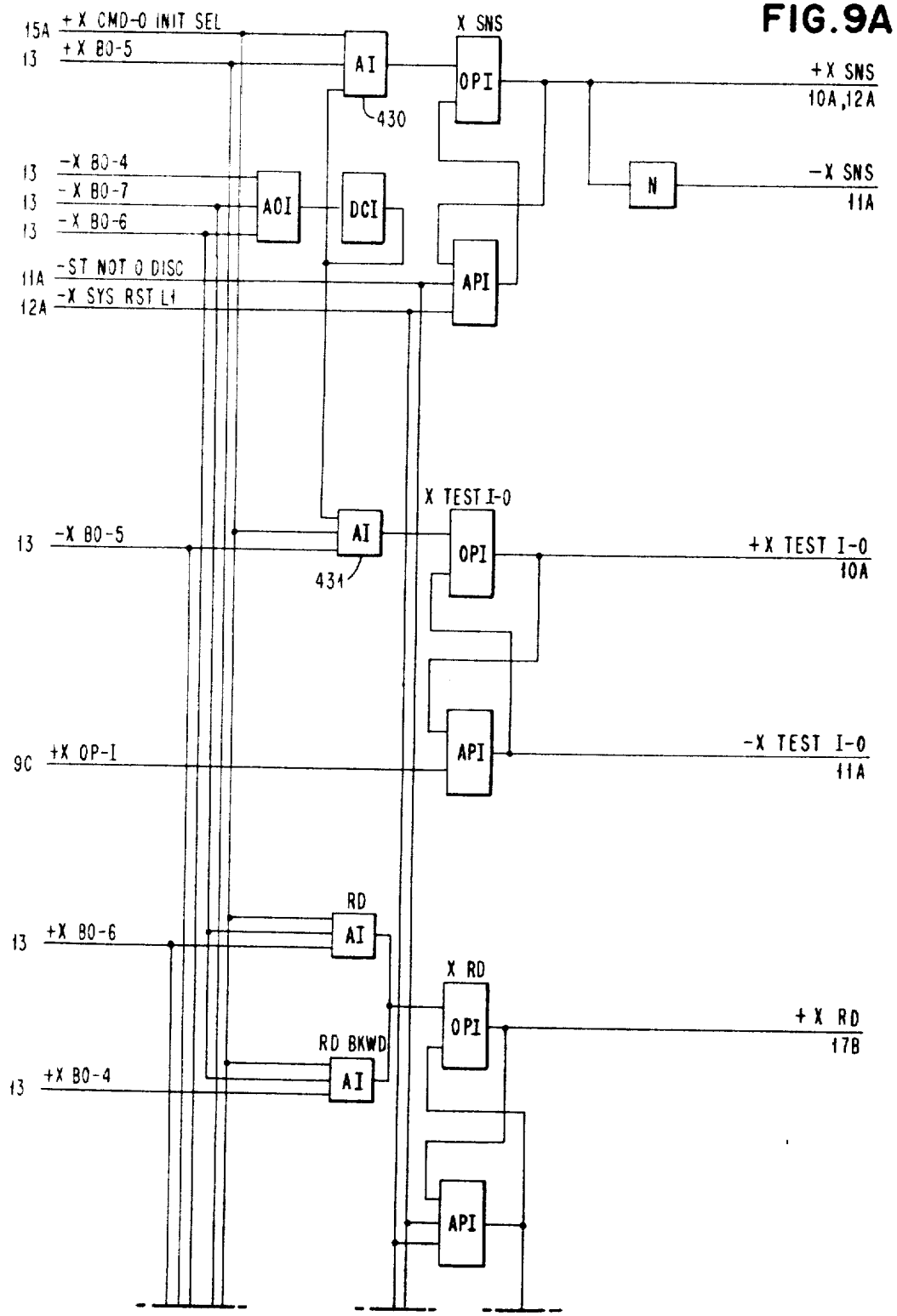

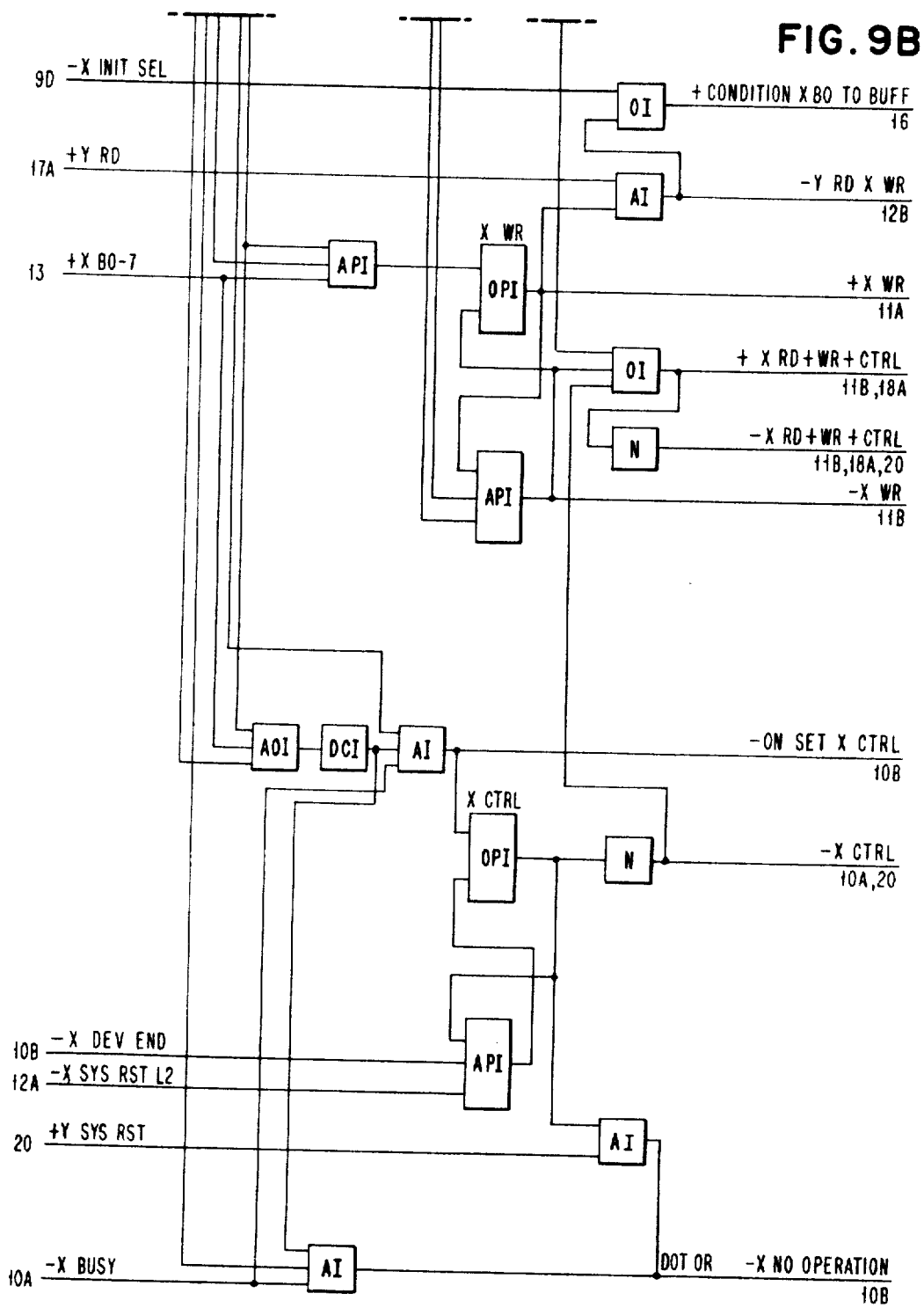

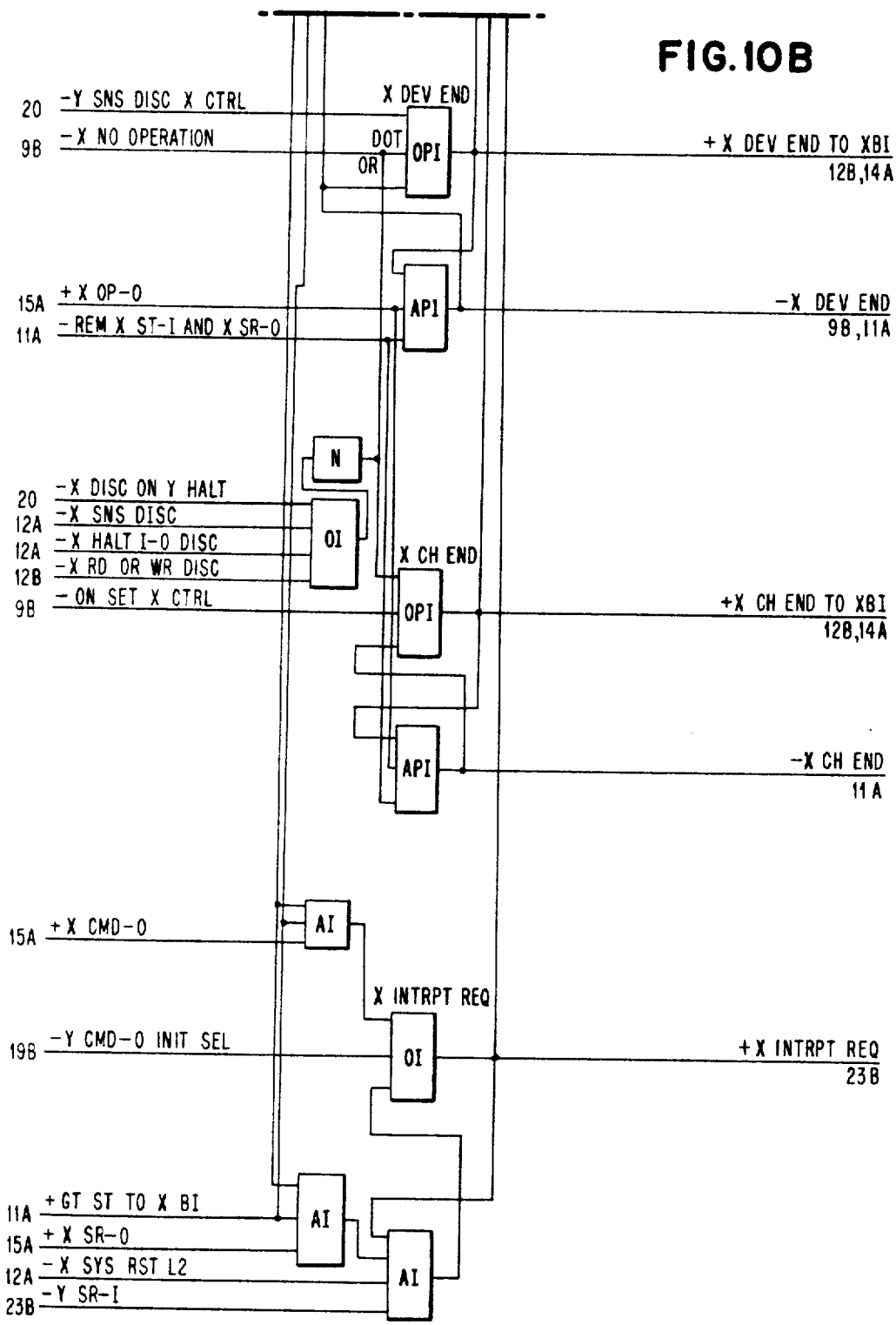

Sept. 3, 1968     W. F. BEAUSOLEIL ET AL     3,400,372
TERMINAL FOR A MULTI-DATA PROCESSING SYSTEM
Filed Feb. 16, 1965     45 Sheets-Sheet 27

FIG.14A

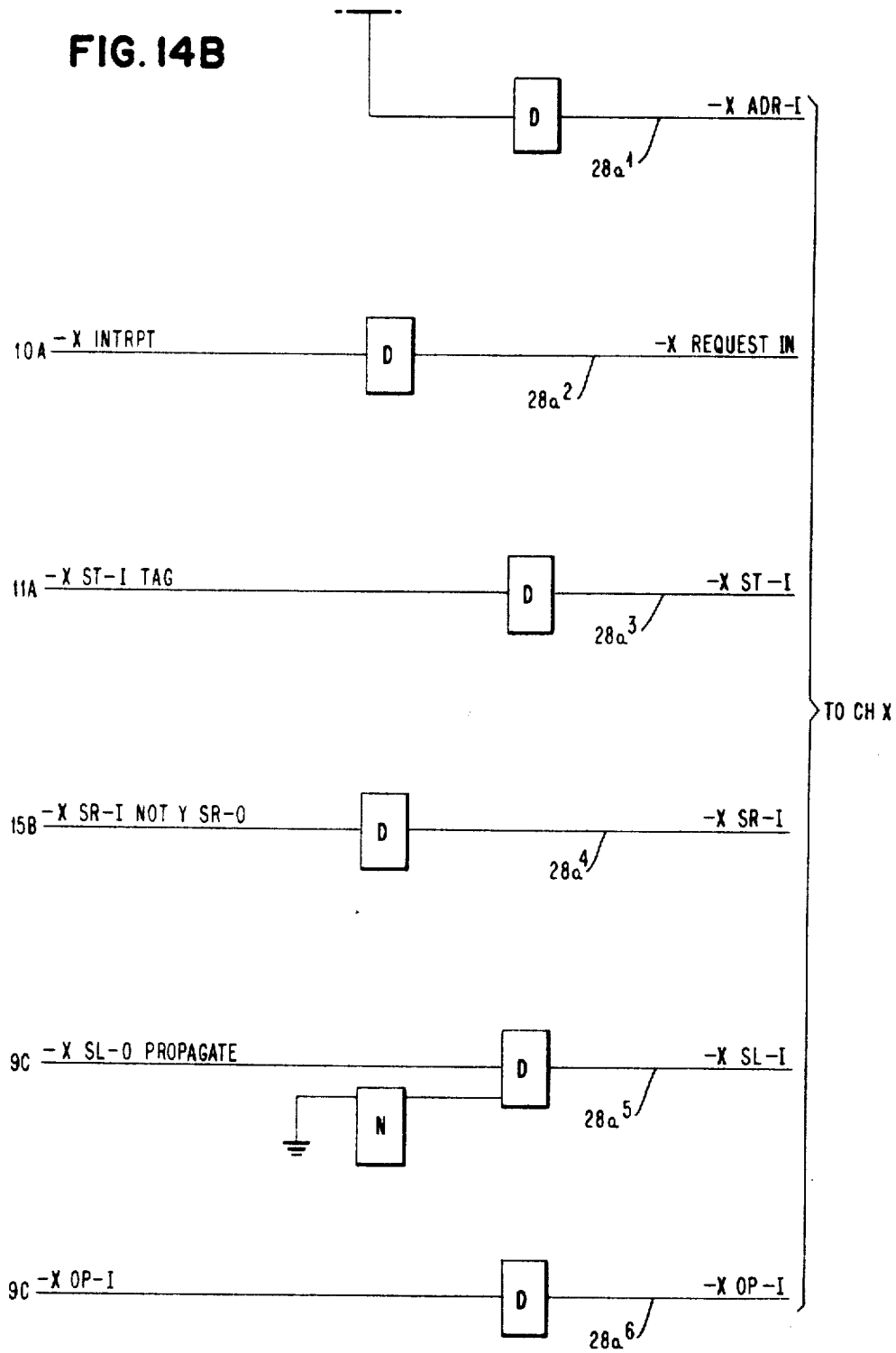

Sept. 3, 1968  W. F. BEAUSOLEIL ET AL  3,400,372
TERMINAL FOR A MULTI-DATA PROCESSING SYSTEM
Filed Feb. 16, 1965  45 Sheets-Sheet 29

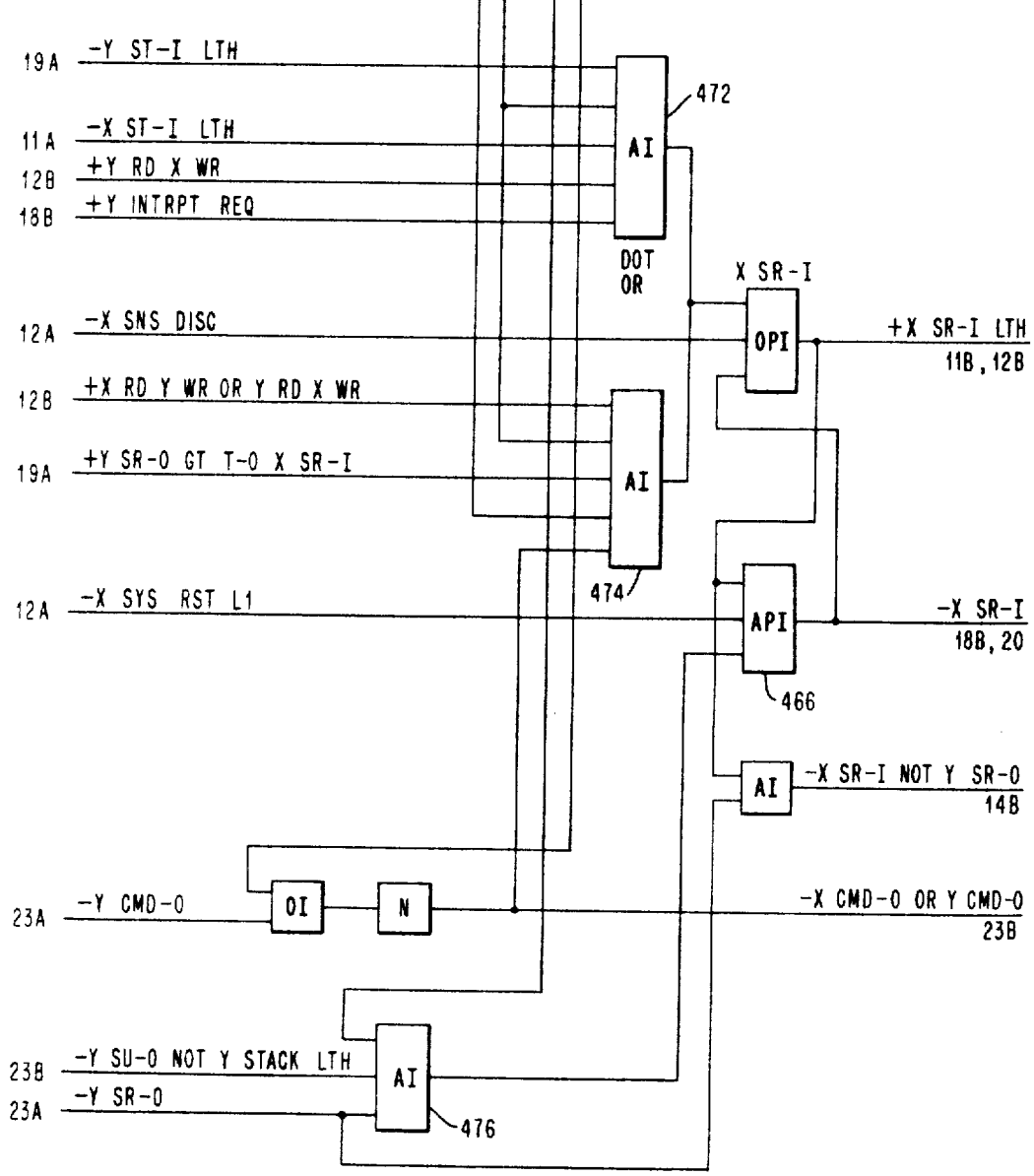

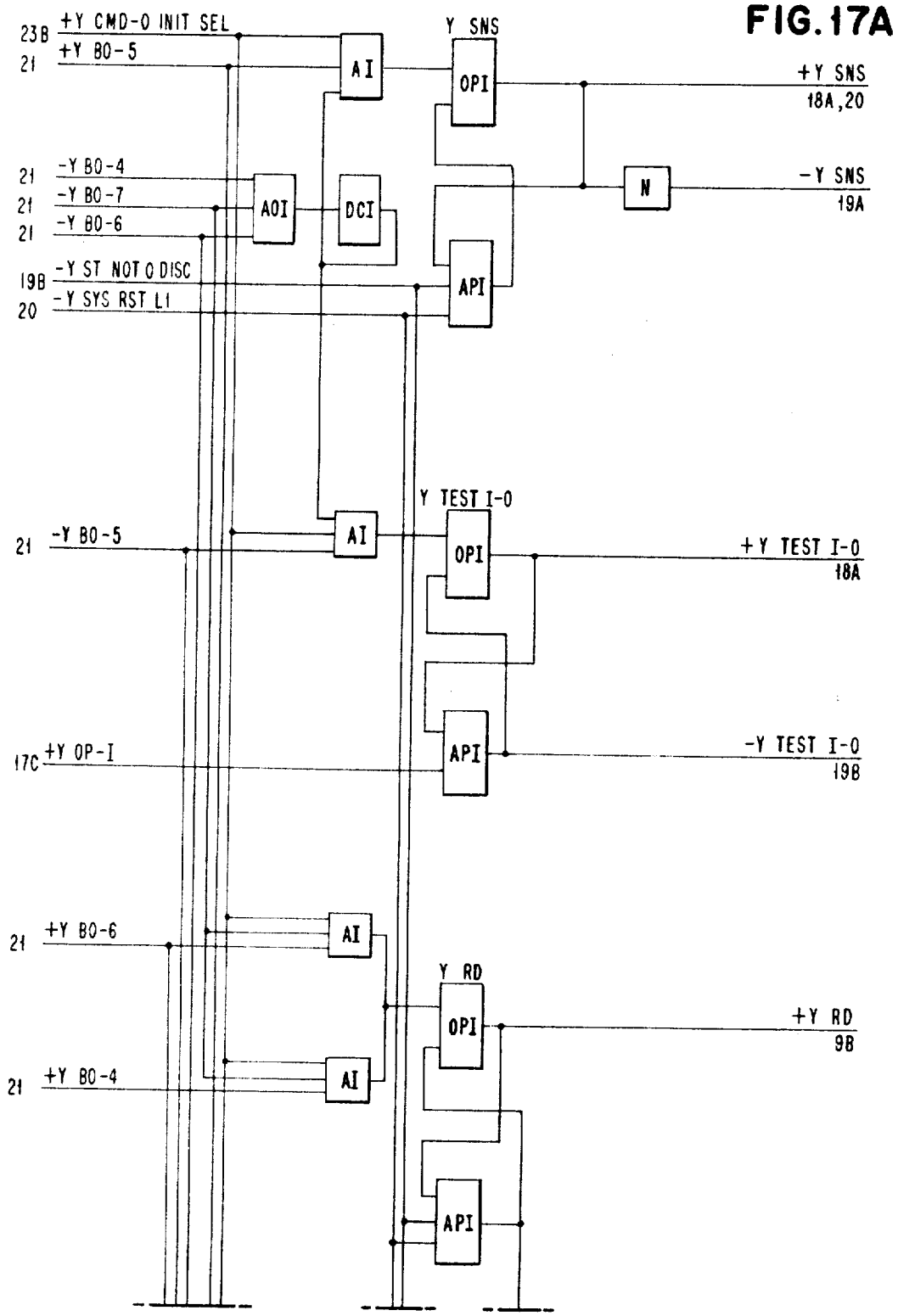

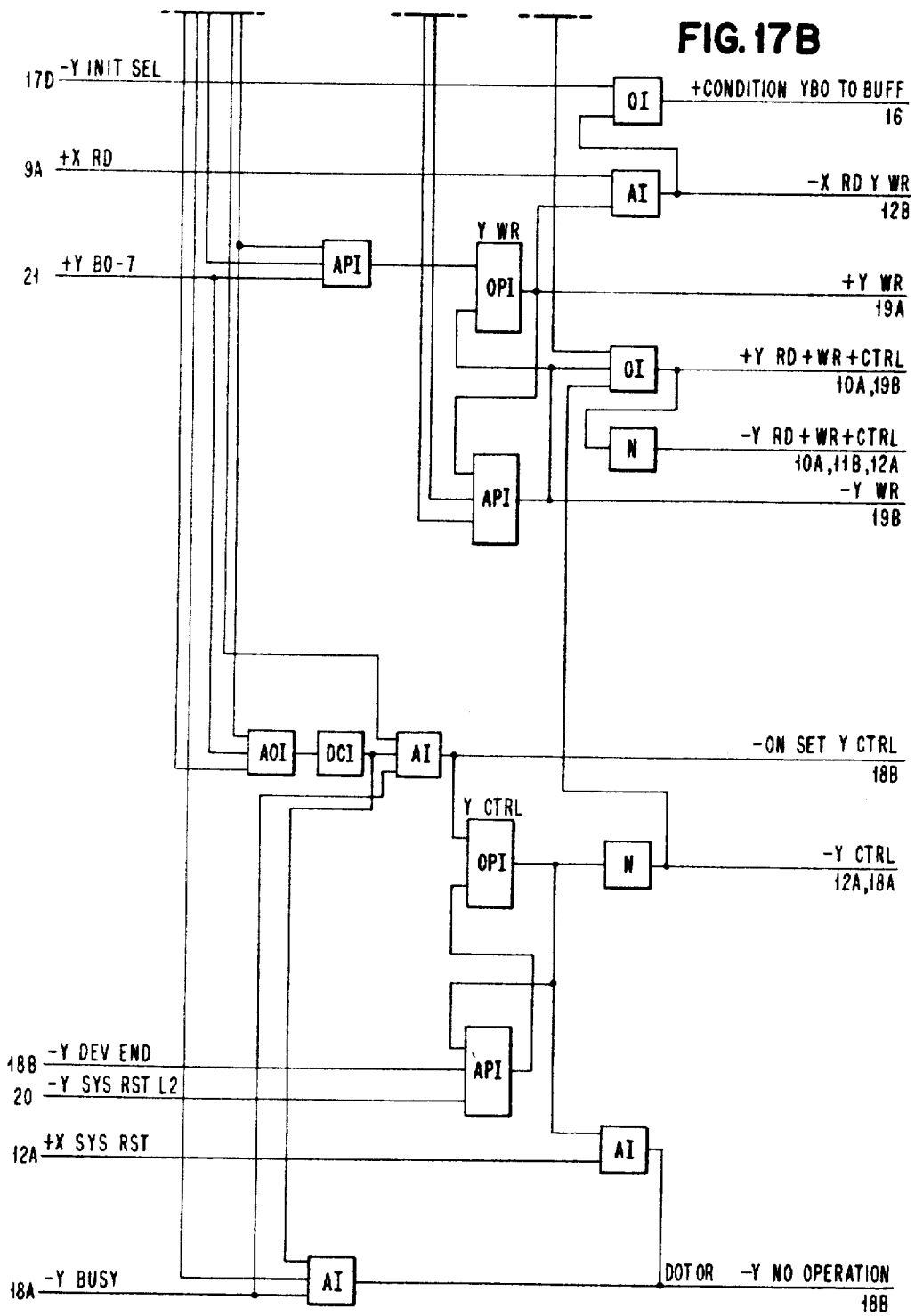

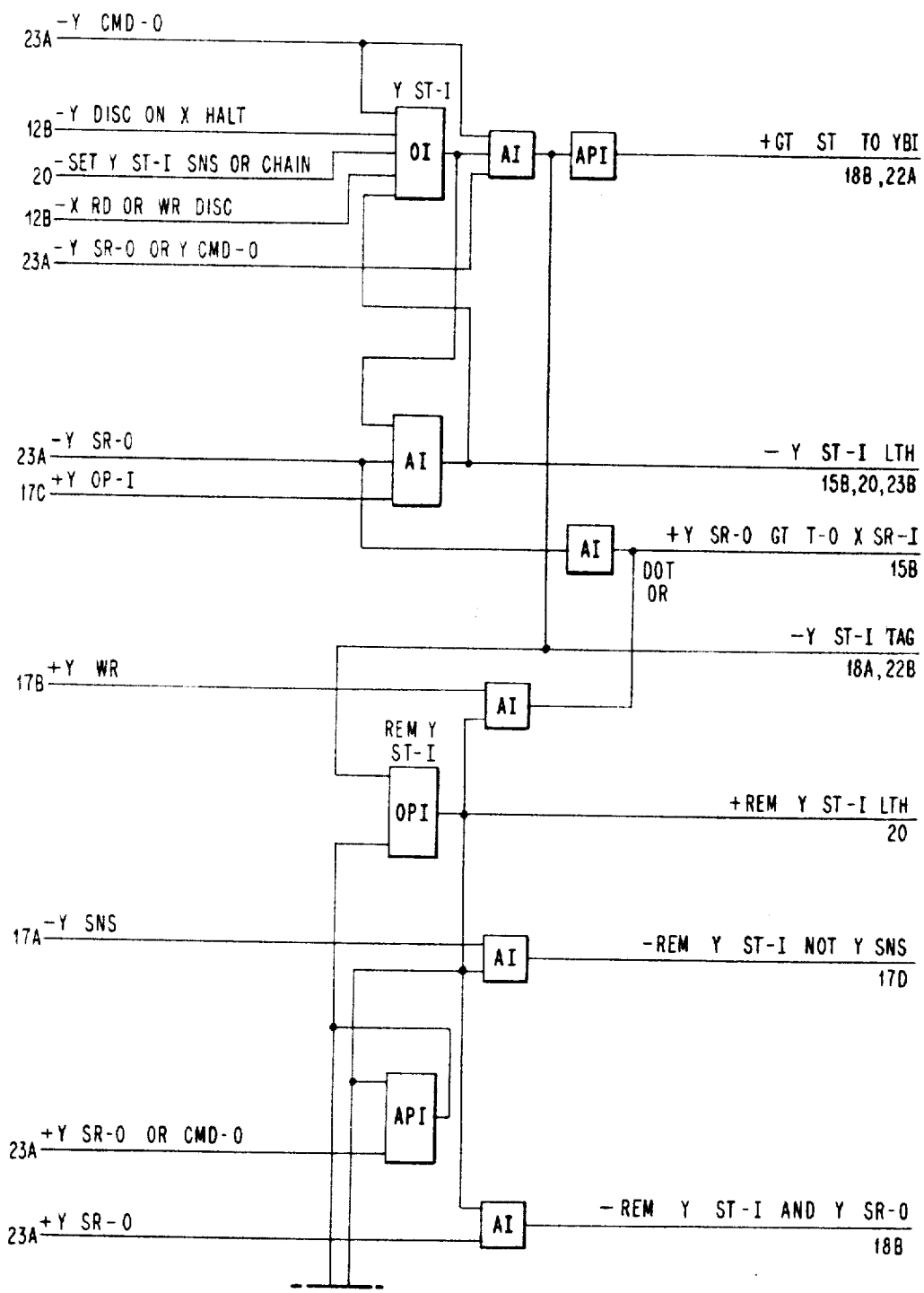

ated Sept. 3, 1968

United States Patent Office 3,400,372
Patented Sept. 3, 1968

3,400,372
TERMINAL FOR A MULTI-DATA PROCESSING SYSTEM
William F. Beausoleil and William C. Hoskinson, Poughkeepsie, Lewis E. King, Highland, and Herbert G. Weber III, Poughkeepsie, N.Y., assignors to International Business Machines Corporation, Armonk, N.Y., a corporation of New York
Filed Feb. 16, 1965, Ser. No. 432,970
10 Claims. (Cl. 340—172.5)

ABSTRACT OF THE DISCLOSURE

A channel adapter which electronically connects the data channel of one central processing unit (CPU) to the data channel of a second data processing unit. The data channel of the first CPU includes data transfer buses for both data in and data out, tag lines identifying signals on the buses and control lines for selecting and interlocking the first computer with the channel adapter. The second computer also has data transfer buses for data in and data out, tag lines identifying signals on the buses and control lines for selecting and interlocking the second computer with the channel adapter. The channel adapter looks like an input/output device attached to the channel and is assigned an address which can be transmitted from either CPU to select the adapter from among other input/output units that are connected to each channel. Information to be transferred from one channel to the other channel is held by a single register or buffer in the adapter which is connected to the appropriate channel interface as directed by a gating section. In order to transfer data from one computer to the other the first computer initiates a write command and the second computer initiates a read command. Thus the first computer transfers data across the interface as if it were performing a write operation and places the data in the buffer. The other computer then operates as if it were performing a read command and in response to control signals generated by the write operation takes the data from the buffer and transfers it to its own memory.

---

This invention relates to multi-data processing systems. More particularly, the invention relates to terminals or control units which provide processor-to-processor interconnection in multi-data processing systems, hereinafter referred to as multiprocessing systems.

The incorporation of two or more functionally identical, self-sufficient, general purpose, data processing systems into a single computer or multiprocessing system is becoming increasingly important as higher processing speeds and higher degrees of reliability are demanded. An important element in a multiprocessing system is a terminal or control unit which permits direct data transfer between the two or more computers. Such units permit each computer to operate independently, and without any fixed hierarchical relation therebetween. For example, in an airline reservation system, one computer can process reservation data while the other computer is on a standby status or performing conventional data processing. A control unit, connected therebetween, provides the timing and controls necessary to synchronize flow of data between the two computers. To start a data transfer operation, one computer executes a WRITE instruction after selecting the interconnecting terminal or control unit. This causes an interrupt call to be sent to the other computer to signal that a data transfer operation has been started. The other computer is programmed to accept the interrupt call. The other computer selects the same interconnecting terminal or control unit and executes a READ instruction. One computer is now writing while the other computer is reading. Data are being transferred from the memory of the writing computer to the memory of the reading computer through the interconnecting unit. A group mark or the end of the memory, sensed in the writing computer, terminates the data transfer operation. At the end of the operation, an interrupt call is turned on in both computers to signal the end of the operation. Both computers may return to regular processing operation or the processing of airline reservations may be transferred between the computers. Thus, a master-master relation exists between the computers. Terminals of this type are included in the IBM 9080 teleprocessing system. The terminal is described in detail in IBM Customer Engineering Instruction Manual, Form 223–26–26, published February 1963.

The present invention is an improvement over the previously described terminal. The prior art terminal requires a plurality of intercommunication buffers for transferring data. One buffer accepts the incoming data while the other buffer releases the previously accepted data. Accordingly, timing and control signals are necessary to effect transfer between the buffers. Additionally, error checking means are required to insure the veracity of the data. The logic of the terminal is limited in scope with the result that only a few operations may be performed, for example, WRITE, READ and SENSE. The terminal cannot perform in a multiplex system, i.e., a computer servicing a plurality of terminals. It is desirable, therefore, to improve the versatility, simplicity, and throughput of terminal units in multiprocessing systems in order that such systems may be more useful to the business, scientific and governmental communities.

A general object of the invention is to provide a terminal unit for a multiprocessing system, the unit being adapted to perform a wide variety of data transfer operations and be substantially independent of the data transfer rates of the various computers included in the system.

One object is to provide a terminal unit that does not require internally generated control signals for transferring data between two computer systems.

Another object is to provide a terminal unit that appears as a conventional multiplex terminal to a computer included in a multiprocessing system.

Another object is to provide a multiplex terminal unit for a multiprocessing system which permits the computers in the system to operate independently and without any fixed hierarchical relation therebetween.

Another object is to provide a terminal unit for a multiprocessing system that transfers data asynchronously between the computers included therein.

Still another object is to provide a multiplex terminal unit for a multiprocessing system which employs signals of one computer to initiate responding signals in the other computer included in the system for the transfer of data therebetween.

These and other objects are accomplished in accordance with the present invention, one illustrative embodiment of which include first and second communication systems for transmitting and receiving information between first and second computers via a terminal unit (processor-to-processor adapter). The first communication system (or interface) includes data transfer buses (in-out), tag lines identifying signals on the buses and control lines for selecting and interlocking the first computer and the adapter terminal unit. The second interface is identical to the first and transmits and receives information between the second computer and the adapter terminal unit. The adapter unit is connected as one of several multiplex terminals on each interface. The adapter terminal unit is assigned an address which can be transmitted from either computer system to select the adapter terminal unit among the other terminal units that are connected to each interface. Included in the adapter terminal unit are control, initial selection, bus in, bus out, status and disconnect sections for each interface to effect the transfer of information between the computers. The transferring information is held by a single register or intercommunication buffer which is connectable to either interface under control of a gating section. Each computer supplies the control signals at its interface, which operate the terminal units attached thereto. The control signals generated by one computer system are interlocked with the controls of the other computer and therefore initiate responding signals from the other computer system. Thus, the adapter terminal unit does not require internally generated control signals. Each computer also includes error checking means with the result that such apparatus is not required in the adapter terminal unit. The control section of the adapter terminal unit is adapted to operate the interface system in a burst mode wherein the unit, after selection, remains connected to the computers for the duration of the information transfer.

To initiate a data transfer, for example, a WRITE-READ operation, the writing computer places the terminal unit address of the adapter terminal unit on the data transfer bus of the interface between itself are the adapter, and raises a tag signal. The address is decoded by the adapted after (1) priority selection has occurred among the various terminal units, and (2) an identification or tag signal has been suitably sensed. The adapter raises an interlock line which ties the adapter to the computer. The computer system responds by dropping the tag signal which is followed by the adapter supplying the assigned address and a tag signal to the computer. This returned address causes the computer to respond by placing the write command and an identifying tag on the interface. The terminal responds with status and tag signals which simultaneously initiate an attention or interrupt call to the receiving or reading computer. The reading computer, when ready, accepts the interrupt or attention signal, and issues a sense command to the adapter by way of the connected interface. The contents of the intercommunication buffer in the adapter are to be supplied to the reading computer by the adapter. The buffer contents are transmitted over the interface connected to the reading computer. A READ command is generated by the reading computer to receive the data to be transmitted by the writing computer. Simultaneously, the adapter transmits a status signal to the writing computer which prepares to transmit the data to the adapter. A comparison is made in the adapter to assure that both computers are not executing the same command. Thereafter, the adapter requests a byte of data from the writing computer. The writing computer provides a tag or identifying signal over the connected interface. The tag is employed to generate a like signal in the other interface which transfers the data from the intercommunication buffer to the reading computer. The adapter signals for a second byte of data which is transferred to the reading computer in like manner. This operation continues until the writing computer signals an end of data transfer by a stop signal. Upon receiving the STOP signal, the adapter generates a status signal indicating the conditions under which data transfer terminated to the reading computer. Thereafter, the interface is disconnected from both computers which proceed to poll their respective control units for independent operation.

A feature of the invention is an adapter, multiplexed to a pair of computers, which, when selected by one computer, is interlocked to the selecting computer or both computers depending upon the operation commanded by the selecting computer whereby data transfer between the computers or the selecting computer and the terminal is independent of the data transfer rates thereof.

One feature is an adapter which permits the writing computer to transmit records located in various storage locations, without disconnecting from the storage, this type of operation being identified as chaining which permits information to be scattered throughout the storage for more efficient use thereof.

Another feature is a multiplex adapted having a single buffer and suitable for effecting the transfer of data between a pair of computers which generate the signals to control the data transfer therebetween.

Another feature is a multiplex adapter and a plurality of interfaces for effecting the transfer of data between a plurality of computers connected to assigned interfaces.

Another feature is a multiplex adapter and associated interfaces which permit a plurality of computers connected to the interfaces to operate in any of seven different modes including READ, WRITE, SENSE, CONTROL, READ BACKWARD and NO operations.

Another feature is a multiplex adapter that compares command statements and responses from a plurality of computers connected thereto for proper matching before execution of the command statement and response.

Another feature is an adapter adapted to provide status information regarding the adapter condition before and at the termination of data transmission between two computers.

Another feature is an adapter connected between a pair of computers, the adapter recognizing no difference between READ and READ BACKWARD commands supplied by a computer.

Another feature is a multiplex adapter connected to a plurality of computers, the adapter providing a busy indication when responding to one command of a first computer which is not properly related to a command supplied by a second computer.

The foregoing and other objects, features and advantages of the invention will be apparent from the following more particular description of preferred embodiments of the invention, as illustrated in the accompanying drawings.

FIG. 1 is a block diagram indicating the adapter of the present invention in a multiprocessing system.

FIG. 2 is a block diagram of the various control and logic sections included in the adapter of FIG. 1.

FIGS. 2A and B are pulse diagrams indicating interface operation.

Figure 3A:
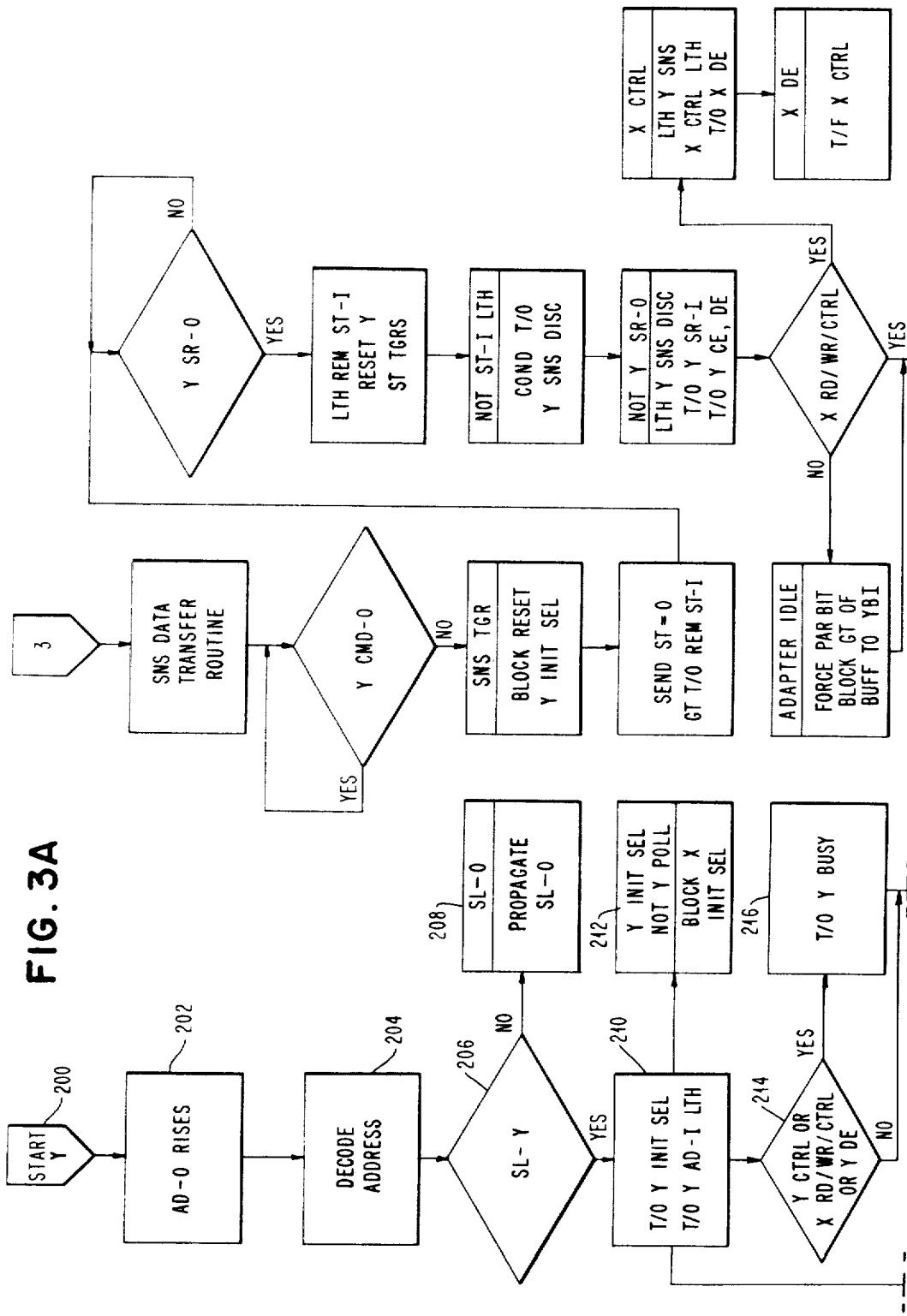

FIGS. 3A, B; 4A, B, C; 5A, B; 6A, B; 7A, B and 8A, B are flow diagrams indicating operation of the adapter for all types of operations.

FIGS. 9A, B, C, D; 10A, B; 11A, B; 12A, B; 13; 14A, B; 15A, B; 16; 17A, B, C, D; 18A, B; 19A, B; 20; 21; 22A, B and 23A, B are logic diagrams of the various circuits included in the adapter of FIG. 2.

(I) GENERAL

Referring to FIG. 1, a block diagram is provided of the present invention in a multiprocessing system. In one illustrative embodiment a central processing unit and storage device 20, as for example, that described in a previously filed application (IBM Docket No. 6580), Ser. No. 375,372, filed Apr. 6, 1964, assigned to the same assignee as that of the present invention, is suitably connected to a plurality of automatic channel apparatus 22, 22′ . . . 22n′, as for example, that described in a previously filed application (IBM Docket No. 7783), Ser. No. 357,369, filed Apr. 6, 1964, assigned to the same assignee as that of the present invention, for processing data originated by suitable input devices 24, 24′ . . . 24n′, as for example, tape drives, card readers and the like, which are controlled in groups by control units 26, 26′, as for example, that described in a previously filed application (IBM Docket No. 7780), Ser. No. 357,370, filed Apr. 6, 1964, assigned to the same assignee as that of the present invention. The control units are connected to the channel apparatus through a communication system or interface 28, as for example that described in a previously filed application, Ser. No. 357,370 (IBM Docket No. 7780), filed Apr. 6, 1964, assigned the same assignee as that of the present invention. A terminal unit or channel-to-channel adapter 29 is also connected to the interface 28 and appears as a control unit to the computer 20 and channel 22. The adapter 29 is also connected to a second computer 30 and channel 32 by way of a second communication network or interface 38. The adapter 29, as will appear hereinafter, permits, inter alia, the computers 20 and 30 to communicate with one another without any fixed hierarchical relation therebetween.

It should be noted that although FIG. 1 includes channels 22, 32 and the like, the present invention may operate directly with the computer. The channels have been included solely for reasons of convenience in explanation.

A general description has already been provided in the introduction regarding the operation of FIG. 1 and will not be repeated for reasons of brevity. Instead, it is believed in order to describe the details of the adapter 29.

A typical adapter 29, referring to FIG. 2, is connected between interfaces 28 and 38. The interfaces 28 and 38 are identical. Each interface comprises inbound tag lines 28A and 38A; outbound tag lines 28B and 38B; a bus in 28C and 38C and a bus out 28D and 38D. Briefly, the bus in and bus out have data, control or status information which is communicated between the computers or a computer and an I-O device. The inbound tag lines indicate the type of information on the bus in. The outbound tag lines indicate the type of information on the bus out. A more detailed explanation of the interface is now believed in order before proceeding further.

(II) INTERFACE

The interface provides a uniform connection for attaching any control unit to the channel. The interface comprises a set of lines which are time shared to transmit all information for the operation of I-O devices. The information transmitted includes device addresses, control signals, and data. The interface can accommodate up to eight control units and up to 256 directly addressable devices.

The multiplexing facilities of the interface permit the possibility of any number of the 256 devices to operate concurrently on a single interface, i.e., portions of various messages can be transmitted over the interface in an interleaved fashion to or from different I-O devices or the complete message can be transmitted in a single interface operation. The operation is determined by the particular channel and the I-O control unit.

The rise and fall of all signals transmitted over the interface are interlocked with corresponding responses. This removes the dependence of the interface on circuit speed, and makes it applicable to a wide variety of circuits and data rates. Furthermore, it permits the interconnection of a channel and control unit of different circuit speeds.

The signal lines for the interface, as shown in FIG. 2A, comprise the following:

| Title | No. of lines | Purpose |
| --- | --- | --- |
| Data bus out (28d) | *9 | These lines transmit address commands and data to the control units. The type of information transmitted is indicated by tag line. The period during which information is valid is also controlled by the tag lines. |
| Tag lines out (address 28b¹, command 28b² and service 28b³). | 3 | The tag lines are: address out 28b¹, command out 28b² and service out 28b³. Address out is used to initiate selection of an I-O device. The address appears on the bus out. Alternatively, address out is used to disconnect operations from the interface. The command out lines indicate to a selected I-O device that a command has been placed on the bus out. Service out indicates to a select I-O device that a channel has accepted the information on bus in, or has provided on bus out the data requested by service in. |
| Scan controls (select out 28b⁴, select in 28a⁵). | 2 | These controls comprise a select out 28b⁴ and select in line 28a⁵. The select out line together with the select in line provide the loop for scanning attached control units. A control unit can respond only at the rise of an incoming select out signal. Once a control unit has propagated a select out signal it cannot be activated until the next select out signal. |
| Interlocks (operational out 28b⁶, operational in 28a⁶). | 2 | All lines from the channel are significant only when operational out 28b⁶ is up. A suppress out line, described hereinafter, is an exception to this. Whenever operation out drops, all in lines on the control unit must drop and a particular operation must be reset. Operational in 28a⁶ is a line used to signal a channel that an I-O device has been selected. The rise of the operational in line indicates response to address on bus out, request for data on bus out, offer of data on bus in, or offer of status. |
| Bus in (28c) | 9 | These lines correspond to the function of bus out. |
| Tag lines in (address 28a¹, status 28a³ and service 28a⁴ request in 28a²). | 4 | These lines comprise address in 28a¹, status in 28a³, and service in 28a⁴. The address in and service in lines correspond to the address out and service out lines previously described. The status in line is used to signal a channel when the selected I-O device has placed status information on bus in. The request in line 28a² (see FIG. 2B) initiates a request for service by the adapter. |
| Special control (28b⁷). | 1 | One special control line is a suppress out line 28b⁷. This line is used alone and in conjunction with tag out lines to provide the following special functions: (1) suppress status—when suppress out is up, attention or status information that has been stacked in the control unit is suppressed. No further attempt is made to prevent this status information as long as suppress out is up; (2) suppress data transfer—the service in line cannot rise if suppress out is up; (3) chained command control—chaining is indicated if suppress out is up when service out responds to status in; and (4) selective reset—the device in operation will be reset when suppress out is up and operational out drops. |
| Hold out (28b⁵). | 1 | This line is optional depending upon the I-O device. When dropped, the I-O operation is terminated immediately. There is no need to wait for the select out pulse to pass through all prior control units. |

*8 data, 1 parity.

(III) ADAPTER

The adapter comprises two line sections and a shared buffer. The sections associated with computer 20 have been assigned unprimed reference characters. The sections associated with computer 30 have been assigned like reference characters that have been primed where they correspond to the equivalent section associated with computer 20. For reasons of brevity, a detailed description will only be provided for the adapter sections assigned unprimed reference characters. The corresponding sections, assigned primed reference characters, are substantially identical to the unprimed reference characters.

Figure 23A:
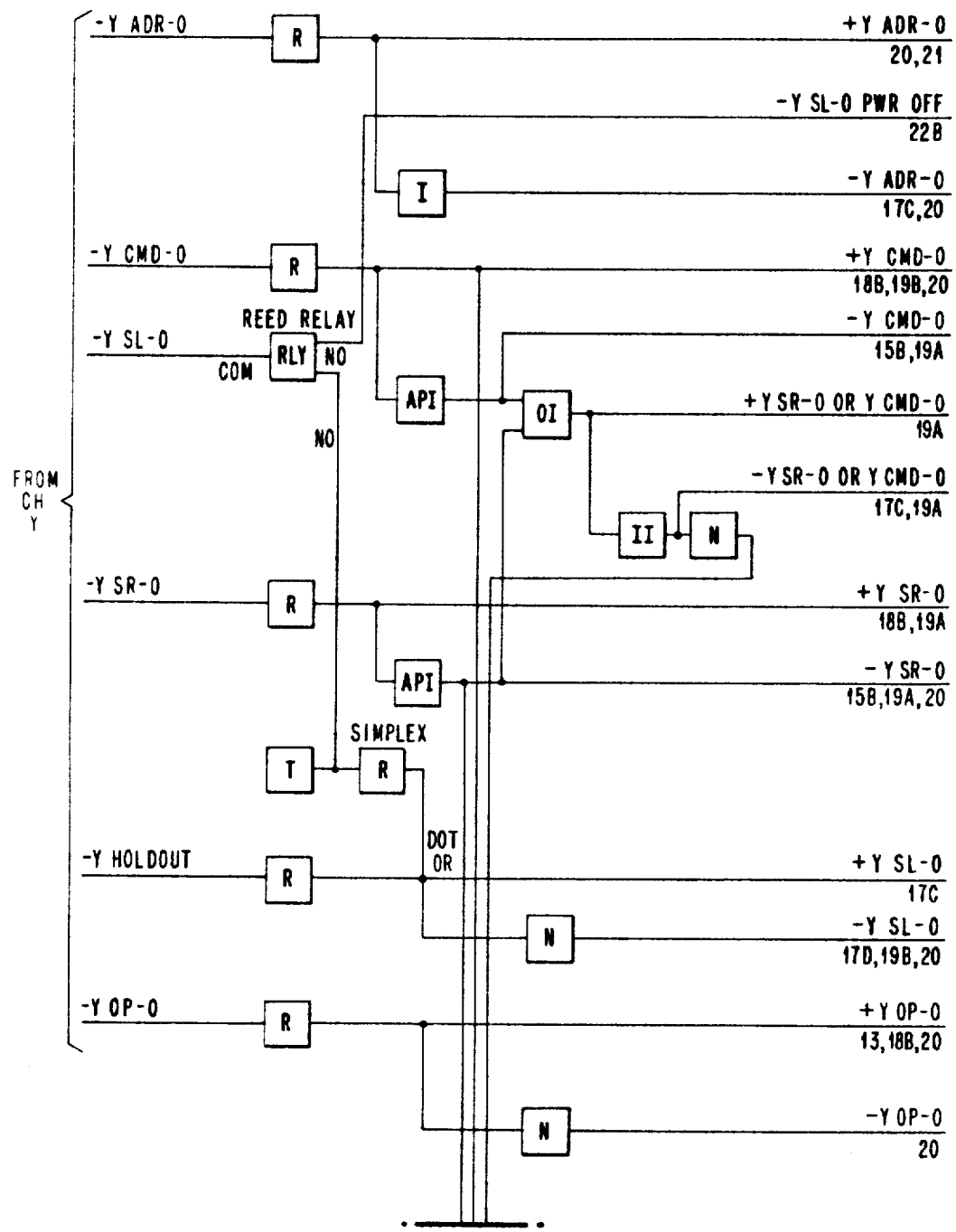

An explanation is believed in order regarding the circuit diagrams shown in FIGS. 9A and B through FIGS. 23A and B. The diagrams are computer printouts of the wiring for an adapter. The process for generating these circuits is described in an article entitled "Solid Logic Design Automation," by P. Case et al., which appeared in the IBM Journal of Research and Development, April 1964, pages 127 through 140. The logic blocks in each circuit are well known transistor-diode logic blocks described in any well known electrical text as for example, Handbook of Semiconductor Electronics, edited by L. P. Hunter, 1st edition, section 15–29. See also U.S. Patent No. 3,075,089. Basically, the essential blocks are AND (A), OR (O), AND-INVERT (AI), OR INVERT (OI), AND-OR-INVERT (AOI), INVERTER (N, DCI), AND POWER INVERTER (API), OR POWER INVERTER (OPI), RECEIVER (R), TERMINATOR (T) and DRIVER (D) blocks, the operation of these blocks may be readily ascertained from the Hunter or like text.

The inbound tag lines 28A of FIG. 14B are connected to a tag line control section 40 shown in FIG. 2. A description of the format for FIG. 14B and the like is believed in order before continuing further.

The lines on the left side of the FIG. 14B are the inputs to the section 40. The lines on the right side of the FIG. 14B are the outputs from the section 40. Each line is designated with a polarity (+ or —) and a computer system (X or Y where X represents computer system 20 of FIG. 1 and Y represents computer system 30 of FIG. 1) designation. Each line identifies, further, where it is going or where it is from. The input lines indicate where they are from. The output lines indicate where they are going. The figure number where these locations are is also indicated. Thus, the section 40 (see FIG. 2) receives inputs from an interrupt (INTRPT) source in FIG. 10A, a status-in (ST-I TAG) in FIG. 11A and so forth. The outputs from driver block (D) are inbound tag lines 28A which are address-in (ADR-I), status-I (ST-I), service-in (SR-I) and certain control lines including select-in (SL-I) and operational-in (OPI). Returning to FIG. 2, the output lines have been indicated thereon. Only important lines have been indicated for reasons of convenience.

Figure 15A:
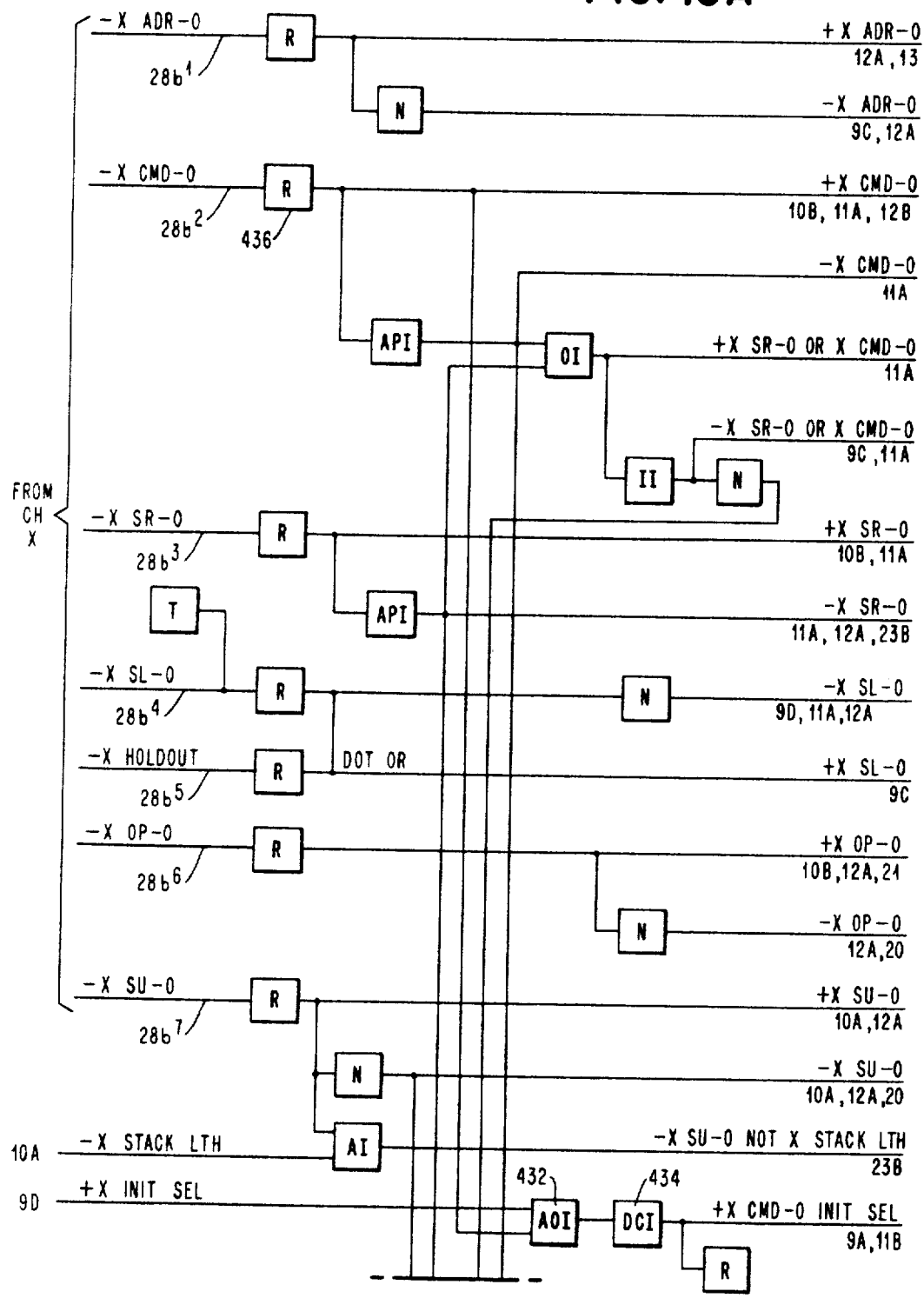

The tag lines out 28B, shown in FIG. 2 are connected to a tag line out control section 42. Turning to FIG. 15A, outbound tag and control lines $28b^1 \ldots 28b^6$ comprise address-out (ADR-O), command out (CMD-O), service out (SR-O), select out (SL-O), hold out (H-O), operational out (OP-O) and suppress out (SU-O). The outbound tag lines are connected to receiver (R) blocks which provide outputs to various parts of the adaptor, too numerous to describe. The major outputs are shown in FIG. 2.

Figure 14A:
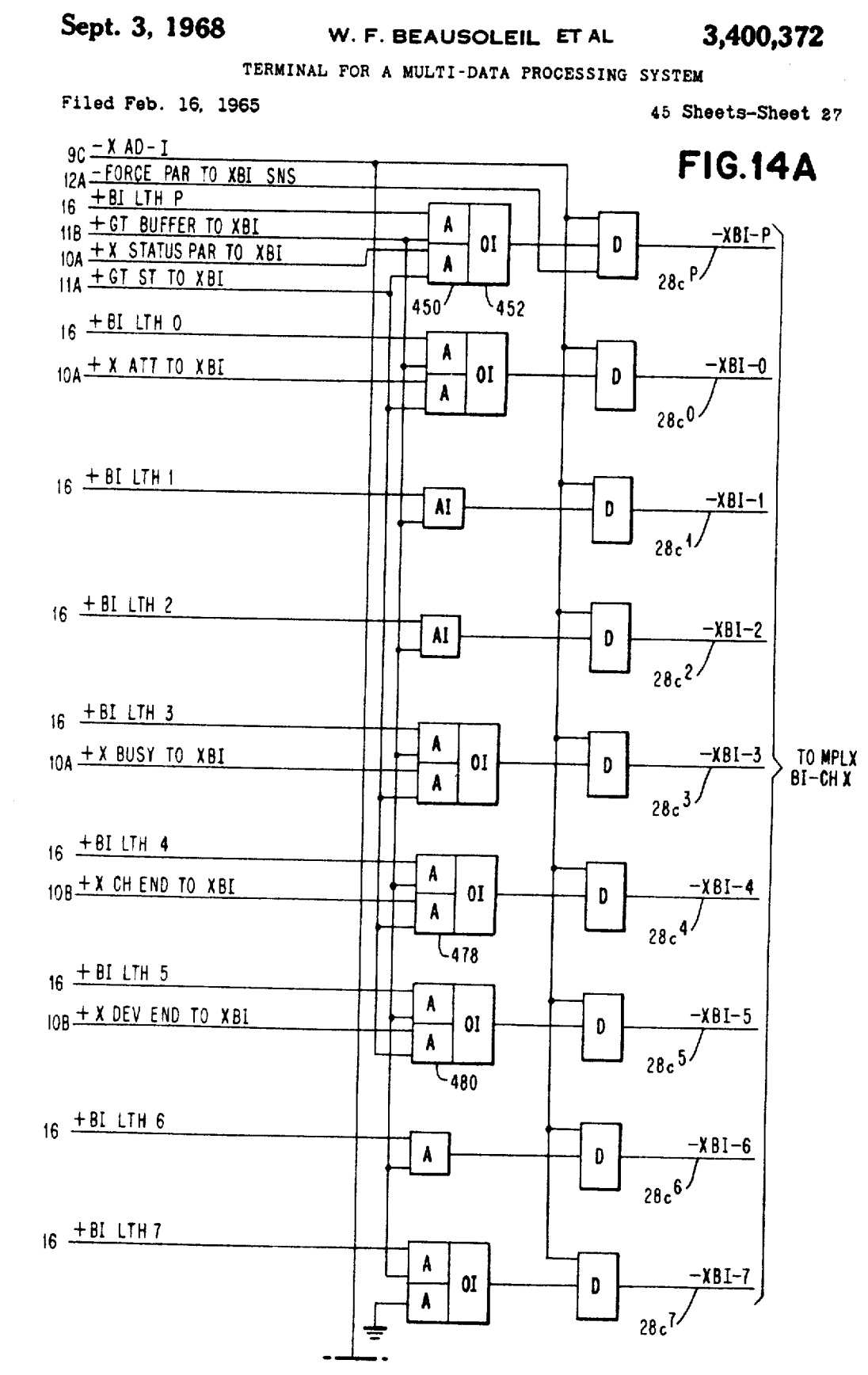

The bus in lines 28C, shown in FIG. 2, are connected to a bus-in gating section 44 shown in FIG. 14A. Turning to FIG. 14A, the bus-in lines $28c^0 \ldots 28c^7$ and $28c^P$ are connected as outputs from driver (D) blocks. The drive blocks are connected to gating circuits comprising AND (A), OR's and inverts where supplied from various adapter circuits, or for example bus-in, (BI) latches (LTH) and the like. These inputs are so numerous that it is believed a description is not necessary as this will be brought out in a description hereinafter of the adapter operation. The important inputs are shown in FIG. 2.

Figure 13:
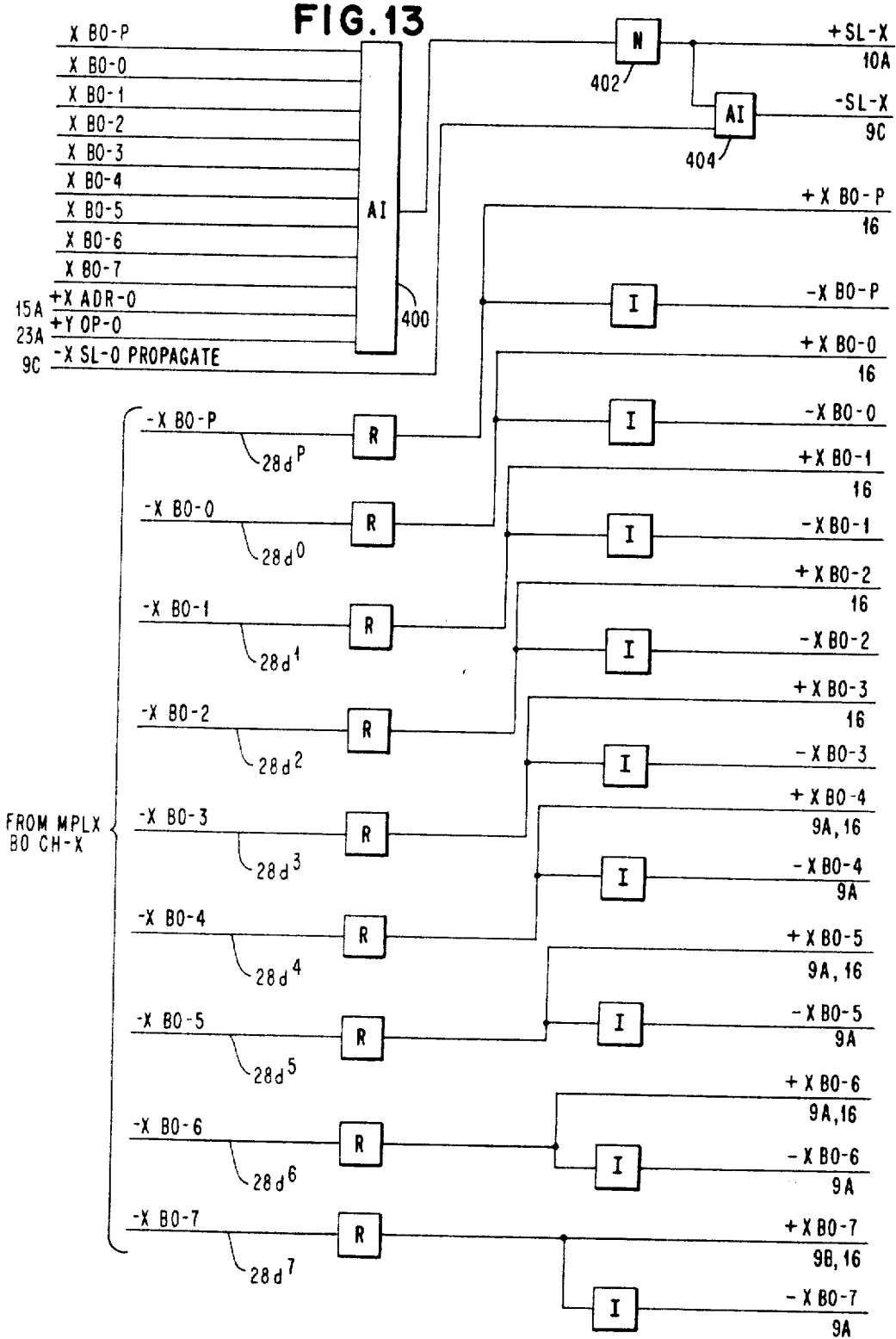
Figure 16:
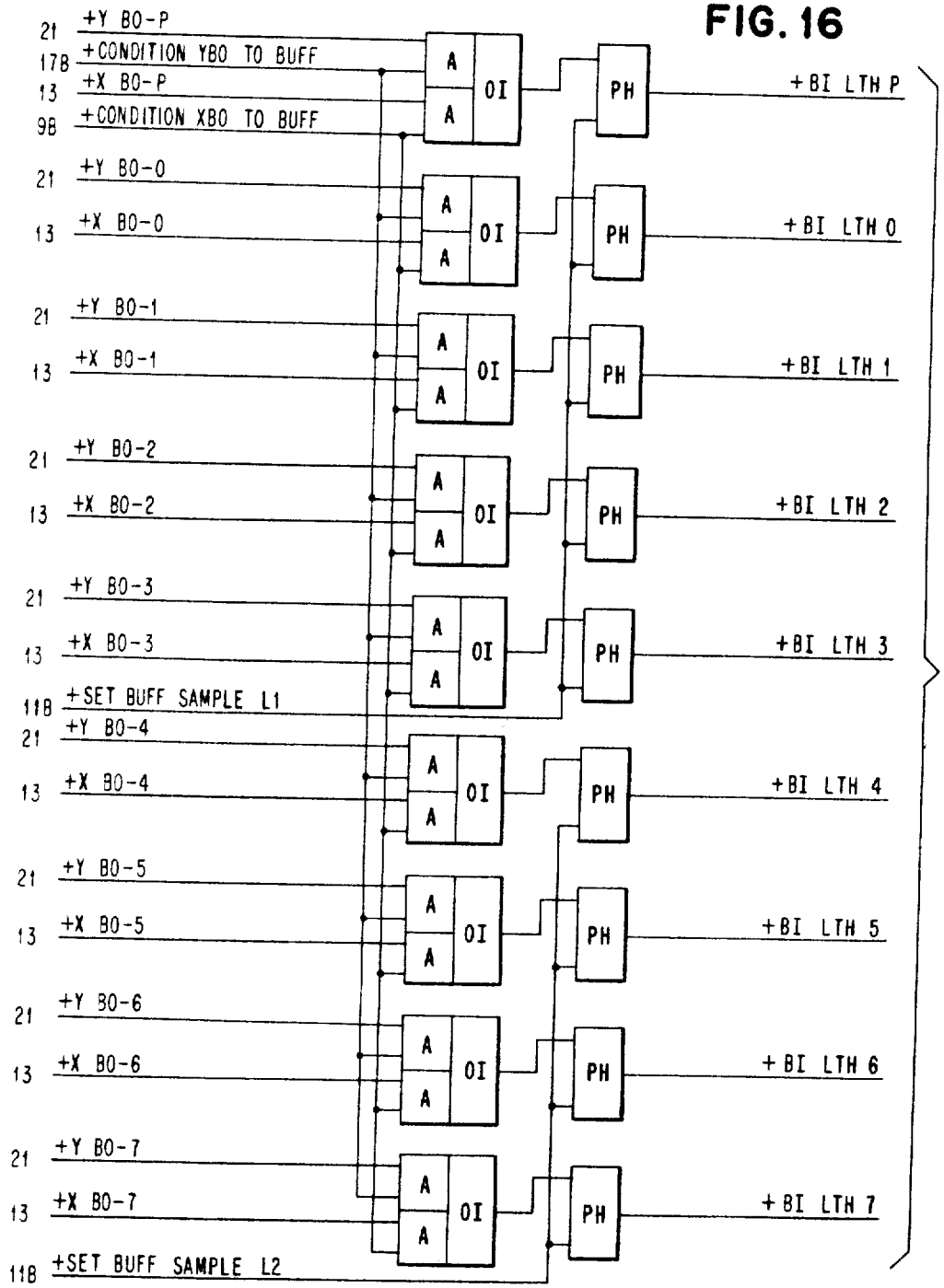

The bus-out lines 28D, shown in FIG. 2, are connected to a bus-out gating and address decoding section 46 which provides outputs to a buffer and command latches included in the adapter. Turning to FIG. 13, the bus out lines $28a^P, 28a^0 \ldots 28a^7$ are connected to receiver (R) blocks which provide outputs to the buffer shown in FIG. 16 and command latches in FIG. 9A. An AND-INVERT (AI) $28d^8$ is also connected to these lines as decoding circuit. The decoding provides outputs to an initial selection and status latch sections described hereinafter. These outputs have been omitted from FIG. 2 to reduce confusion in the drawing.

Figure 21:
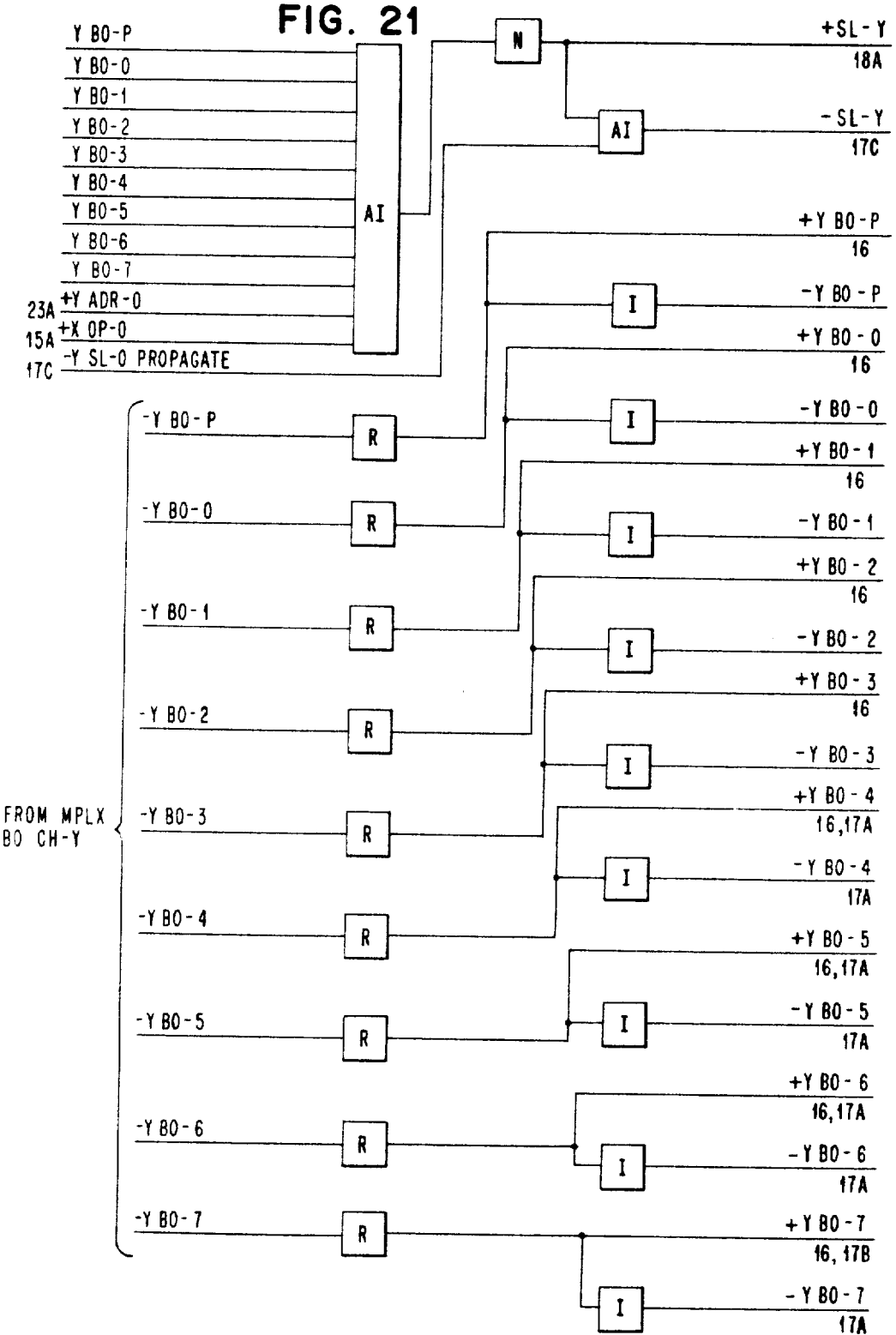
Figure 22A:
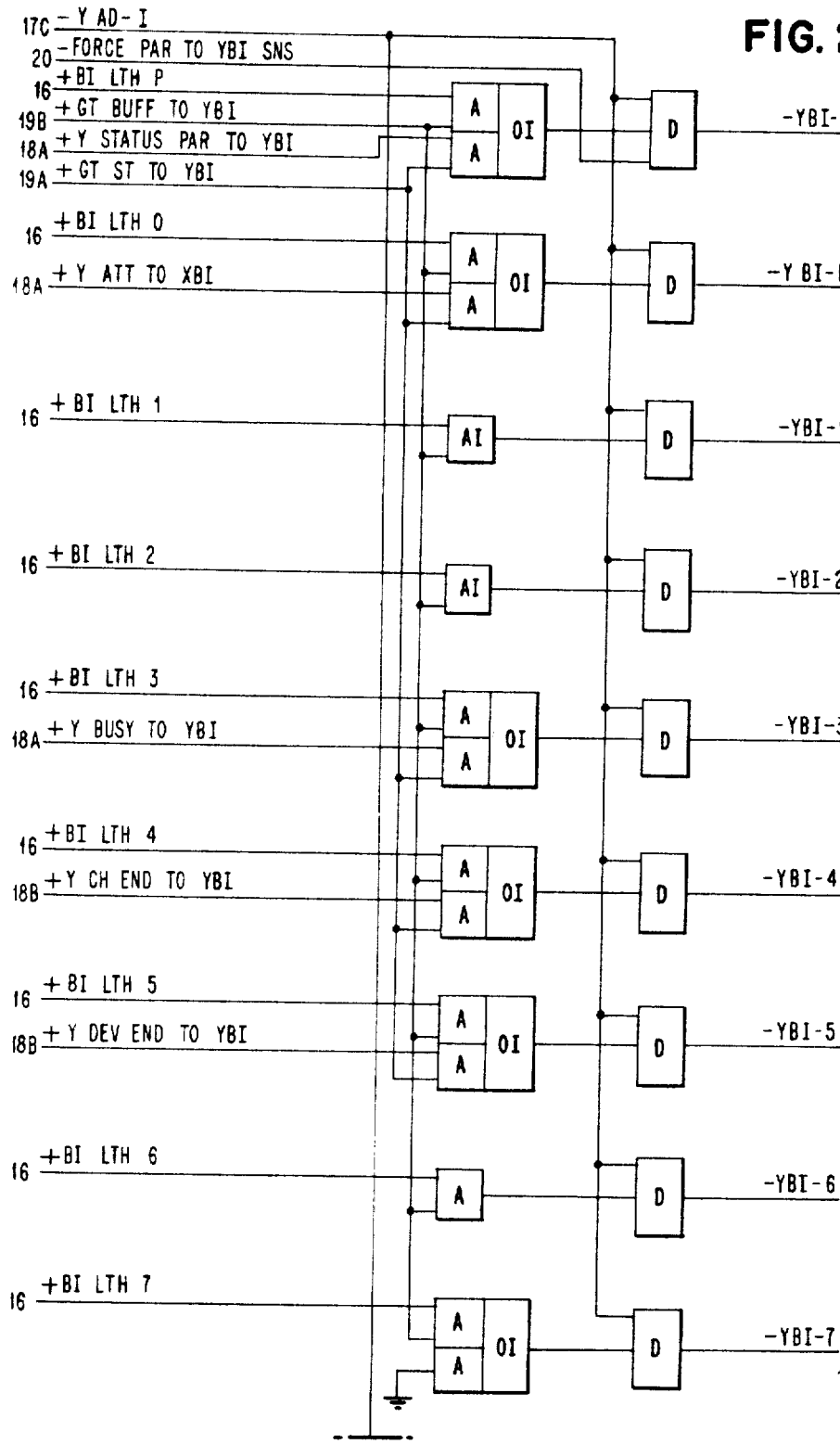
Figure 22B:
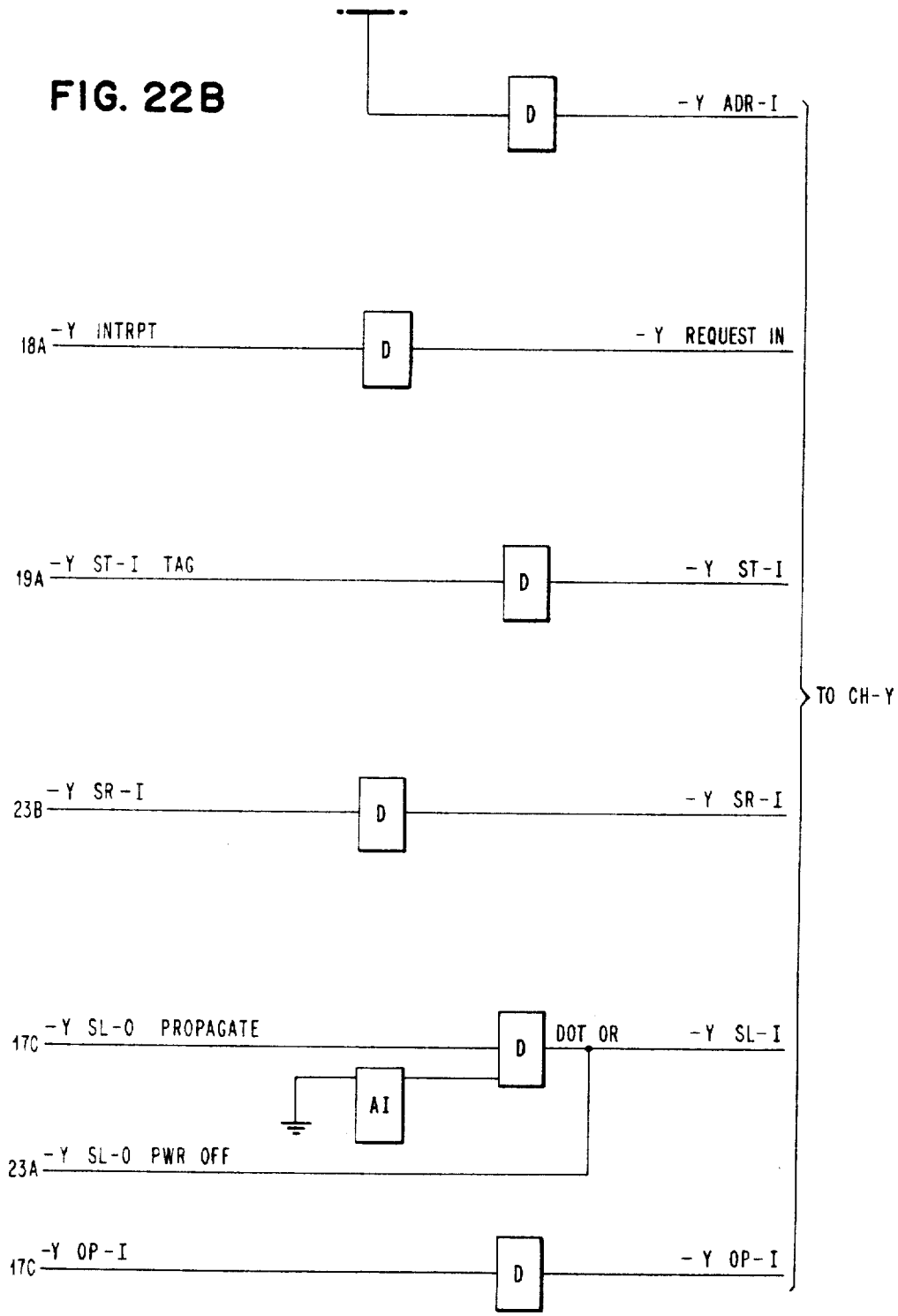

Returning to FIG. 2, the tag, control and data buses of the communication system 38 are connected to corresponding logic circuits as described in conjunction with the communication system 28. Thus, the tag lines-in 38A are connected to a tag line control section 50 described in FIGS. 22A and B. The tag lines out 38B are supplied to a service in gating section 52 described in FIGS. 23A and B. The bus in lines 38C are connected to a bus in gating section 54 described in FIGS. 22A and B. The bus out lines 38B are connected to bus out lines gating and address decoding section 56 described in FIG. 21. The outputs and inputs to the logic sections 50, 52, 54 and 56 are the mirror images of those indicated in conjunction with the sections 40, 42, 44 and 46. A description of these sections will be omitted for reasons of brevity.

The other controls included in the terminal units are shown within the blocked out section 60. One portion of these controls serve the computer system 20 (FIG. 1) or X system. A second portion serves the computer system 30 (FIG. 1) or Y system. These portions have been assigned primed and unprimed reference characters. The X system, which has unprimed reference characters will not be described for reasons of brevity.

A buffer unit 62 and disconnect and reset section 70 are common to both X and Y systems.

Figure 23B:
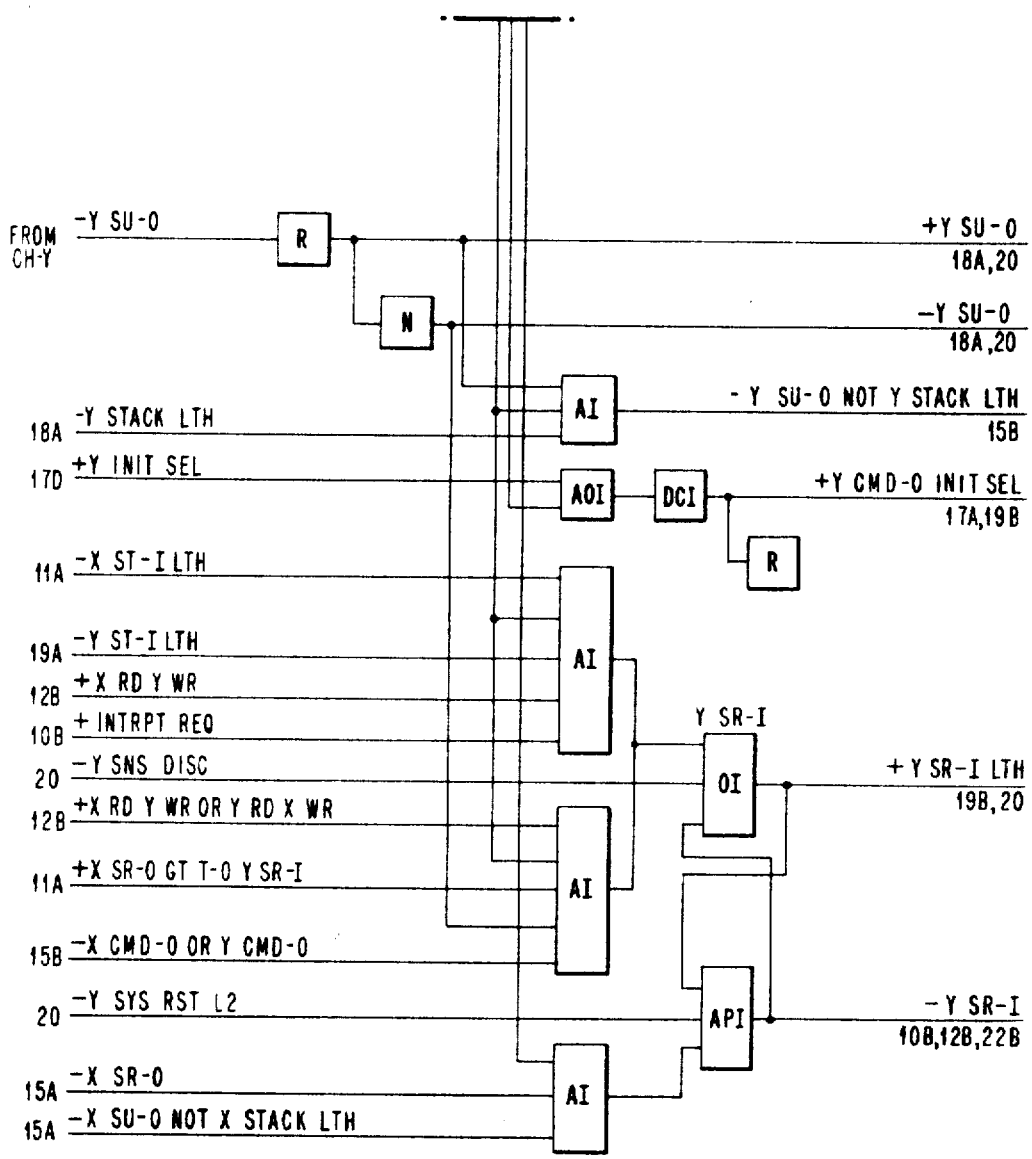

The buffer 62 is adapted to hold the information being transferred between the computer system. The buffer, shown in FIG. 16, includes a plurality of exclusive-OR latches which provide outputs to the bus in sections 44 and 54, respectively, described in conjunction with FIGS. 14A and 22A. The bus out sections 46 and 56, described in conjunction with FIGS. 13 and 23, provide the input to the exclusive latches by way of suitable AND and OR gating circuits. These gates are controlled in part by outputs from command latch sections 64 and 64', to be described, hereinafter, in conjunction with FIGS. 9A and B and FIGS. 17A and B.

Buffer gating 63, shown in FIG. 2, controls the inputs and outputs of the buffer 62. Turning to FIG. 11B, suitable logic circuits are included to receive inputs from the X command latches or for example, —X write, +X read or write or control; the Y command latches, as for example, —Y read or —write or —control, and other signal sources. The gating circuits provide outputs to set the buffer and gate the buffer to the Y bus in. The principal inputs and outputs are shown in FIG. 2.

The command latch section 64, shown in FIGS. 9A and B, includes a plurality of latches responsive to a particular command provided on the bus-out 28d (see FIG. 2) by the X or computer system 20. The latches, responsive to the commands out, are a sense (SNS), test I-O, read, write and control. Each latch comprises an OR-Power-Invert (OPI) and AND-power-invert (API). The inputs to OPI set the latch. The inputs to the API reset the latch. A negative output from the OPI or API is provided by a positive input. A positive output from the OPI or API is provided by a negative input. Each command latch is set by a different combination of bus out latches (see FIG. 13). The outputs from the command latches are supplied to several control sections. The particular sections are too numerous to recite. The principal inputs and outputs, however, are shown in FIG. 2. The operation of the latches will be described hereinafter.

The status latch controls 66, shown in FIG. 2, hold the condition of the adapter for transmission to the respective computer system when requested or necessary. The status latch controls, shown in FIGS. 10A and B, include a series of six latches which are set according to the condition of the adapter. Each latch comprises an OPI and API block suitably interconnected. A brief functional description of the various status latches is believed in order.

Figure 10A:
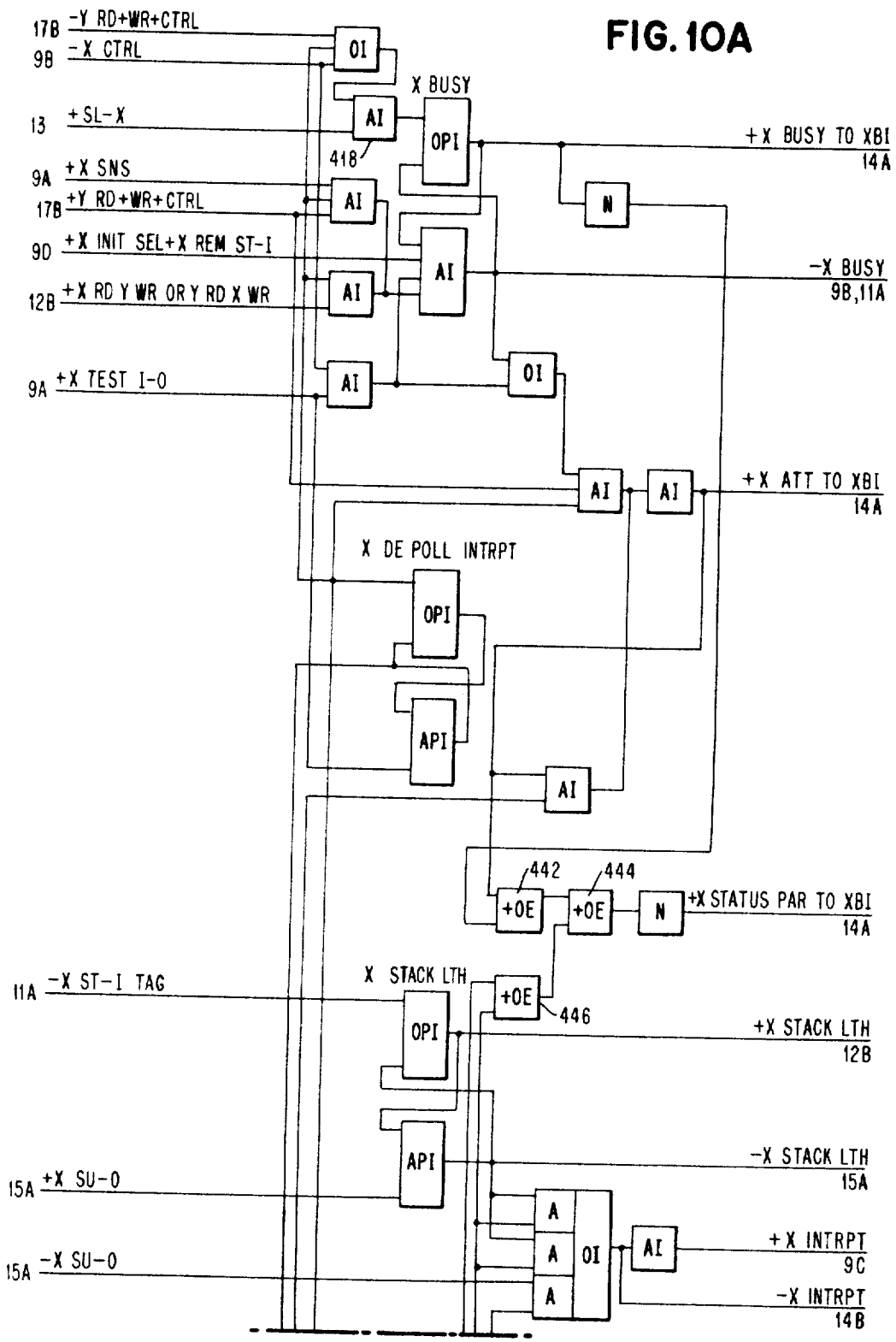

A busy latch, shown in FIG. 10A, is set when the adapter cannot accept a new command either because of it is executing a previously initiated operation or because it contains an interruption condition. A polling interrupt latch (DE POLL INTPRT) is set when the adapter has been selected directly to execute a particular command. A stack latch is set when the channel or computer system is unable to receive the status information from the adapter. A device end (DEV END) latch, shown in FIG. 10B, is set when the I-O device connected to the terminal unit has completed the operation specified. A channel end (CH END) latch is set when the terminal unit is free to accept another operation. An interrupt request (INTRPT REQ) latch is set when the terminal unit is waiting to supply status or data to the channel or computer system.

The inputs to the status latches are provided to command latch sections 64 and 64′, tag in controls 68 and 68′, initial selection sections 74 and 74′ and service in controls 72 and 72′. The status latches provide outputs to bus in sections 44 and 54; tag in controls 68 and 68′, command latch sections 64 and 64′ and to the service in controls 72. The important inputs are outputs shown in FIG. 2.

Figure 11A:
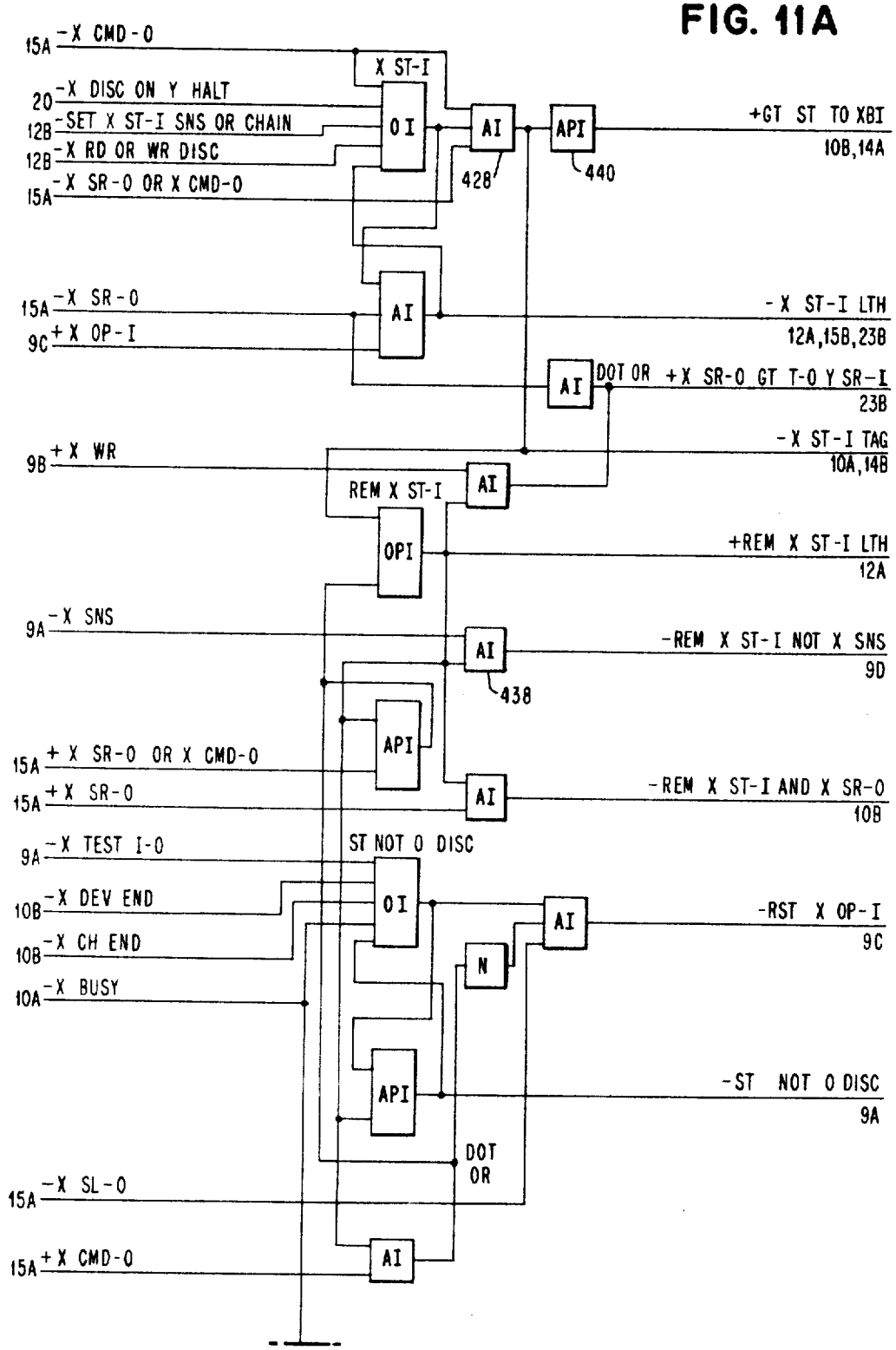
Figure 11B:
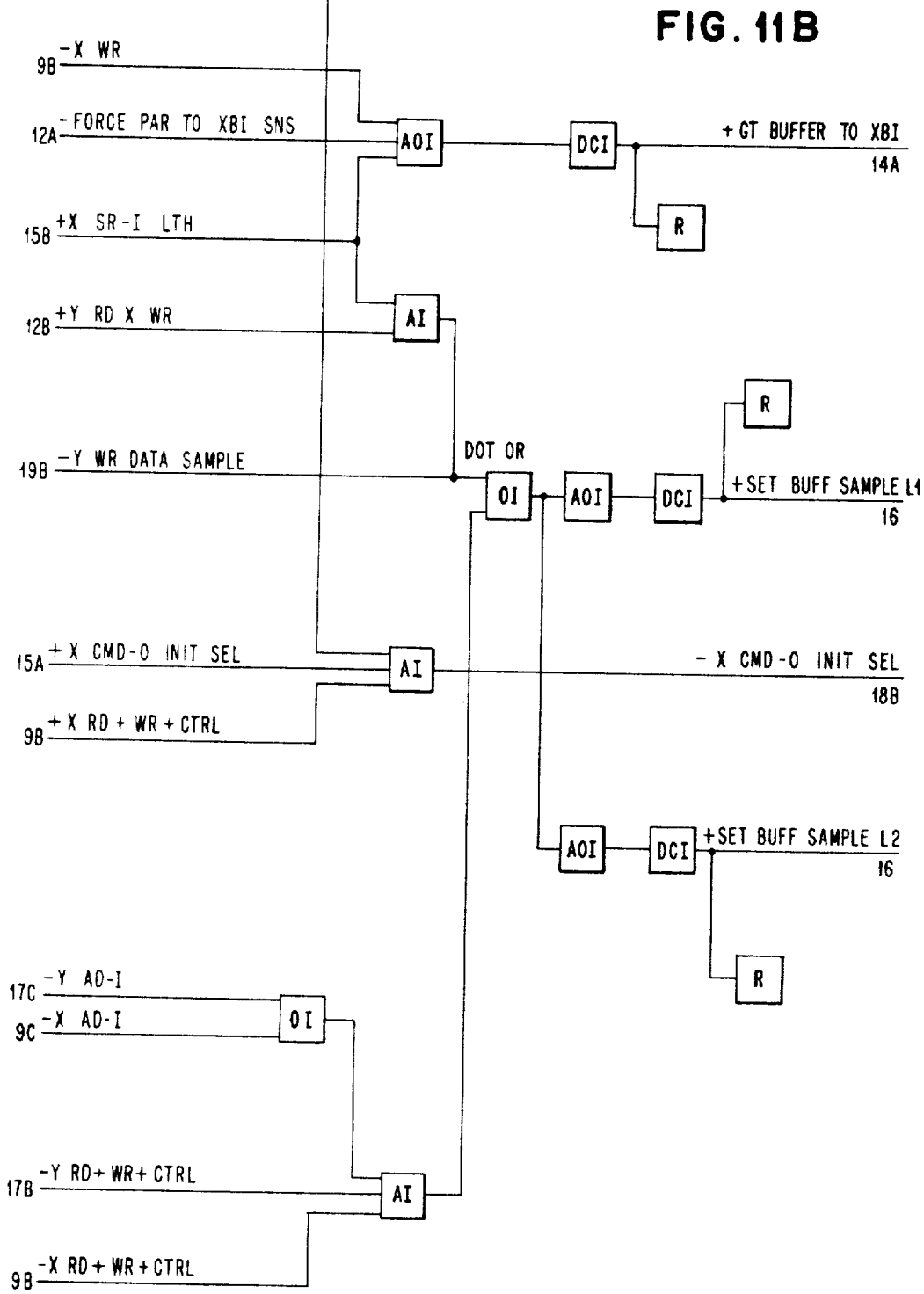
Figure 12A:
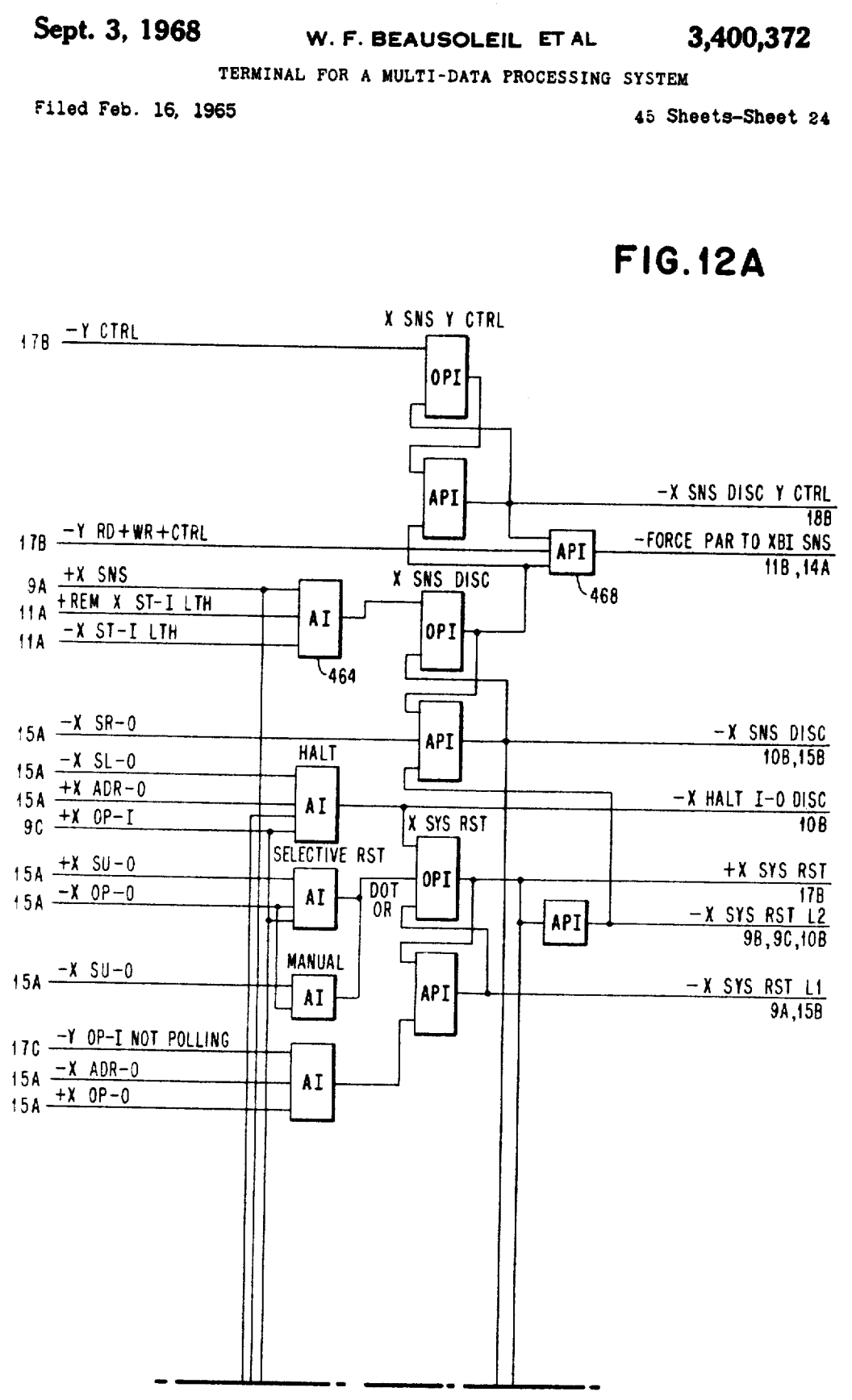

The status and disconnect controls 68 and 68′, shown in FIGS. 11A, 12A and B include six latches and suitable circuitry for (1) gating the status latches to the bus in, and (2) disconnecting the adapter from the interface. A functional description of the various latches is believed in order.

A status in (ST-I) latch, shown in FIG. 11A, is set when the information provided by the status latch section 66 is on the bus in. A remember status in (REM ST-I) latch is set when the channel or computer system has accepted the status information and has provided a signal to write the necessary data. A status not zero disconnect latch (ST NOT 0 DISC) is set when the terminal unit is busy or has completed the specified operation. An X sense Y control latch, shown in FIG. 12A, is set when the channel or computer system is requesting the contents of the status latches. An X sense disconnect (SNS DISC) latch is set after the channel or computer system has accepted the status information. The system reset (SYS RST) latch is set in response to a halt command or a manual or selective reset command. Each latch comprises an OPI and API block. The controls 68 are responsive to the command latches 64 and 64′; the service in controls; and the status latches 66 and 66′. The controls 68 provide outputs to the tag in lines 40 and 50; the status latches 66 and 66′; the initial selection section 74 and 74′ and the Y status latches 66′. The principal inputs and outputs are shown in FIG. 2.

The service in controls sections 72, shown in FIG. 2, include suitable gating circuitry for receiving the outputs from the Y service controls 72′ and the status controls 68. The service in controls provide outputs to the Y service controls 72′, tag in controls 68 and tag in logic sections 40. The service controls permit the output signals from one computer system to initiate the transfer of data in the buffer and to order the next character from the other computer system. A service in (SR-I) latch, shown in FIG. 15B, is set or reset as the case may be from the X or Y service controls. The latch comprises an OPI and API logic block. The operation of the latch will be described hereinafter.

Figure 9C:
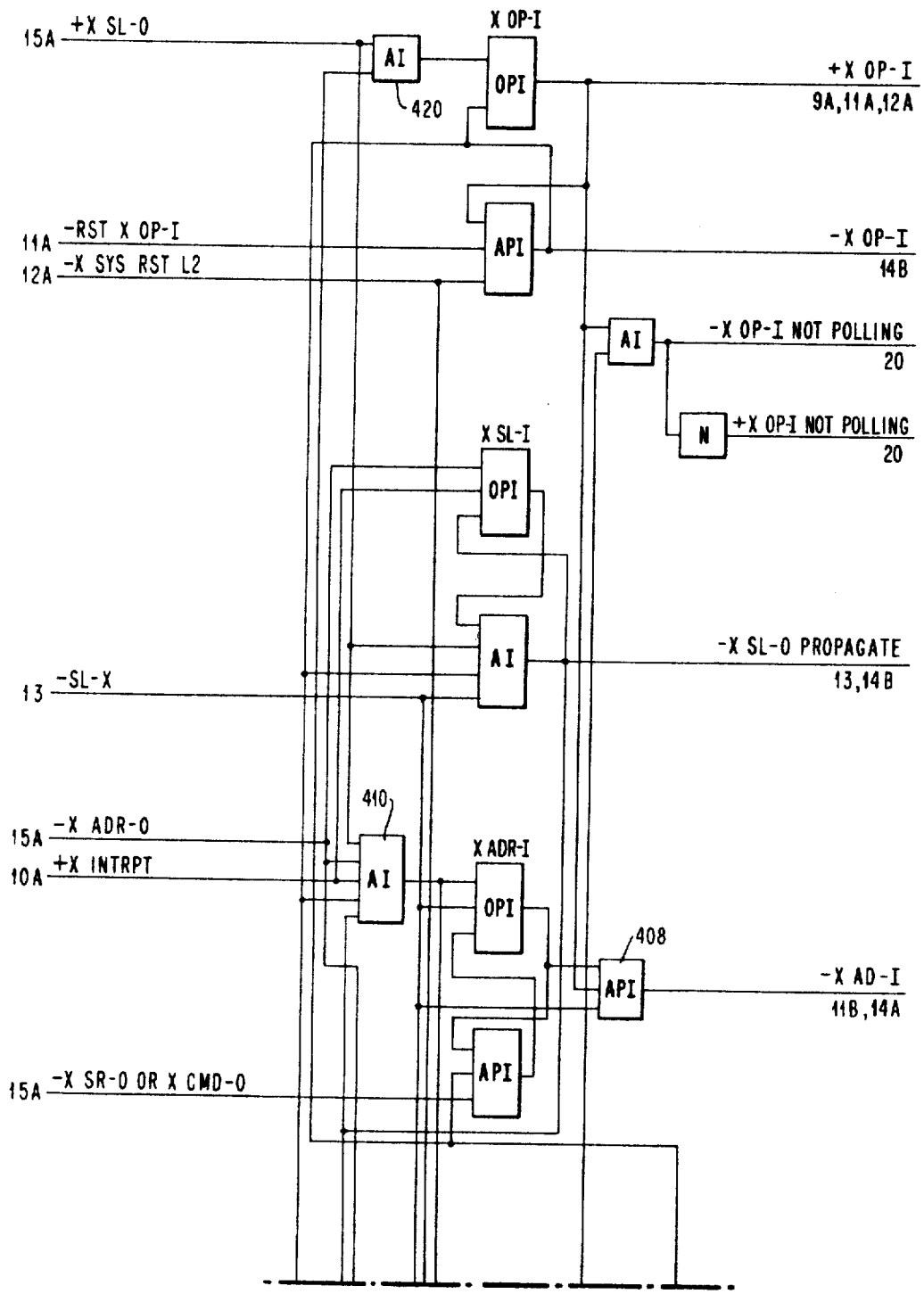
Figure 9D:
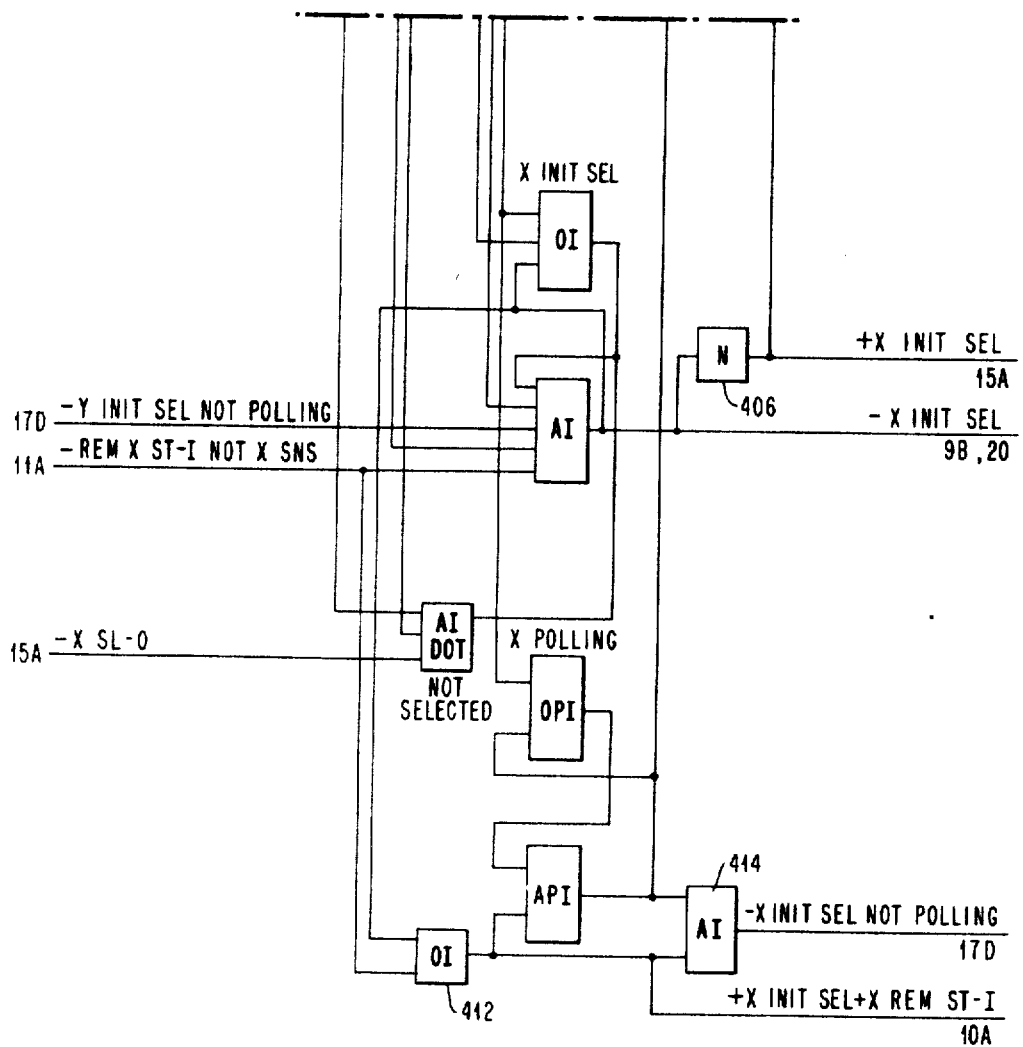

The initial selection controls 74, shown in FIG. 2, respond to addressing and selection signals provided by the channel or computer system. The section 74 sets the adapter in operation in a multiplex condition, according to the input signals. Referring to FIGS. 9C and 9D, five latches are included in the set.

An operational in latch (OP-I), shown in FIG. 9C, is set in response to a polling or select out signal. This latch operates the interlock line included in the tag in controls 40 (see FIG. 2). A select in (SL-I) line is set when the adapter is on idle condition. An address in (ADR-I) latch is set when the adapter unit has recognized the address out and is responding with address in. An initial selection (INIT SEL) latch, shown in FIG. 9B, is set when the adapter unit has decoded the address and a tag out control defined as a select out has been received. A polling latch is set when the terminal unit has initiated a selection sequence to present previously unaccepted status to the computer system.

The section 74 receives inputs from the tag out controls (FIG. 15A); the status controls (FIG. 11A); and the status latches (FIG. 10A). Outputs to the various controls are provided, the more important lines being shown in FIG. 2.

(IV) INTERFACE OPERATION

As shown in FIG. 2A, the adapter is selected by raising the select outline $28b^4$ and the hold out line $28b^5$. The adapter raises the select in line $28a$. The select in line is the other side of the select out line. Next, the computer system places the selected address on the bus out $28d$ and raises the address out line $28b^1$. When the select out line and hold out line are raised, each control unit connected to the interface attempts to decode the given address.

The address must have correct parity to be recognized and only one control unit will recognize any given address on the same interface. When address out $28b^1$ is up and the incoming select out line rises, the selected adapter raises the operational in line $28a^6$. The computer will drop the select out line during the initial selection sequence at this point. After address out falls, the unit address is placed on bus in $28d$ accompanied by a signal on the address in line $28a^1$. The computer checks the address, and responds by placing the command on the bus out $28c$ and signaling on the command out line $28b^2$. The selected control unit then replaces the address with status information on bus in $28c$ and replaces the address line with the status in line $28a^3$. The operational in line remains up throughout this operation. This status information informs the computer that the command was accepted or rejected. In case the computer cannot handle this status, command out will respond to status in with suppress out (not shown) and the status is stacked as will be described hereinafter. If the adapter sends an intervention required with its status into the computer, as for instance, after an invalid command, the computer if it accepts this status responds with service out line $28b^3$ and the adapter responds with the service in line $28a^4$. The intervention data is received by the computer.

If the adapter is busy operating, the adapter responds with a busy bit alone in the status byte. If the adapter has outstanding status, it responds with a busy bit (indicating a busy reject to the new command) plus the outstanding status. If the command is test I-O and the adapter is not busy, a busy bit is not included with the status since the test I-O command is not rejected. If the device path is free, the control unit presents zero status. If the command is a control command, which could be specified and executed with the information contained in the command byte and could immediately free up both computer and adapter, then the adapter can respond with end status at this time.

When the service is required as indicated in FIG. 2B, the adapter places the address on bus in $28c$ and signals on both the address in $28a^1$ and operational in lines $28a^6$ at the time the select out $28a^5$ rises at the control unit. The select out line from the computer may fall after address in rises. When the computer has recognized the address and is prepared to send or receive the data, a command out $28b^2$ signal is sent to the adapter which indicates proceed. The adapter then replaces the address on bus in $28c$ with the input data required, if reading or sensing, and drops the address in line $28a^1$ and raises the status in line $28a^4$. If writing or controlling, the action is the same except nothing is on bus in. When the computer has accepted the input data or has input data available, it responds to the adapter with a service out signal $28b^3$. The adapter then drops the status in line $28a^4$. The service out signal drops after status in. The adapter raises service in for the data byte and the computer responds with the service out line. The above procedure is repeated for each new byte of data until the end of the operation is reached. The ending procedure may be initiated by either computer. When the computer reaches its ending point, command out is raised. The adapter places the status (including end) on bus in and raises the status in line. The computer responds with service out, unless it is necessary to store this status. This then terminates the operation, causing the computer to go on with periodic scanning.

(V) ADAPTER OPERATION (FUNCTIONAL)

The adapter decodes and makes use of the following commands supplied by the computer:

The only exception to the above is encountered when system 20 issues a SENSE command to the adapter before a previous control from system 20 had been cleared. If the control had not been answered by a SENSE from system 30, then the SENSE command would receive busy bit in the initial status byte in response. If control had been

TABLE I

| | | | Bit positions (bus out) | | | | | | COMMAND |
|---|---|---|---|---|---|---|---|---|---|
| P | 0 | 1 | 2 | 3 | 4 | 5 | 6 | 7 | |
| P | X | X | X | X | 0 | 0 | 0 | 0 | TEST I-O |
| P | X | X | X | X | X | X | 0 | 1 | WRITE |
| P | X | X | X | X | X | 1 | 1 | 1 | READ |
| P | X | X | X | X | 0 | 1 | 0 | 0 | SENSE |
| P | X | X | X | X | 1 | X | 0 | 0 | READ BACKWARD |
| P | X | X | X | X | X | 0 | 1 | 1 | NO OPERATION |

Odd parity is employed. X signifies modifying which can adapt the command to a special operation if so desired. The operations will be explained in terms of computer X or system 20. Both systems may perform the exact function and thus, where the X system is, the Y or system 30 can be substituted if the operation were initiated from the other system.

The operations, as defined hereinafter, logically and functionally occur in pairs. Thus, a control command issued by system 20 can only be terminated by a SENSE command from system 30, although a SENSE command from one system does not require a reply from the other. A READ from system 20 can only be handled by a WRITE system 30, although a SENSE command from system 30 would prevent the status character issued by system 20.

A control signal from system 20 causes the adapter to respond with channel end status, thus freeing system 20 and setting the attention bit of system 30. System 30, when free, can accept the attention bit, as previously described. To free the adapter, a SENSE command must be issued by system 30. At the termination of the SENSE from system 30, a device end to system 30 is generated which is handled by system 30, as will be defined hereinafter.

A control from system 20 may be busy by one of three conditions:

(1) The control could be issued by system 20 before a previous control from system 20 had been cleared. The adapter response would be busy status only.

(2) The control could be issued by system 20 after the previous control had been cleared after the device end had been accepted by system 20. The response would be busy in the device end status. This would clear the device end and leave the adapter idle.

(3) The control might be issued by system 20 after system 30 had issued a command to the adapter. The adapter would respond with busy and the attention status to the system 20. The attention after accepted in this way, would no longer attempt to get into the system, but if another command such as control were issued from system 20, the response would still be busy at attention status.

SENSE command received by the adapter initiates a single eight-bit byte with proper parity to the initiating computer. The SENSE byte received by the computer will consist of the contents of the adapter latches. If the adapter is idle, the byte will contain all zeros. Otherwise, it will contain a complete command out byte issued by the other computer, as tabulated below:

answered, but the device end had not been taken, or had been stacked, then the SENSE command would receive busy and device end status. This would clear the device end from the adapter.

The adapter recognizes no difference between READ and READ BACKWARD. In both cases, the primary function of the adapter is the transmission of data bytes to the initiating computer or channel. It is the function of the channel to place the data byte in storage in the proper order.

When the READ command is issued through an idle adapter, the issuing channel will receive an all zero status response and that will be held up until the other channel responds to the WRITE command. An attention is immediately set up to signal the non-issuing channel that an opertion is waiting. The complete READ command byte is latched in the adapter and is available to the SENSE command.

If a READ issued by system 20 encounters a previously issued WRITE from system 30, both operations will be performed. System 20 would receive zero status in the initial status byte where the attention had been accepted or not. A service in would request a byte of data from the writing system 30, which would be passed immediately to system 20. The operation would continue until either channel responds to a service in with a command out stop. Upon receiving the stop command, a status in receiving the channel end and device end would be issued from both channels. If neither channel is chaining, then the acceptance of the status by both channels, frees the adapter and returns to idle.

There are three busy responses to a READ command issued by system 20:

(1) Busy status alone would respond to command out READ from system 20 if system 20 had previously issued a control command that was still in the channel adapter.

(2) Busy and device end status would be in response to a command out READ if a previously issued control command had been cleared but the device end had not been accepted. This would clear the device end and leave the adapter idle.

(3) Busy and attention status should be in response to a command out READ of system 20 if system 30 had previously issued CONTROL, READ or READ BACKWARD. If the attention had not been previously accepted by system 20, this would clear it as an interrupting condition, although it would still appear as a response to another READ until the previously issued command of system 30 was satisfied.

| 0 | 1 | 2 | 3 | 4 | 5 | 6 | 7 [1] | |
|---|---|---|---|---|---|---|---|---|
| 0 | 0 | 0 | 0 | 0 | 0 | 0 | 0 | Adapter idle. |
| X | X | X | X | X | 1 | 1 | 1 | Control issued by system 30. |
| X | X | X | X | 1 | 1 | 0 | 0 | Read backward issued by system 30. |
| X | X | X | X | X | X | 1 | 0 | Read issued by system 30. |
| X | X | X | X | X | X | 0 | 1 | Write issued by system 30. |

[1] Bus in.

The primary function of the adapter on the write command is acceptance of data from the writing system for transmission to the reading system.

When the WRITE command is issued to an idle adapter, the issuing system will receive an all zero status in response and will then be held up until the other channel responds with READ. An attention is immediately set up to signal the nonissuing channel that an operation is waiting. The complete WRITE command byte is latched in the adapter and is available to a SENSE command.

If a WRITE command issued by system 20 encounters a previously issued READ from system 30, both operations will be performed. System 20 would receive zero status in response to its command out whether the attention had been accepted or not. The service in would request from the writing system 20 a byte of data which would be passed through immediately to system 30. This operation would continue until either channel responded to a service in with a command out STOP. Upon receiving the STOP command, a status in containing channel end and device end would be issued to both systems. If neither system is chaining, then the acceptance of the status by both systems frees the adapter and returns it to idle.

There are three responses to a WRITE issued by system 20:

(1) Busy status alone would respond to the command out WRITE from system 20 if the system 20 had previously issued a control command that was still in the adapter.

(2) Busy and device end status would be the response to a command out WRITE if a previously issued control command had been cleared but the device end had not been accepted. This would clear the device end and leave the adapter idle.

(3) Busy and attention status could be the response to a command out byte from system 20 if system 30 had previously issued a Control or WRITE. If the attention had not been previously accepted by system 20, this would clear it as an interruption condition, although it would still appear as a response to another WRITE until the previously issued command of system 30 had been satisfied.

A test I-O may be used by the system to determine the status of the adapter any time the system is free. The contents of the adapter latches remain unchanged. The status received would indicate the condition of the adapter as follows:

(1) A zero status would indicate that the adapter was idle at the time of response.

(2) A busy status would indicate to the initiating system that a control, previously issued by the same system had not been accepted.

(3) An attention status would indicate to system 20 system 30 had previously issued a CONTROL, READ, READ BACKWARD or WRITE.

(4) A device end status would indicate that a previously issued control had been accepted, but that the final interrupting condition had not been accepted by the system. This would clear the device end status.

The no-operation command as used with the adapter does not affect the contents of the adapter latches. Channel end and device end status are sent to the initiating system in response to the initial command out if the command is accepted. The no-operation may be busy rejected if there is outstanding status information held in the adapter at the time the command is issued.

If a no-operation is issued to an idle adapter, the issuing system will receive a status response containing channel end and device end. A no-operation from system 20 may be busy by one of the following three conditions:

(1) A no-operation could be issued by system 20 before a previous control from system 20 had been cleared. The adapter response would be busy status only.

(2) A no-operation could be issued by a system 20 after a previous control had been cleared, but before device end had been accepted by system 20. The response would be busy and device end. This would clear the device end and leave the adapter idle.

(3) The no-operation might be issued by system 20 after ssytem 30 had issued a READ, READ BACKWARD, WRITE or CONTROL command to the adapter. The adapter will respond with BUSY and ATTENTION status to system 20. If an outstanding device end was still present, it would also be included in the status byte.

When the adapter recognizes the HALT I-O condition, its response to halting system is immediate. It drops all in tag lines, sets channel end and device end in its status and waits for a chance to send the status to the system. If the system not initiating the HALT is operating with the adapter, it also receives channel end and device end status but this simply looks like the halting system stopped the operation by a normal command out stop, the same as in READ or WRITE.

Either a selective reset or master reset is handled just like a HALT I-O with a single exception that no channel end or device end is sent to the issuing system. The adapter is then not available to the nonissuing system for the duration of reset.

Several points that apply across the number of operations are listed in the following:

(1) A stack latch is included so that any system wishing to stack attention, channel end or device end, may do so by responding to status in with command out and bringing up the suppress outline before command out drops.

(2) Suppress out may also be used to keep the system from being overrun during chain data operation, or any time a particular system needs to slow the operation for some other reason. The adapter will not request a service in from a system while its suppress out is up.

(3) The speed of the adapter is determined by, and will match, the speed of the slower system to which it is attached. The system may adjust its speed as noted above.

The following charts summarize the pertinent status information described above for the indicated commands:

TABLE II

| Channel X issues | Adapter idle | Channel X issued CTL-Y | Channel Y had issued | | |
|---|---|---|---|---|---|
| | | | X-RD/RDB | X-WR | X-Control |
| Read/Read Backward | Att-Y | X-Busy | X-Busy & Att | X-Go-Y | X-Busy & Att |
| Write | Att-Y | X-Busy | X-Go-Y | X-Busy & Att | X-Busy & Att |
| Control | Att-Y | X-Busy | X-Busy & Att | X-Busy & Att | X-Busy & Att |
| Test I-O | X-O'S | X-Busy | X-Att | X-Att | X-Att |
| No Operation | X-CH E Dev E | X-Busy | X-Busy & Att | X-Busy & Att | X-Busy & Att |

ADAPTER OPERATION (GENERAL)

A description of the adapter operation will be given in conjunction with the flow charts, shown in FIGS. 3A through 8B. The rectangular figures on each flow chart represent operations performed by the adapter. The operations performed are indicated within the rectangular figure. The signal initiating operation appears in the upper part of the figure when present. The diamond-shaped figures represent decisions executed by the adapter. The decision executed is indicated within the figure. The signals required to execute the operation or decision can be determined by referring to the circuit diagrams for the particular operation or decision. Thus, an operation turn on the initial selection latch (T/O INIT SEL) is executed when the set signals shown in FIG. 9D or 17D, as the case may be, are received. Likewise the decision select out (SEL-O) is executed when the interface lines, shown in FIGS. 2A or 2B, so indicate. It should be noted that timing signals are not required in any operation or decision as the adapter operates on an interlock with the computer 20 or 30. Hence no clock is required in the adapter.

Rather than describe the details of each operation or decision in the flow charts, it is believed a better description will be presented if the flow diagrams are followed through for a typical computer command. Thereafter, a circuit description will be provided for another computer command. Between the flow diagrams and circuit descriptions, it is believed a complete understanding of the invention for all other commands capable of being performed by the adapter. It should be noted that the flow diagrams are applicable to both the computer system 20 (designated the X system) and the computer system 30 (designated the Y system). The flow diagrams indicate operation in terms of the X and Y system.

READ (Y)—WRITE (X) OPERATION

Briefly, this operation requires the Y or computer system 30 to provide data (read) from the X or computer system 20 which will be placed in a read mode. It will be assumed that the adapter is idle and the X and Y systems are polling the adapter and other control units connected thereto by circulating a select-out signal.

*Initial selection.*—Referring to FIG. 3A, an initial selection routine is begun at start symbol 200. The Y system provides the adapter address on the bus out and raises the address out line as operation 202. The details of this and all other interface operations are given in a previously filed application, Ser. No. 357,369, IBM Docket 7783, filed Apr. 6, 1964, assigned to the same assignee as that of the present invention. The adapter proceeds to decode the address on the bus out as operation 204. The adapter executes decision 206 which determines whether or not it has been selected. For a NO condition, the adapter continues to activate a propagate select out circuit as operation 208. For a YES condition, where the adapter has been selected, an operation 210 is performed which turns on the initial selection and address in latches (FIGS. 9C and 9D). An operation 212 is performed, after selection of the adapter, which blocks the initial selection latch of the X system. The adapter next performs decision 214 which determines whether or not the adapter is hung up on a Y control operation or X READ, WRITE or CONTROL operation or a Y device and condition. A YES condition initiates an operation 216 which turns on the busy latch (FIG. 10A). A NO condition, continuing on FIG. 3B, causes the adapter to remain idle until the select out pulse, provided on the interface, is detected as operation 218. The select out pulse turns on the Y operational in latch (FIG. 9C) as operation 220. The operational in line being turned on results in the address out line dropping. The adapter turns on the Y address in latch (FIG. 9C) as operation 222 when the address out line drops. Simultaneously, the adapter provides the wired-in address on the bus in. The Y system proceeds to compare the address in with the address out and subsequently provides a command out on the bus out. The Y system also raises the command out tag line in response to the address in tag line. The adapter remains idle until the command out tag line is detected as decision 224. The appearance of the command out signal results in the Y address in latch being turned off and the Y status in latch (FIG. 11A) being turned on as operation 226. The adapter now proceeds to decode the write command of the Y system. The format of the write command on the bus out is shown in Table I.

Figure 4A:
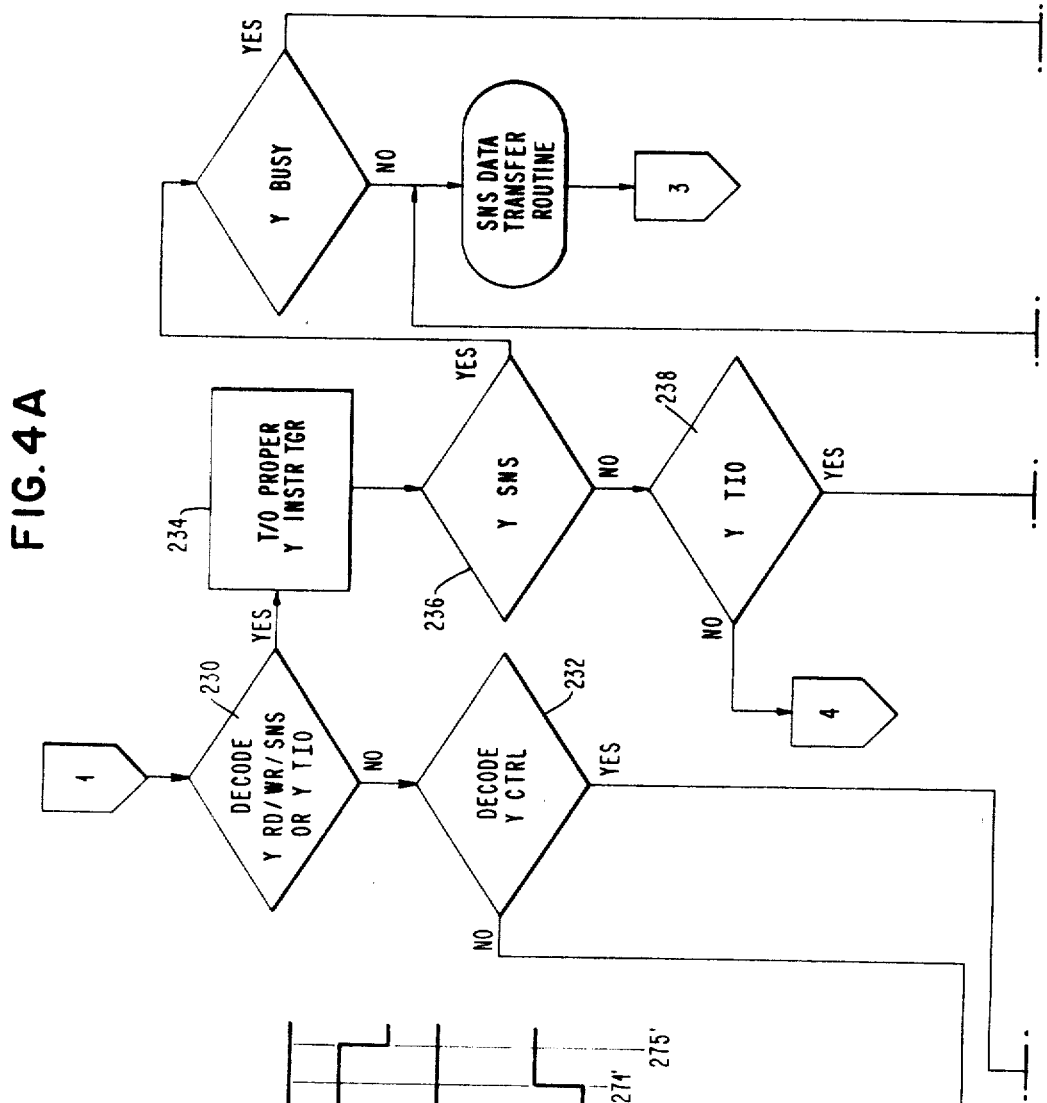
Figure 4C:
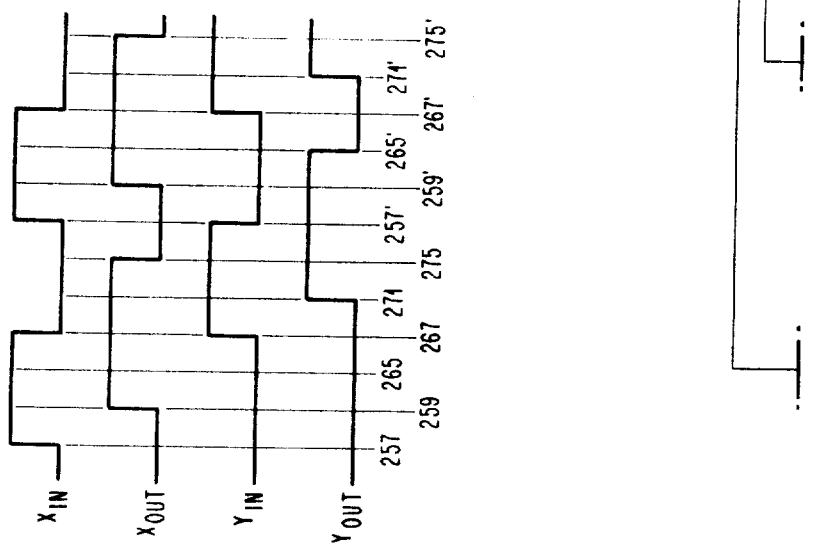
Figure 4B:
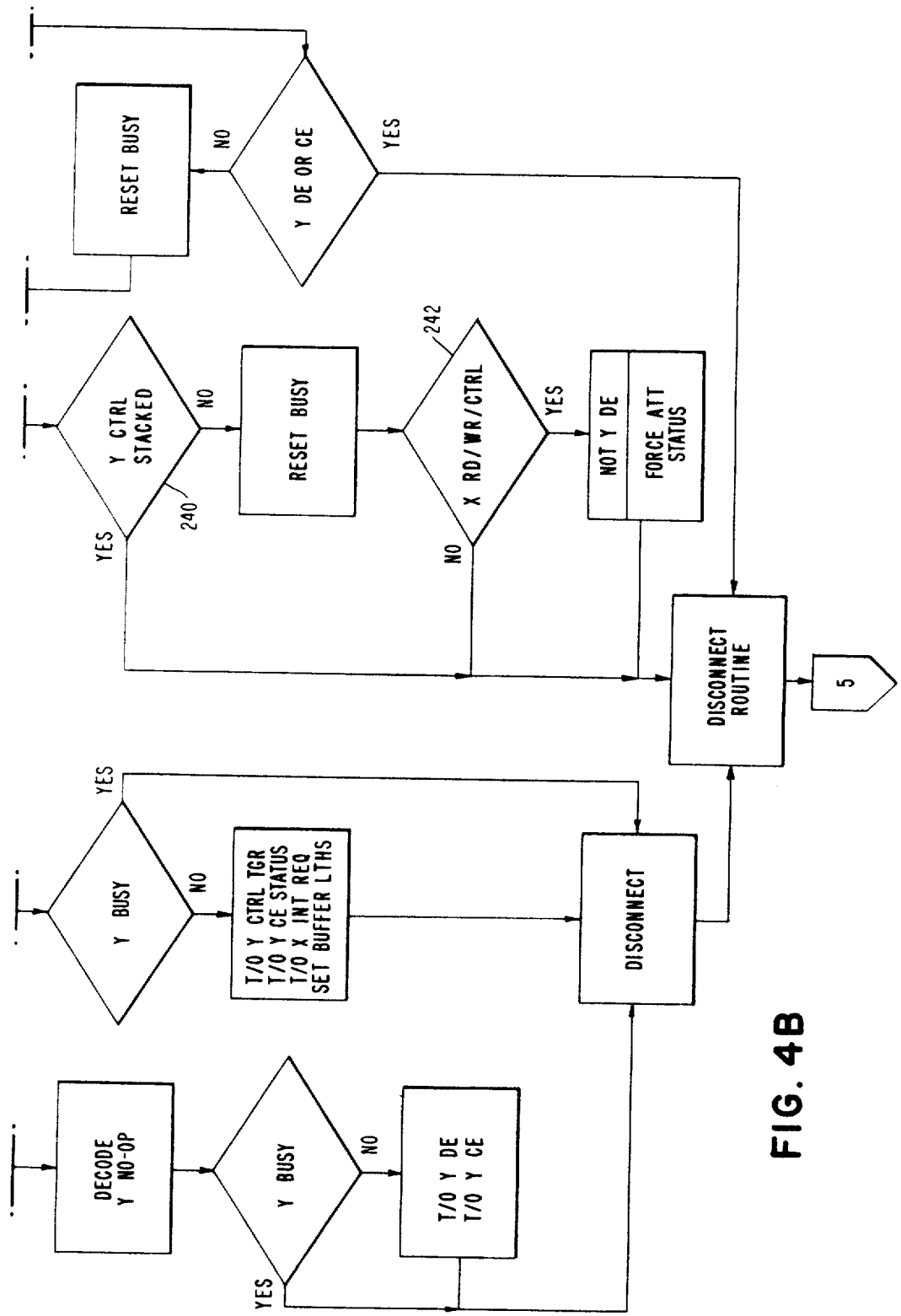

Referring to FIG. 4A, a decision 230 determines whether any of the data transfer routines are to be executed. For a NO condition, a second decision 232 determines whether a control or NO operation is to be performed by the adapter. A description of these operations will be performed hereinafter.

A YES condition to the decision 230 initiates an operation 234 which turns on the proper command latch, for example, READ, WRITE, SENSE (see FIG. 9A), which in this case is the READ latch. The adapter next performs a series of decisions 236, 238, 240 and 242 which determines the operation to be executed by the adapter. A YES condition for the decision 236 indicates a SENSE operation. A YES condition for the decision 238 indicates a test I-O operation. Since this is a READ command, the decisions 236 and 238 are NO. The adapter operation continues on FIG. 5A.

Figure 5B:
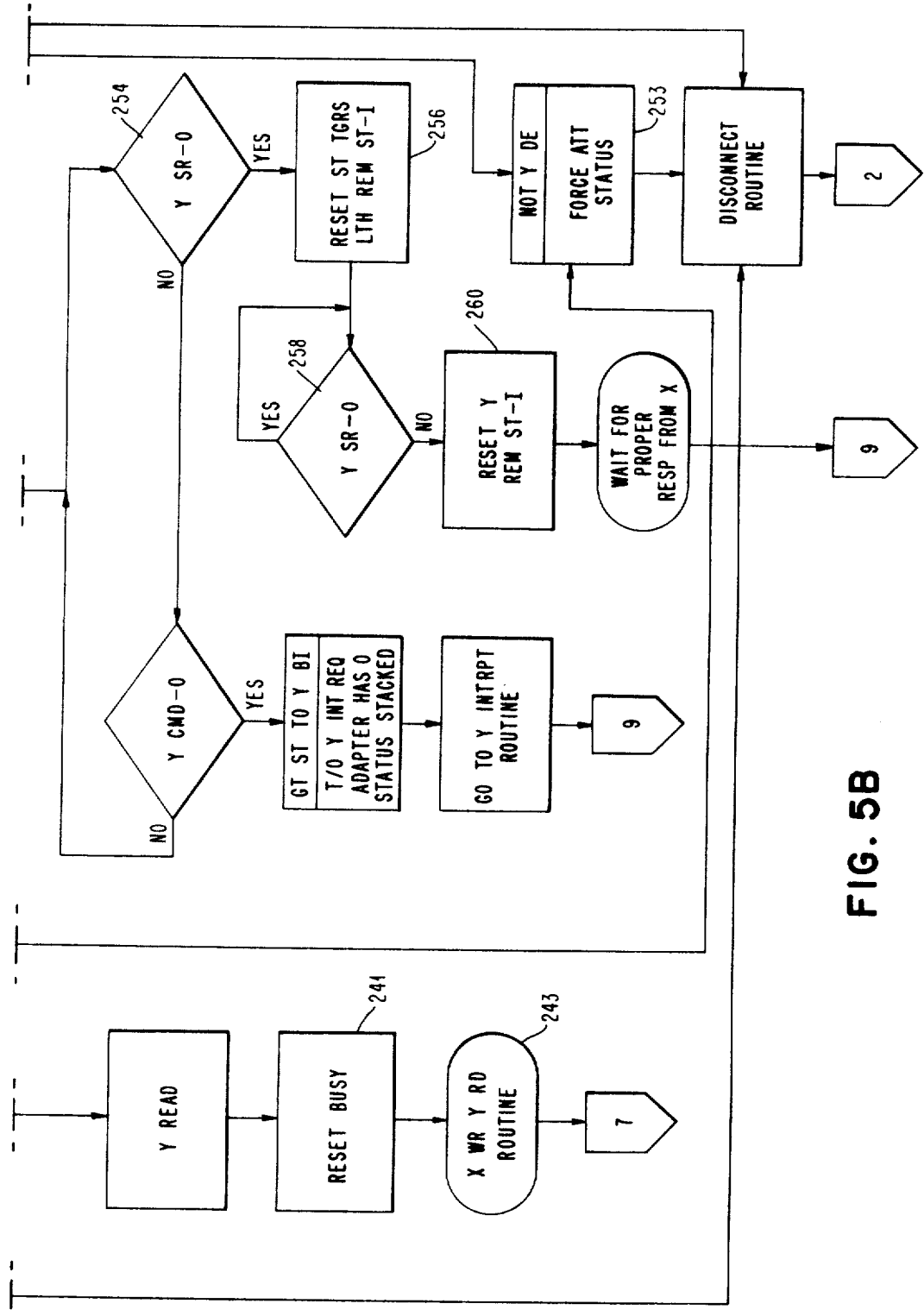

A decision 244, shown in FIG. 5A, is YES which is followed by a busy decision 246 which is also NO, as the adapter was assumed to be idle. The NO condition results in an operation 248 which turns on the X interrupt request and sets the buffer to indicate to the X system the command being executed by the Y system. The Y adapter remains idle until the command out line drops in response to the status in line which is raised as operation 226 (see FIG. 3B). A decision 250 indicates a NO condition when the command out line drops. Thereafter, an operation 252, shown in FIG. 5B, is executed which places the adapter status on the bus in. The adapter status is zero since no busy or other condition exists. The Y initial selection latch is turned off and the remember status in latch (FIG. 11A) is gated. The adapter remains idle until the Y system accepts the status which is indicated by raising the service out line as decision 254. The YES condition initiates an operation 256 which resets the status trigger and sets the remember status in latch. The service out line drops when the status in trigger is reset. The decision 258 is NO when the service out line drops. The NO condition initiates an operation 260 which resets the Y remember status in latch. The adapter, having set the X interrupt request as operation 248 (see FIG. 5A), proceeds to wait until the proper response is received from the X system. This completes the Y initial selection. The X interrupt routine will now be described.

Figure 7A:
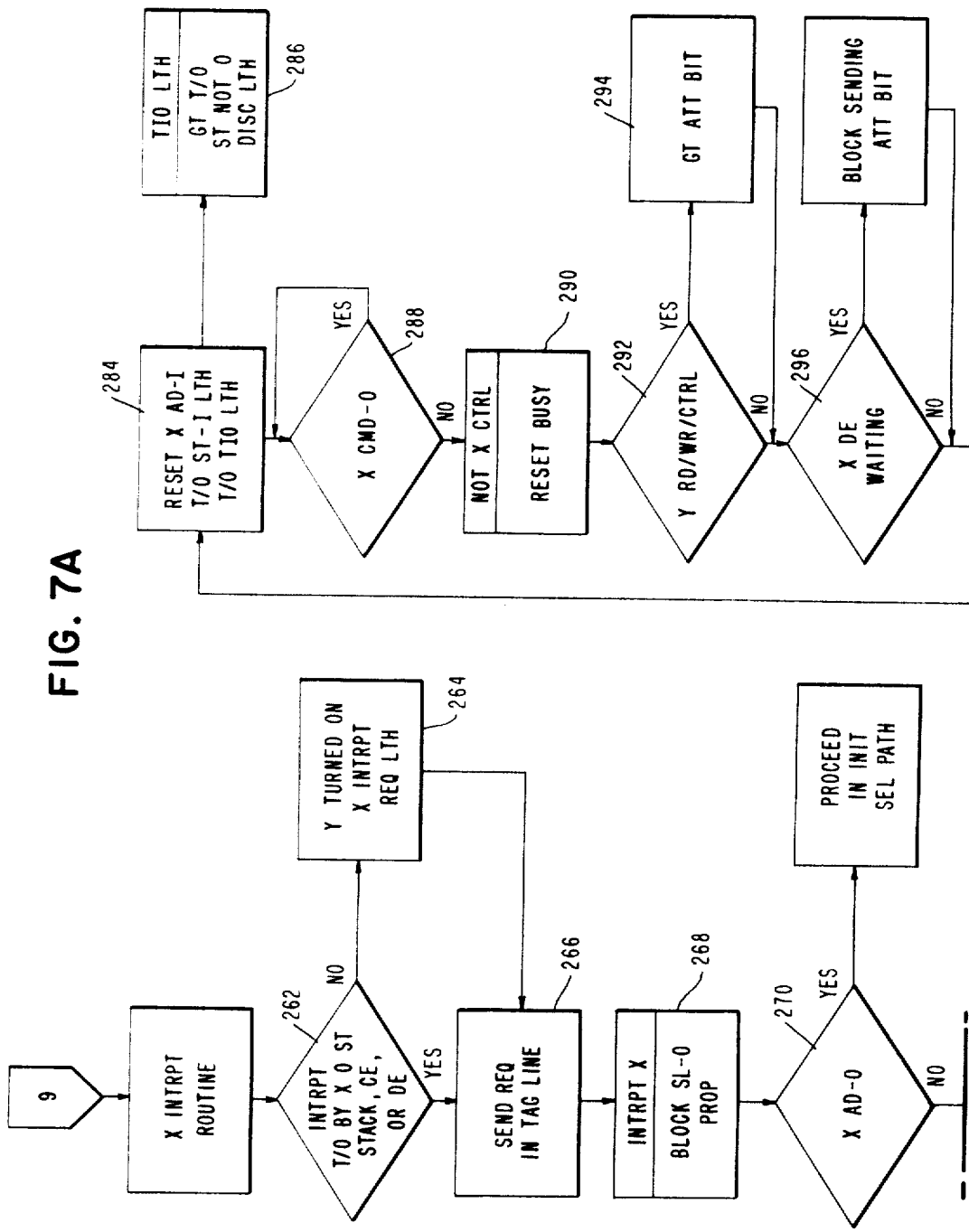

*Interrupt.*—Turning to FIG. 7A, the interrupt routine is given for the X system 30. (Manifestly the Y system interrupt routine is identical.) A decision 262 is NO since the interrupt was not turned on by channel end or device end indications. The NO condition results in a routine which initiates an operation 266 which raises the request in tag line. The interrupt latch being set causes the X select out to be blocked by an operation 268. The adapter next determines whether the address out line is active as decision 270. The activation of the address-out line would indicate that the X system was initiating a command. Since this is an interrupt request, the address out line is down and the decision 270 is NO.

Figure 7B:
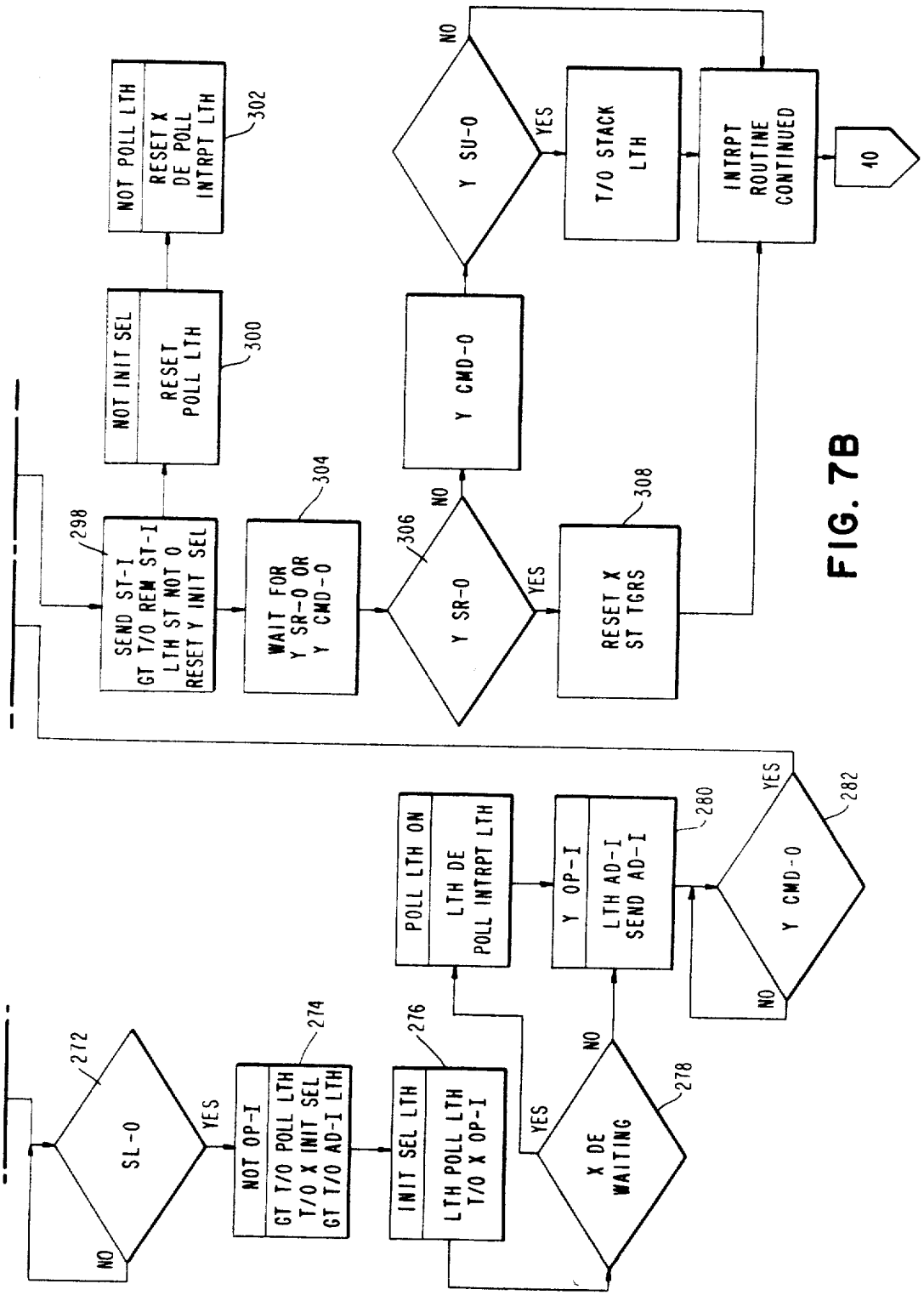
Figure 8B:
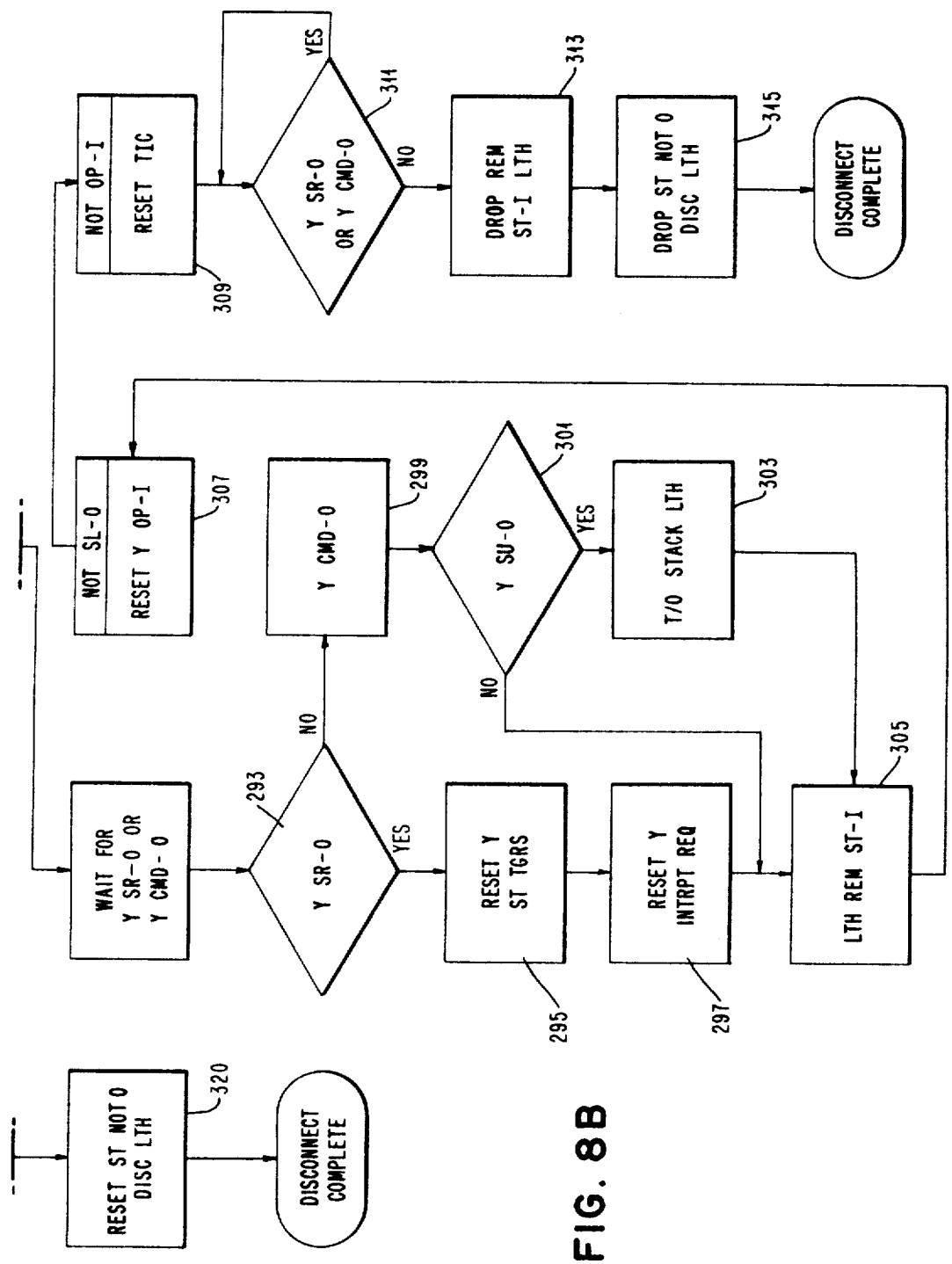

Turning to FIG. 7B, the adapter waits until select out is present. When decision 272 is YES, the X polling latch and the X address-in latch are gated; the X initial selection latch is turned on as operation 274. These events require the X operational-in line to be down. The initial selection being set initiates an operation 276 which latches the polling latch and turns on the operational-in line. The adapter next performs decision 278 which determines whether or not a device end condition exists for the X system. A NO condition results since it was assumed that the X side of the adapter was idle. The NO condition results in an operation 280 which places the address in on the bus in and sets the address-in latch. The adapter waits until the X system responds with command out to address in as decision 282.

Returning to FIG. 7A, the command out results in an operation 284 which resets the address in latch; turns on the status in latch. The test I-O latch is also turned on. With the test I-O latch turned on, the status zero disconnect is gated on as an operation 286. The adapter remains idle until the command out line falls as part of a decision 288. The busy latch is reset as operation 290, provided the not X control is present. A decision 292 indicates whether the Y system has a Y READ, WRITE or CONTROL command waiting. It will be recalled that Y READ has been ordered by the Y system. Accordingly, a YES condition results which gates the attention bit to the status registers as operation 294. The adapter performs a decision 296 which indicates whether or not a device end condition is waiting. Since no previous operation has been performed by the adapter, a NO condition results in operations 298, 300 and 302 occurring substantially within the same time interval.

The operation 298, shown in FIG. 7B, places the status on the bus in and gates the turn on remember status in latch. The status zero latch is set and the Y system initial selection latch is reset. The operation 300 resets the polling latch for the X system. The operation 302 resets the device end polling interrupt latch. The adapter, thereupon, waits until the X system accepts the status information with service out, as operation 304 and decision 306, respectively. When the service out appears, on operation 308 resets the X status triggers. The interrupt routine continues on FIG. 8A.

*X interrupt disconnect.*—Turning to FIG. 8A, the adapter commences to disconnect from the X system and wait for a WRITE command generated by the X system, which is the proper response to the READ command. An operation 310 latches the remember status in latch which is followed by an operation 312, and a decision 315. The decision examines the condition of the X device end polling interrupt latch. A YES condition indicates that an error condition exists in the adapter which the X system should handle. Accordingly, an operation 317 blocks reset of the X interrupt request trigger. However, in this case, the decision 315 is NO, since no error condition exists. The adapter proceeds to perform an operation 322 which resets the X interrupt trigger.

Turning to the operation 312, the X operational-in line is reset provided the note select out signal is present. When operational-in drops, an operation 314 resets the the test I-O latch which in fact was never set in this routine. The adapter (previously activated in decision 306, FIG. 7B) remains idle until the service out line drops. When the service out line drops, the adapter resets the X remember status in latch as operation 318 and follows this with an operation 320 which resets the status zero disconnect latch. The X side of the adapter is now completely disconnected from the X system.

The adapter remains connected to Y system, however, with an existing READ instruction and is being polled by the X system while a WRITE command is being prepared by the X system under program control. The next operation is a WRITE command issued by the X system to the adapter to match the READ command held therein. This match of READ and WRITE commands will permit data to be transferred between the X and Y systems.

*X initial selection.*—The initial selection routine will be described for the X system issuing a WRITE command to the adapter. The Y system flow charts will be used since as previously noted the X system charts are identical. Only the Y system charts have been included for reasons of brevity. It should be noted that in using the flow charts, all Y characters are replaced by X characters, and vice-versa. The X initial selection routine proceeds, as described for the Y system in conjunction with FIGS. 3A and 3B. As part of this routine, the decision 214 is YES since a Y READ (substitution for X READ) command does exist while the WRITE command is being fulfilled. Accordingly, the decision 214 is YES which results in the X busy latch being turned on. Turning to FIG. 3B, the initial selection routine, thereupon, continues, as previously described, through decision 218, operations 220, 222, 226, decision 224 and operation 226.

The routine continues on FIG. 4A where the decision 230 is YES. An operation 234 turns on the X write latch. The decisions 236 and 239 are NO. Operation continues on FIG. 5A which is the beginning of the data transfer routine.

*X-Y data transfer routine.*—Turning to FIG. 5A, a NO condition results from the decision 244 since a WRITE instruction is to be executed. The adapter performs a decision 247 to determine whether or not a busy condition exists therein. The busy latch was set as operation 216 (see FIG. 3A) which results in a YES condition. A decision 249 determines whether or not a device end condition exists on the X side of the adapter. The decision is NO as this is the first operation performed by the X system. A decision 251 is performed to insure that the instructions between the X and Y systems are matched. A mismatch would occur if a Control or Write command were latched in the Y system as the response to the WRITE instruction by the X system. If such a condition did exist, an operation 253 would be performed to force attention status to the X system which would be followed by a disconnect routine. A description will be given hereinafter of the disconnect routine.

Accordingly, the decision 251 is NO which results in the operation 241 resetting the busy latch. The adapter now proceeds to perform the Y READ X WRITE routine 243 shown in FIGS. 6A and 6B.

Figure 6A:
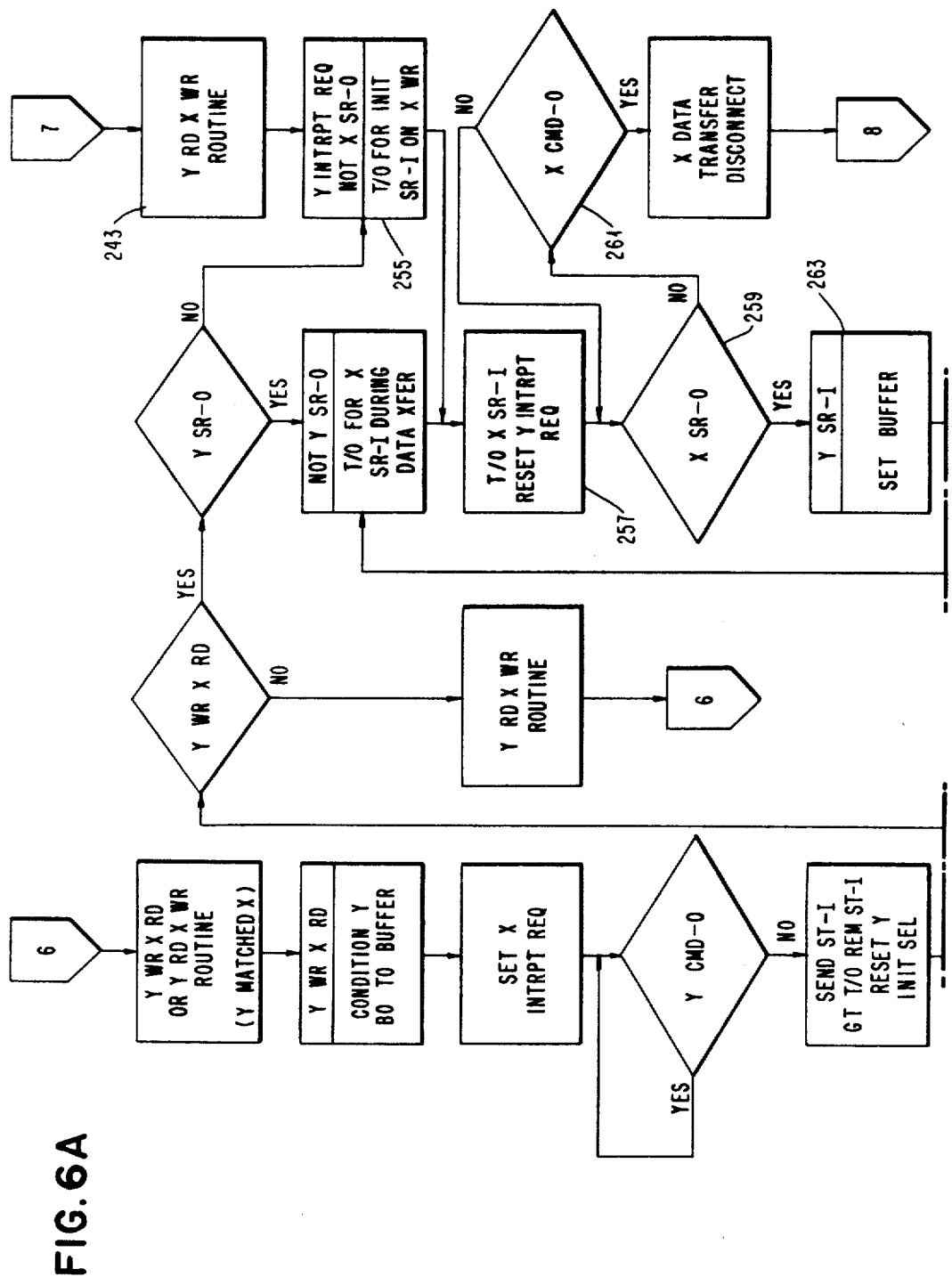

*Data transfer.*—Turning to FIG. 6A, the routine 243 begins with an operation 255 to initiate a service in request to the X or writing system. This operation is performed when the Y interrupt request signal is present and the absence of the service out signal for the X system. This operation is followed by an operation 257 which turns on the X service in request and resets the service in for the Y system. Additionally, the Y interrupt request is reset. The adapter executes a decision 259 which indicates when the X service out rises in response to the X service in. If a NO condition is indicated, a decision 261 is also performed. This decision determines whether or not a command out is present for the X system. A NO condition results in decision 259. A YES condition results in an X system disconnect, described hereinafter.

Figure 6B:
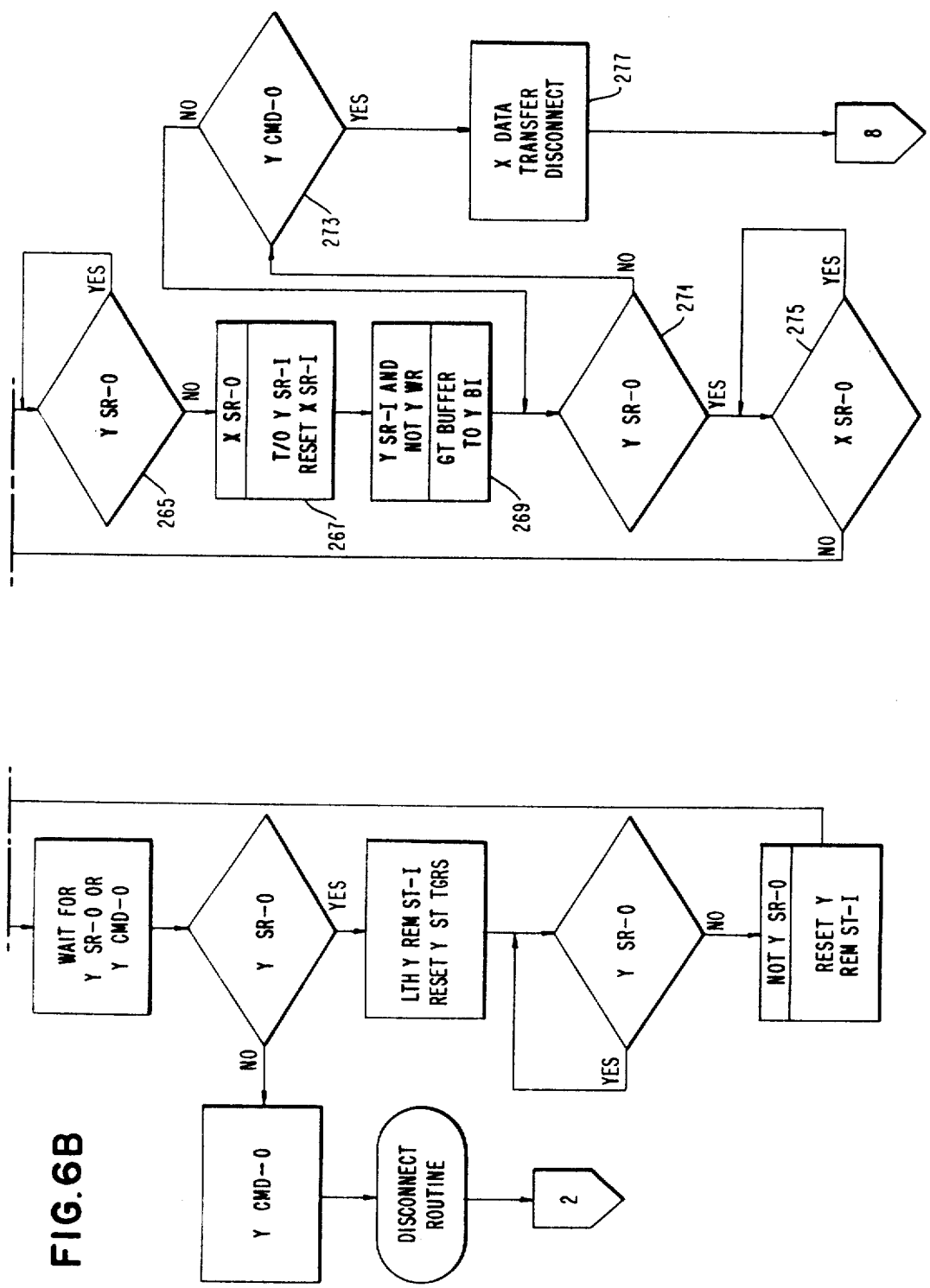

Turning to FIG. 6B, operation 263 gates the X system bus out to the buffer (see FIG. 2). Thereafter, a decision 265 is executed which indicates whether the Y service out is down. The Y service out drops in response to the reset of the Y service in completed in the operation 257. The NO condition initiates an operation 267 which turns on the Y service in and resets the X service in provided the X service out is present. The operation 267 is followed by an operation 269 which gates the buffer to the bus in of the Y or reading system. The Y service in and not WRITE signals must be present for this operation.

The adapter next performs a decision 271 which indicates when the Y system accepts the data on the Y bus in. A NO condition results in a decision 273 which tests for the presence of a command out signal from X system. A command out signal initiates a disconnect routine. A NO condition repeats the decision 271.

When the Y service out rises, the adapter performs a decision 273 which tests for the drop of the X service out. The drop of the X service completes the transfer of a byte of data from the X or Writing system to the Y or Reading system.

Data transfer between the X and Y systems continues on FIGS. 6A and 6B until a command out is received as part of decision 273 indicating the termination of the data transfer. Accordingly, the adapter commences to perform the data transfer disconnect routine. A summary of the data transfer routine is given in FIG. 4C. The decisions and operations are identified along the horizontal axis direction. The signals on X tags and Y tags for the various decision and operations are shown along the vertical axis.

*Data disconnect.*—Turning to FIG. 8A, an operation 279 is executed which turns on the Y system channel in and device in signals. Additionally, the status in latch is set. This event occurs when the Y system service in and command out signals are present. The operation 279 is accompanied by an operation 281 which turns on the X system channel in and device in signals and sets the status in latch for the same signal conditions. Hereafter, both the X and Y systems proceed to disconnect from the adapter. The disconnect routines are identical. Accordingly the decription will be limited to the Y system for reasons of brevity. The X and Y characters appearing in the routine 277 are correct as they appear.

The adapter remains idle until the X service out line drops in response to the fall of the X service in and the rise of the Y service in and service out. See FIGS. 2A and 2B. When the X service out drops the Y service in is reset as operation 283. This operation is performed when the not X service out and the Y command out signals are present, the latter being set as decision 273 (see FIG. 6B).

The adapter commences a disconnect routine where status is not zero (indicating an operation has been completed). A decision 285 tests for the command out line to drop. An operation 287 sends status in to the Y system, the status in latch being set as part of the operation 279. Simultaneously, the remember status in latch is turned on and the Y initial selection latch is turned off. An operation 289 turns on the Y status zero disconnect latch. This is followed by operation 291 which turns off the READ trigger. Continuing on FIG. 8B, the adapter waits for the X system service out as part of a decision 293 which accepts the status. A command signal requests the adapter to hold or stack the status for another time. If the decision 293 is YES, an operation 295 resets the Y status triggers. An operation 297 follows which resets the Y interrupt request. If the decision 293 is NO, a decision 301 tests for the appearance of the suppress out line. The suppress out 301 prevents the status from being sent to the Y system. Accordingly, a YES condition initiates an operation 303 which turns on the stack latch for later transmission to the Y system, the status being stacked in the adapter. The adapter is now ready to be chained to the next command of the Y system. A NO condition to the decision 301 results in the remember status in latch being set as operation 305. The adapter now proceeds to drop the remaining interface line. However, an interrupt request is still present in the adapter if the decision 293 is NO.

The Y operational in line is reset as operation 307, provided the not select out signal is present. The test I-O latch is reset as operation 309 after the operational in line drops. The test I-O latch was not set hence the operation is superfluous. A decision 311 determines when the service out or command out tag lines drop. An operation 313 is performed which drops the remember status in latch when the service out or command out line drops. The status zero disconnect latch is dropped as operation 315 which completes the disconnect of the Y system from the adapter. The X system disconnects in a like manner. This completes the Y READ-X WRITE routine. The adapter is capable of providing a sense, test I-O, control NO operation and busy routines. These routines are also shown in the flow charts but a description thereof will be omitted for reasons of brevity. It is believed, on the basis of the previous description, the particular step in each routine can be determined from the flow chart. For example, the sense routine starts in FIG. 3A. The control and NO operation routines start in FIGS. 4A and 4B. The test I-O routine starts in FIG. 4A. All of these routines are initiated after the initial selection routine which has been previously described.

*Circuit operation.*—Having provided a flow diagram description of one data transfer operation, it is now believed in order to provide a circuit diagram description of another operation.

*Sense.*—The sense operation has been selected as providing an adequate example of initial selection, data transfer and disconnect routines which are performed by all command routines, i.e., READ, WRITE, TEST I-O and NO operation. Although the sense operation is limited to one side of the adapter, it is readily understood that the other side of the adapter performs in an identical manner.

The latches employed in the circuit diagram comprise a set section or OPI (OR Power Invert) and a reset section or API (AND Power Invert). For latch operation, the set and reset signals, provided as inputs must be of opposite polarity to the indicated output signal. Thus, in FIG. 9A, the X TEST I-O latch requires a negative input signal to set and a positive signal to reset. Thus, if the −X BO-5 is present, AI 431 provides a positive output which does not set the X TEST I-O latch. However, if the −X BO-5 signal is not present, the polarity level is positive which generates a negative output from AI 431, provided, of course, the other inputs thereto are positive. The X TEST I-O latch is set. Details of the particular circuits and operation are given in a previously filed application Ser. No. 357,372, filed Apr. 6, 1964 and assigned to the same assignee as that of the present invention.

*X initial selection.*—Turning to FIG. 13, the adapter receives the address on the bus out lines 28d (P. O . . . 7), the address being provided by the X system under program control. The address out line 28b$^1$ is raised. The +Y OP-O (operational-out) is present by considering the circuitry in FIG. 23A. The −OP-O line is present, as the operational out line 58b$^6$ is down. Accordingly, the output from the receiver connected to the −Y OP-O line provides a +Y OP-O signal and through an inverter N a −Y OP-O. The +Y OP-O line is supplied as the input to the AND/INVERT (AI), 400 shown in FIG. 13, which provides an output to an inverter 400. The inverter provides a +SL-X (select X) output and a second output to an AI 404, shown in FIG. 13. The AI 404 is conditioned when the −X SL-O propagate line is inactive. (Stated another way, both inputs to the AND/INVERT 404 must be positive to obtain the desired negative output.) The −X SL-O propagate signal is supplied from the XSL-I (select in latch), shown in FIG. 9C. This latch is set off due to the +X SL-O (select out) signal. The +X SL-O is present, as shown in FIG. 15A, due to the −X SL-O signal. The absence of a selected out signal on the interface raises the −X SL-O signal. Returning to FIG. 13, it is apparent that the bus out and other signals have generated +SL-X and −SL-X signals which will activate the selection process.

Turning to FIG. 9D, the X INIT SEL (initial selection) latch is set with the presence of the −SL-X signal. Accordingly, a −X INIT SEL (initial selection) signal is provided as a first output and a +X INIT SEL signal is provided as a second output through an inverter N406.

The +X INIT SEL signal is provided as an input X ADR-I (address in) latch, shown in FIG. 9C. The +INIT SEL line deconditions the reset portion of the X ARD-I latch. The latch, however, is set by the −SL-X signal. No output is provided since API (AND Power-Invert) 408 is gated off by the −SL-X signal. The −X INIT SEL line is employed by the X command latches and the Y disconnect circuit which will be described hereinafter.

Figure 17C:
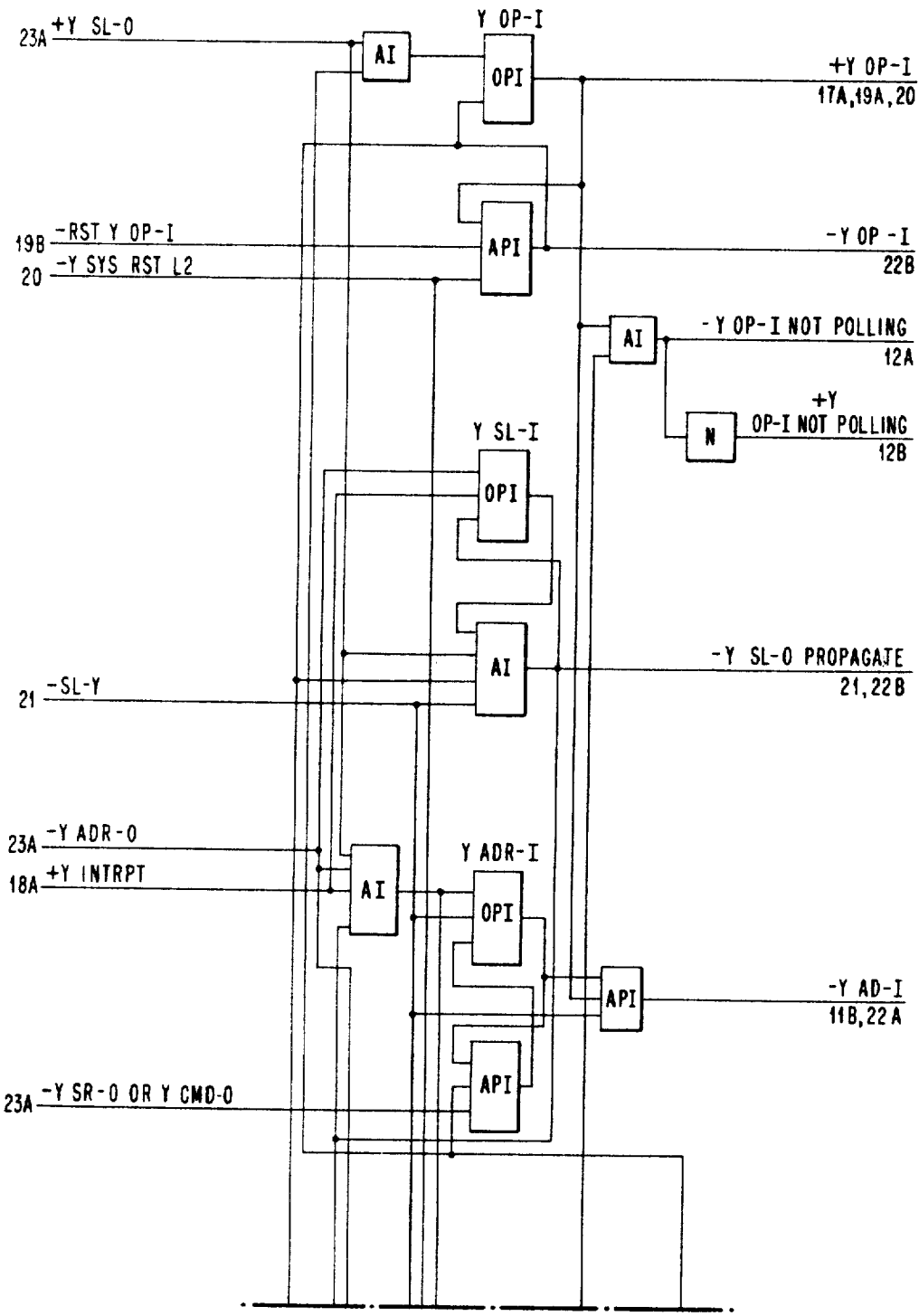
Figure 17D:
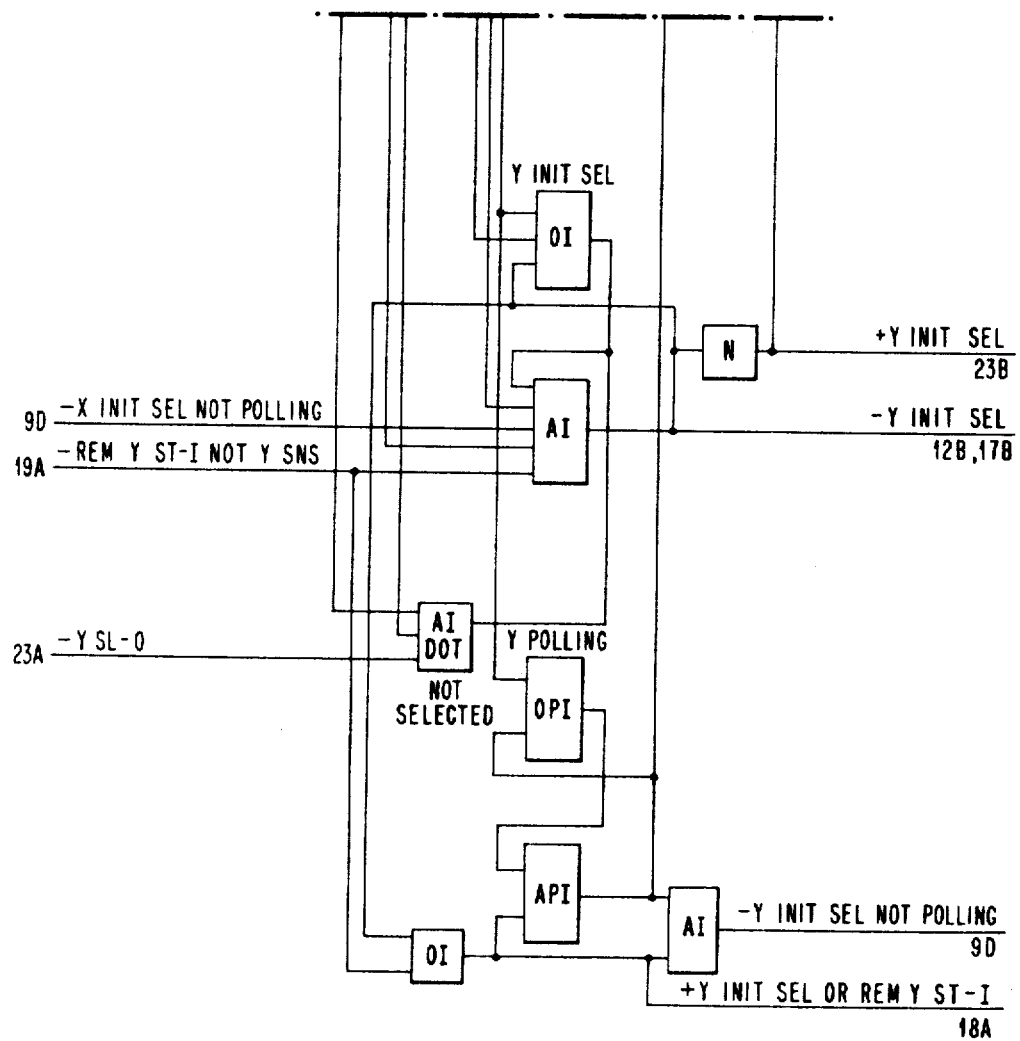

With the initial selection and address in latches being set, the adapter functions to decondition the Y initial selection latch. Turning to FIG. 17D, the Y INIT SEL (initial selection) latch is deconditioned as a result of the −X INIT SEL NOT POLLING (initial selection not polling) signal which is present. The signal is generated by the X polling latch shown in FIG. 9D. The X polling latch is deconditioned due to the +X INTRPT (interrupt) signal in FIG. 9C. The +X INTRPT signal deconditions AI 410 which provides the output to set the X polling latch. No interrupt condition exists. Hence, the +X INTRPT signal is not present. Returning to FIG. 9D, the initial selection latch provides an output which resets the polling latch. An output is provided as a first input to AI 414. The other input to the AI 414 is provided by OI (OR INVERT) 412 previously conditioned by the initial selection latch. The —X INIT SEL NOT POLLING signal deconditions the AI portion of the Y INIT SEL latch, as all positive inputs are required to obtain the negative output therefrom. The Y system, therefore, is deconditioned.

The adapter next determines whether or not the X busy latch is set. Turning to FIG. 10A, the busy latch is down due to the absence of the —YRD+WR+CTRL (Read or Write or Control). None of these signals is present as the Y system is idle. These signals prevent the AI 418 from being conditioned to set the busy latch. Accordingly, the adapter commences to set idle until the select out signal is received.

When the select out signal is received, the operational in latch is set. Turning to FIG. 9C, the X OP-I (operational-in) latch is set with the +X SL-O (select out) signal which conditions the AI 420 gate along with the +X INIT SEL line previously activated. The operational in latch provides a +X OP-I and —X OP-I signals. The +OP-I signal is employed by the command, status and disconnect circuits described hereinafter. The —X OP-I is employed by the bus in gating circuits.

The adapter next proceeds to place its address on the bus in. Turning to FIG. 14A, the —X ADR-I (see FIG. 9C) conditions the bus in drivers after the —SL-X signal falls. It will be recalled this —SL-X deconditioned the gate 408. The —SL-X signal falls when the —X ADR-O (address out) signal drops. Considering FIG. 13 momentarily, the fall of X ADR-O deconditions the AI 400 and N402 which turns off the —SL-X signal. The adapter now places the wired-in address on the bus in and raises the address in tag line $28a^1$. Previously the operational in tag line $28a^6$ had been raised.

The adapter now waits for the X system to supply a command out. When this occurs, the adapter turns off the address in latch and turns on the status in latch. Turning to FIG. 9C, the address in latch is reset when the —X CMD-O (command out) signal is present. Accordingly, the API included in the latch is deconditioned and the —X AD-I line falls. The status in latch is set as can be seen from FIG. 11A. The —X CMD-O signal sets the status in latch and also degates the AI 428 which activates the +GT ST TO XBI (gate status to X bus in) line. The adapter next proceeds to decode the command supplied from the X system.

Turning to FIG. 9A, the X SNS (Sense) latch is set as a result of AI 430 connected thereto being conditioned. This gate is conditiond by the presence of the +X BO-5 (bus out 5) signal which is the command code for a sense operation (see Table I). The +CMD-O initial SEL (command out initial select) line is also activated as will be seen from a consideration of FIG. 15A. An AND/OR/INVERT (AOI) 432 and Direct Coupled Inverter (DCI) 434 are activated as a result of the +X INIT SEL and +X CMD-O signals. The latter signal is the complement of the —X CMD-O which is inverted by a receiver 436. Accordingly, the sense latch is activated and provides +X SNS (Sense) and a —X SNS signals.

*Data transfer.*—The adapter is now conditioned to transfer data indicative of the adapter condition. The command out tag line falls after the address in falls. See FIGS. 2A and 2B. The fall of command out initiates the operation to block reset of the X initial selection latch. This latch, shown in FIG. 9D, is denied reset by the absence of the —X REM ST-I NOT X SNS (Remember Status-In NOT X Sense) signal. This signal is provided by the corresponding latch shown in FIG. 11A. The —X SNS signal which was provided by the sense latch (see FIG. 9A) blocks the AI 438 connected to the line. The REM X ST-I (Remember X Status-In) latch is set when the status in tag is gated out. The status in is gated out when the —X CMD-O signal falls. This may be seen by considering X ST-I (Status-In) latch wherein the AI 428 and API 440 connected to the +GT ST TO XBI (Gate Status to X Bus In) are activated when the —X CMD-O command signal falls. This signal, as will be recalled, drops when the address in tag drops. Accordingly, at this stage the adapter has supplied the signal to gate the status to the bus in and has also set the REM X ST-I latch but which has been degated due to the presence of the —X SNS signal. The X ST-I latch (see FIG. 11A) also raises the —X ST-I line along with the gating of the status to the X bus in. Status in is provided by the circuits shown in FIG. 14A.

Turning to FIG. 14A, the +GT ST TO X BI line conditions, the D (drivers) connected to bus in lines $28c^P$, $28c^0$ . . . $28c^7$. The gating of these lines also requires the presence of the +X STATUS PAR TO XBI (status parity to X bus in) line and the absence of any other status condition. The +X STATUS PAR TO XBI line is generated from OE (Exclusive-OR) circuits 442, 444, 446 and N (Inverter) 448 (see FIG. 10A). The Exclusive-OR circuits compare all of the status latches, shown in FIGS. 10A and 10B. The Exclusive-OR circuits provide odd parity when an even number of status latches are set. Since the adapter was idle when the routine commenced, none of the status latches is set. Accordingly, the odd parity signal is generated.

The bus in lines, returning to FIG. 14A, are all down except the parity line $28c^P$ which is up as a result of the A (AND) 450 being conditioned by the +X STAT PAR TO X BI and +GT ST TO XBI lines. The output from AI 450 activates OI 452 which turns on the driver connected thereto. The gates connected to the other drivers are deconditioned as a result of the absence of device end, channel end, busy and attention signals. The adapter at this point, now has provided the status on the bus in and has raised the status in tag line. The next operation is for the X system to accept the status by providing a service out signal.

The presence of the service out 409 raises the +X SR-O (service out) line which resets the —REM X ST-I latch, shown in FIG. 11A. No output is provided by the latch since the —X SNS sense signal is still present which deconditions the AI gate 438. An output, however, is provided on the +REM X ST-I LTH (Remember X Status-In Latch) and the —REM X ST-I AND X SRO (Remember X Status In and X Service Out) line. The latter line causes the status triggers, shown in FIGS. 10A and 10B, to be reset.

The presence of the —XSR-O line also deconditions the X ST-I latch, shown in FIG. 11A. Accordingly, the +GR ST TO X BI and the —X ST-I LTH lines fall. When the status in latch drops, the X SNS DISC (SENSE DISCONNECT) latch (see FIG. 12A) is set. An AI gate 464 is conditioned by the presence of the +SNS, +X REM ST-I LTH and —X ST-I signals. All of these signals are active in the adapter. The disconnect latch does not provide an output, however, due to the presence of the —X SR-O line which deconditions API portion of the latch. Accordingly, no output is provided on the —X SNS DISC line.

The service out tag falls in response to the fall of the status-in tag. See FIGS. 2A and 2B. The fall of service out causes the sense disconnect latch (see FIG. 12A) to be latched. Previously, the —X SR-O line had deconditioned the latch to prevent an output. The removal of —X SR-O signal permits an output to be provided on the —X SNS DISC line. The adapter now prepares to send the status of the Y system to the X system by reading any command previously supplied to the buffer.

As part of this operation, the adapter turns on the X SR-I (SERVICE IN) latch shown in FIG. 15B. The —X SNS DISC signal sets the X SR-I latch which provides +X SR-I LTH and a —X SR-I NOT Y SR-O (Service In Not Y Service Out) signals. Also, a —X SR-I signal is provided. The —X SR-I NOT Y SR-O line is connected to an AI 466 which is gated by the —Y SR-O signal. This signal is not present as the Y system is idle. Hence, the pair of positive inputs to the AI gate 466 results in output therefrom.

The —X SNS DISC line also turns on the X CH END (Channel End) and X DEV END (Device End) latches shown in FIG. 10B. These latches provide +X DEV END TO X BI (Device End to X Bus In) and +X CH END TO X BI (Channel End) and X DEV END (Device End) latches shown in FIG. 10B. These latches provide +X DEV END TO XBI (Device End to X Bus In) and +X CH END TO X BI (Channel End to X Bus In) signals. These signals are provided at this time so that they will be ready when the adapter commences a disconnect routine. The adapter inspects the Y command latches shown in FIGS. 17A and 17B, to determine the status Y system. Since the Y system is assumed to be idle, the adapter proceeds to forward the odd parity to the X bus in. This is realized by an API 468 being gated by a

—Y RD+WR+CTRL (Read or Write or Control) signal and —X SNS DISC Y CTRL (Sense Disconnect Y Control) signals which are absent and the presence of an X SNS DISC signal providing three positive inputs to the API 468 which generates a —FORCE PAR TO X BI SNS (Force Parity to X Bus In Sense). Turning to FIG. 14A, the —FORCE PAR TO XBI SNS signal turns on the driver connected to the bus in line 28c^P. All other drivers connected to the bus in lines are deconditioned due to the absence of +GT BUFFER TO X B I or +X STATUS PAR TO XBI signals. The +GT BUFFER TO XB I (see FIG. 11B) is doconditioned by the presence of the —FORCE PAR TO X BI SNS line, the negative input thereof being opposite to that required to turn on the gate. The +X STATUS PAR TO X BI (see FIG. 10A) is also absent as none of the status latches are set to operate the OE circuits 442 and 444.

The adapter having the sense information on the bus in raises the service in line 28a^4 shown in FIG. 14B. The —X SR-I line is activated by the —X SR-I NOT Y SR-O line, previously set. The adapter waits for the system to provide a service out signal. When the service out signal appears, the adapter prepares to initiate a disconnect routine.

Figure 18A:
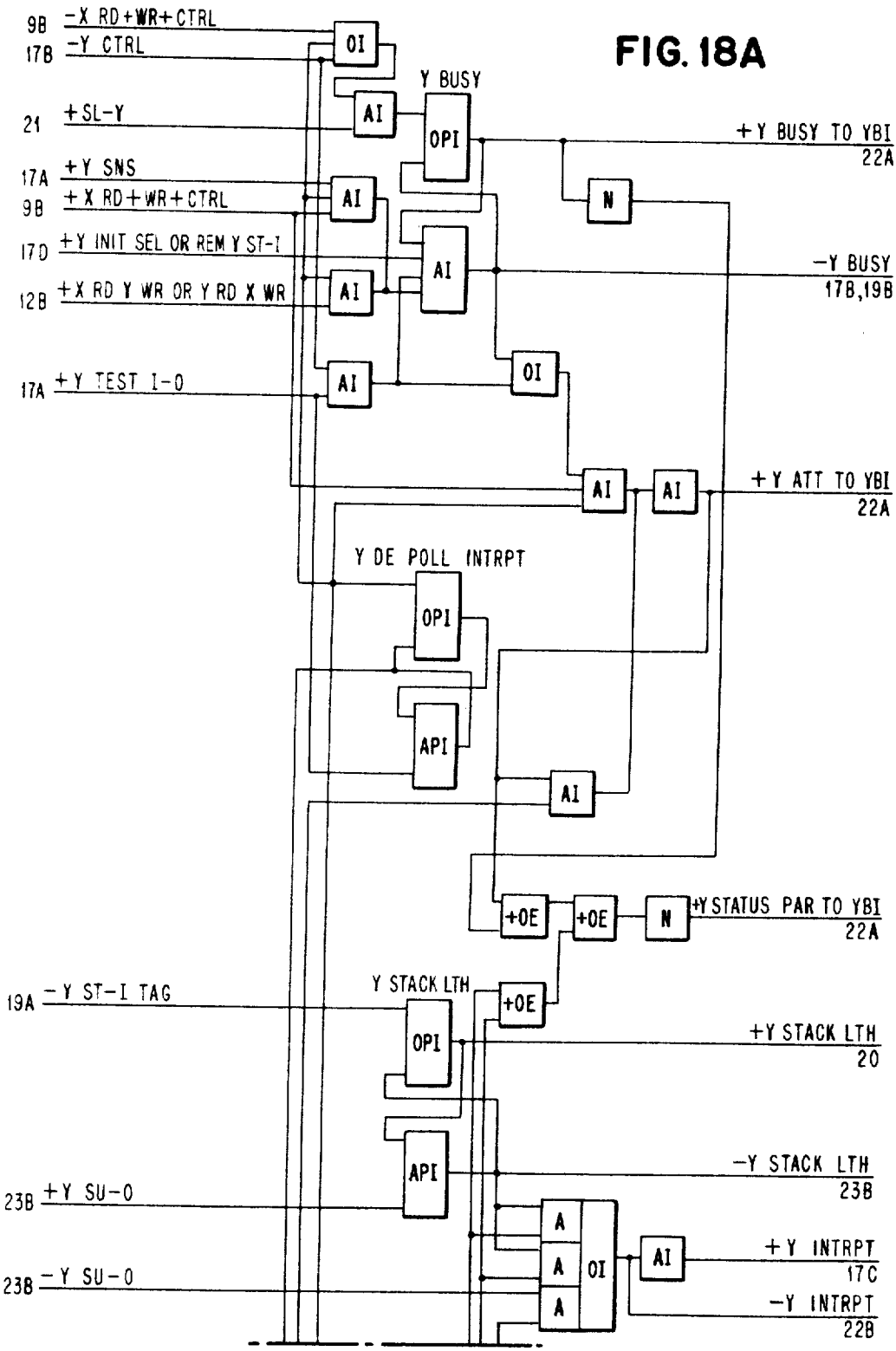
Figure 18B:
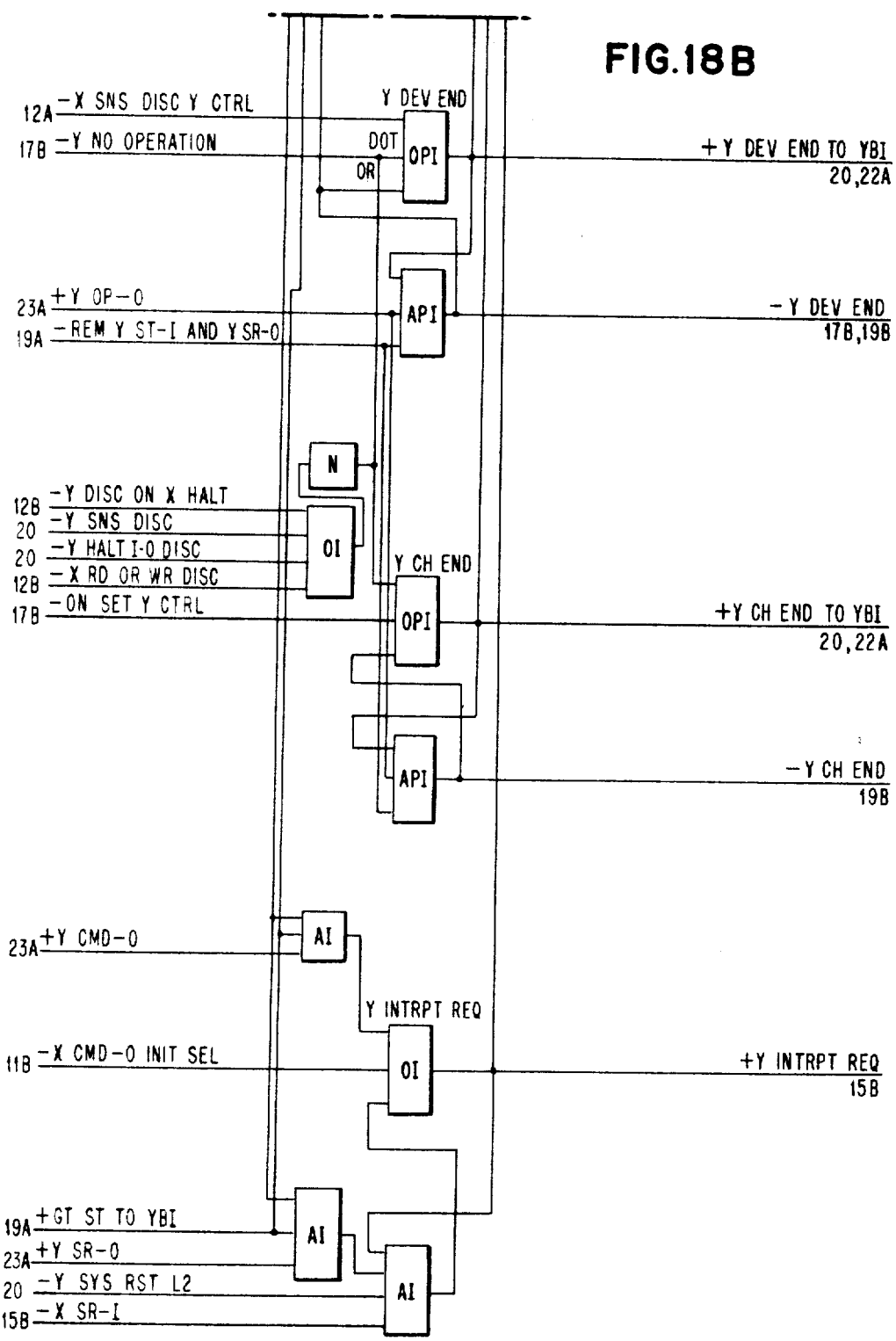
Figure 19B:
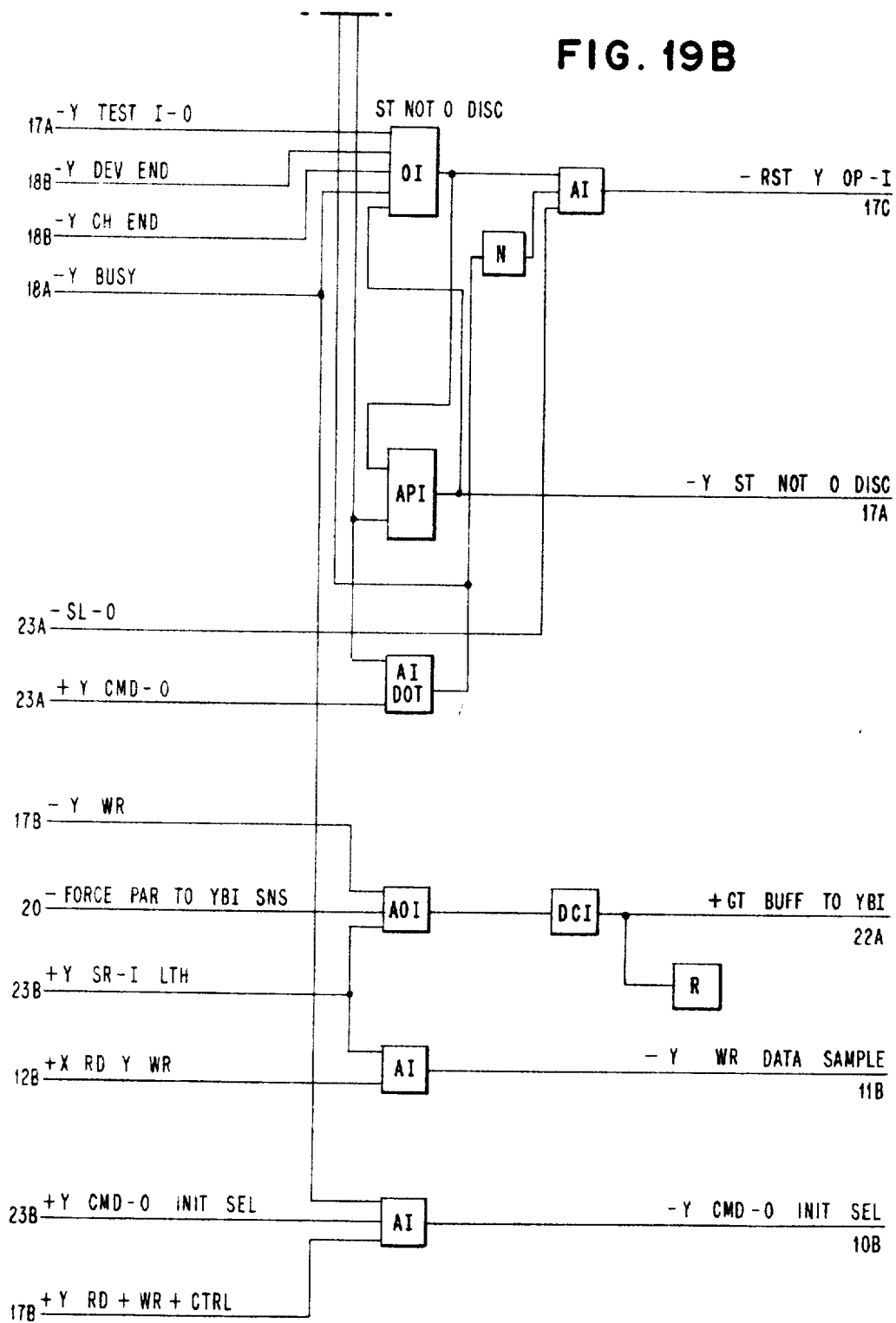
Figure 20:
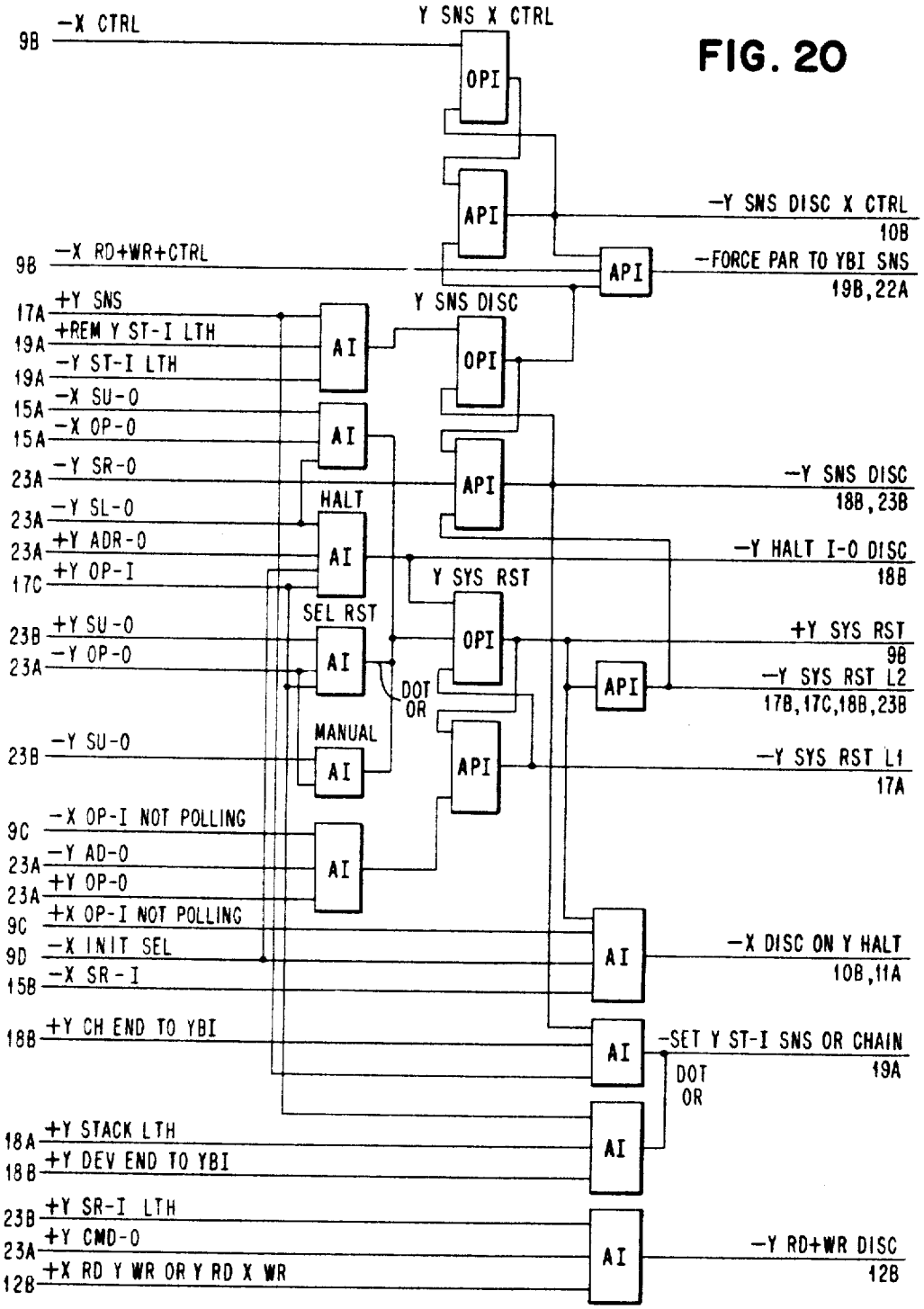

*Disconnect.*—As part of this routine, the X SNS DISC latch is turned off and the CTRL latch for the Y system is reset. The X SNS DISC latch, shown in FIG. 12A, is resent when —XSR-O signal is present. Accordingly, the —X SNS DISC signal terminates. The Y control latch, shown in FIG. 17B, is turned off by the —Y DEV END (Device End) signal. This signal is generated by the —Y DEV END latch, shown in FIG. 18B, which is conditioned by the —X SNS DISC Y CTRL (Sense Disconnect Y Control) signal. This signal is not present as the X SNS Y CTRL latch, shown in FIG. 12A, is not set. The absence of the —Y CTRL signal causes this action. (It will be recalled that the Y system was assumed to be in an idle condition and not performing a command when the sense routine was initiated.)

Figure 12B:
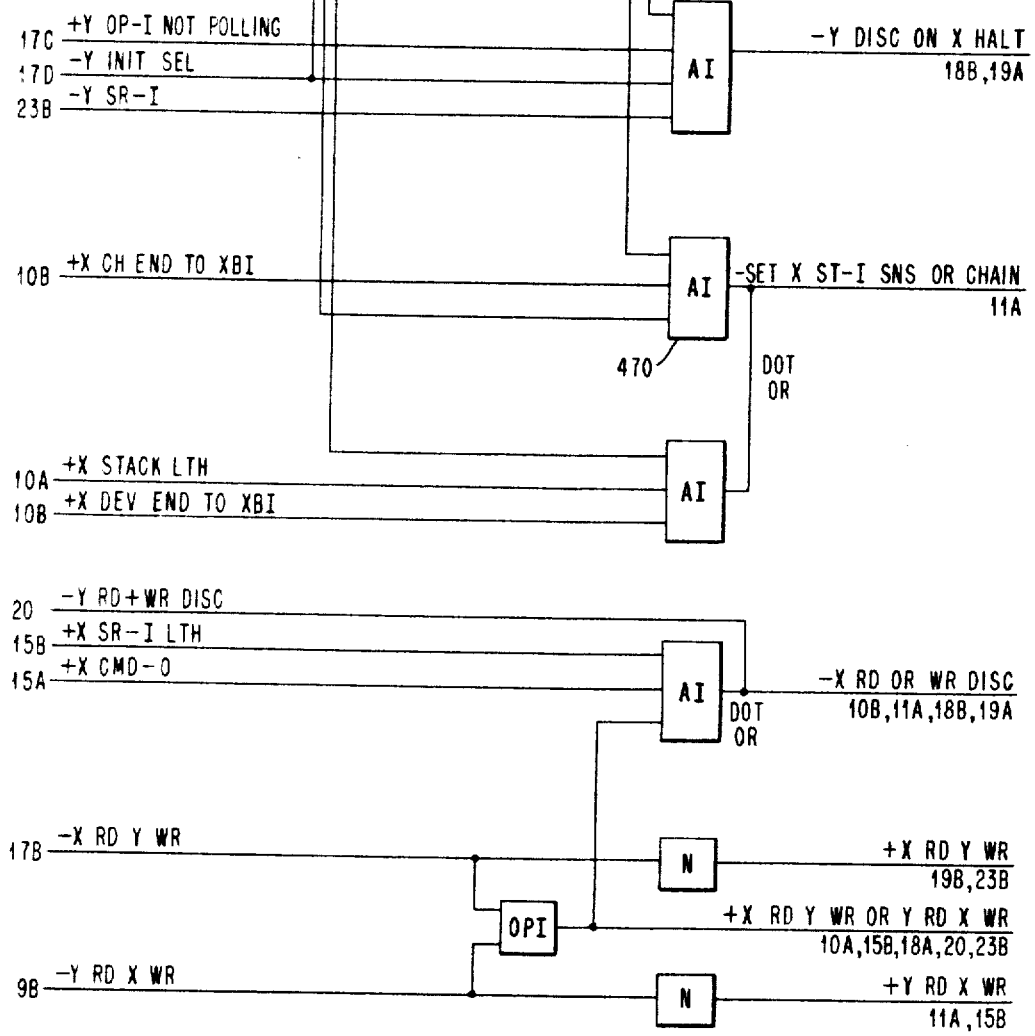

Continuing with the disconnect routine, the X ST-I latch, in FIG. 11A, is turned on. The —SET X ST-I SNS OR CHAIN (Set X Status In or Chain) provided by AI 470 shown in FIG. 12B, is gated on by the +X SNS, and —X SNS DISC (see FIG. 12A) and the +X CH END TO X B I (Channel End to X Bus In) lines. All of these signals are present and the —SET X STI SNS OR CHAIN line is activated. Accordingly, the X ST-I latch, in FIG. 11A, is turned on. The presence of the X SR-O signal, however, deconditions the X ST-I latch. No output is provided on the +GT ST TO XBI and the —X ST-I LTH line. The adapter now remains idle until the service out line falls in response to service in falling which will now be described.

The X SR-I latch, shown in FIG. 15B, is reset by the absence of the —Y SU-O NOT Y STACK LTH (Suppress Out Not Y Stack Latch) and —Y SR-O signals. Both of these signals are absent due to the Y system being idle. However, the presence of the —X SR-O signal (shown in FIG. 15A) provides a positive input to the AI 472 and 474, the outputs therefrom deconditioning the set section of the X SR-I latch. Accordingly, the set input to the reset section is negative which causes the X SR-I latch to be deconditioned which removes the —X SR-I and +X SR-I LTH signals. The —X SR-I NOT Y SR-O line is also deconditioned due to the +X SR-I LTH line being negative.

Continuing the disconnect routine, the service out line drops after service in drops which permits the X ST-I latch, shown in FIG. 11A, to be set. The X ST-I latch gates the status to bus in and also raises the status in tag line. Turning to FIG. 14A, the +GT ST TO X BI and the +STATUS PAR TO XBI gate the A 450, 478 and 480 which turns on the drivers connected to the bus in lines 28c^P, 28c^4 and 28c^5. The +X STATUS PAR TO XBI signal is generated by the Exclusive-OR circuits 442, 444 and 446, previously described in connection with FIG. 10A. The +X CH END TO XB I and +X DEV END TO X BI signals were previously generated in connection with device end and channel end latches (shown in FIG. 10B), which were set by the —X SNS DISC signal provided by the X SNS DISC latch, shown in FIG. 12A.

The adapter continues the disconnect routine by gating turn on of the REM X ST-I latch and turn off of the X INIT SEL latch. The REM X ST-I latch, shown in FIG. 11A, is turned on by the presence of the +GT ST TO X BI signal, which appears when the X ST-I latch is set. The absence of the —X SR-O signal conditions the X ST-I latch so that no output is provided at this time.

The INIT SEL latch, shown in FIG. 9D, is turned off by the signal on the −X REM ST-I NOT X SNS line. This signal is provided by the ST NOT 0 DISC (STATUS NOT 0 DISCONNECT) latch, shown in FIG. 11A, in conjunction with the REM X ST-I latch. The ST NOT 0 latch is set by the −X DEV END or −X CH END signals which are present. The conditioning of the REM X STI-I latch allows the ST NOT 0 DISC latch to be set which provides a −ST NOT 0 DISC signal. This is provided as an input to the X SNS latch, shown in FIG. 9A. The signal resets X SNS latch which discontinues the −X SNS signal which in turn conditions the AI 480, shown in FIG. 11A, connected to the −REM X ST-I NOT X SNS line. Accordingly, the INIT SEL latch is turned off by the presence of this signal. The adapter now has the initial selection latch turned off and the status not zero disconnect latch turned on. Additionally, the sense trigger, shown in FIG. 9A, has been turned off. The adapter proceeds to wait for service out to accept the status provided by the adapter.

The X system responds to the status in line with the service out signal. (See FIGS. 2A and 2B.) The appearance of the +X SR-O signal resets the X ST-I latch, shown in FIG. 11A. The +X SR-O signal also causes the REM X ST-I latch to be reset which provides the −REM X ST-I and X SR-O signal. This signal causes the status triggers, shown in FIGS. 10A and 10B, to be reset. The DEV END and CH END latches, shown in FIG. 10B, receive the −REM X ST-I and X SR-O signals and become reset. Hence, the +X DEV END TO X B I and +X CH END TO X B I signals are terminated. The ST NOT 0 DISC latch, shown in FIG. 11A, is reset by the REM X ST-I latch A −RST X OP-I (Reset X Operational In) signal is provided.

Turning to FIG. 9C, the X OP-I latch is reset by the −RST X OP-I signal. The X system responds to the fall of operational in by dropping service out. When this occurs, the adapter proceeds to drop the REM ST-I latch shown in FIG. 11A. The +X SR-O signal becomes minus which causes the REM X ST-I latch to be reset. The reset of the latch also causes the ST NOT 0 DISC latch to be reset. At this point, all lines are down between the X system and the adapter. Additionally, all command and status latches have been reset. The adapter is idle and commences to poll by the setting of X SL-I latch, shown in FIG. 9C. The presence of a select out signal passes through the latch and appears as −X SL-O PROPAGATE signal, which is accepted by the succeeding control unit for processing in a similar manner to that described for the adapter.

While the invention has been particularly shown or described with reference to preferred embodiments thereof, it will be understood by those skilled in the art that the various changes in form and details may be made therein without departing from the spirit and scope of the invention.

What is claimed is:

1. A terminal having a particular address assigned thereto, comprising:
   a first interface control connected to a first signal source,
   a second interface control connected to a second signal source,
   a buffer register connected between the interface controls,
   each signal source adapted to provide discrete signals indicative of various commands and discrete address signals,
   means responsive to one of said commands to set the mode of operation for the terminal according to said command,
   means responsive to a discrete address signal provided by one of said signal sources for matching said particular terminal address to said discrete address signal as a condition to initiation of operation of the terminal,
   and means for operating said first and second interface controls and said buffer register to transfer information between a signal source and the terminal or both signal sources.

2. A terminal having a particular address assigned thereto, comprising:
   a first interface control connected to a first signal source,
   a second interface control connected to a second signal source,
   a buffer register connected between the interface controls,
   each signal source adapted to provide discrete signals indicative of various commands and discrete address signals,
   address matching means responsive to a discrete address signal provided by one of said signal sources for matching said discrete address signal and said particular assigned terminal address,
   command matching means for matching commands, one command from each of said signal sources,
   and means conditioned by said address matching means and said command matching means for operating the interface controls and the buffer register to transfer information between a signal source and the terminal or both signal sources.

3. A terminal comprising:
   a first interface control connected to a first signal source,
   a second interface control connected to a second signal source,
   a buffer register connected between the interface controls,
   each signal source adapted to provide discrete signals indicative of a plurality of commands,
   means responsive to one of said commands received from said first signal source to initiate operation of the terminal,
   means for generating an interrupt signal over said second interface to obtain an appropriate response command signal from said second signal source and for providing to said second signal source status information regarding the terminal,
   and means responsive to the commands received from said first and second signal sources for operating the interface controls and the buffer register to transfer information between a signal source and the terminal or both signal sources.

4. An asynchronous terminal comprising:
   a first interface control connected to a first signal source,
   a second interface control connected to a second signal source,
   a buffer register connected between the interface controls,
   each signal source adapted to provide statements and response signals,
   means for generating response signals in reply to statement signals provided by a signal source and generating statement signals according to the operating condition of the terminal,
   and means for operating the interface controls and buffer to transfer information between a signal source and the terminal or both signal sources on an interlocked basis whereby a statement or response provided to the terminal requires a corresponding response or statement before data transfer can occur.

5. A synchronous terminal defined in claim 4 further including means for stacking status information in the terminal.

6. A terminal comprising:
a first interface connected to a first signal source,
a first interface control connected to the first interface and including tag and controls in, tag and controls out, a bus in and a bus out,
a second interface connected to a second signal source,
a second interface control connected to the second interface and including tag and controls in, tag and controls out, a bus in and a bus out,
a buffer connected between the bus in and bus out of the first and second interface controls,
command latches responsive to the interfaces for decoding command signals supplied by each signal source,
service controls, connected to the interface controls, for effecting the transfer of data between the terminal and a signal source or both signal sources,
status latches responsive to the terminal operating status for supplying the information regarding the terminal status to the interfaces,
initial selection circuits for decoding signals supplied by a signal source and controlling the connection of the terminal to the interfaces,
and status and disconnect controls operating the interface when status information is to be transmitted and terminating operation of the terminal.

7. A multiplex terminal for permitting the transfer of data between first and second data processors having first and second interfaces respectively, said first interface providing common data paths and controls for a first plurality of inputs/output terminals attachable thereto;
said second interface providing common data paths and controls for a second plurality of input/output terminals attachable thereto;
said input/output terminals selectable by the data processor corresponding to the respective interface, comprising:
first interface controls connected to said first interface,
second interface controls connected to said second interface,
a buffer register connected between the first and second interface controls, and
means for operating said interface controls and said buffer register to transfer information between said multiplex terminal and one of said data processors or between said first and second interfaces.

8. A multiplex terminal comprising:
first interface controls connected to a first interface,
said first interface connected to one or more signal sources and one or more terminals,
second interface controls connected to a second interface,
said second interface connected to one or more second signal sources and one or more terminals,
first means for selecting among the terminal units connected to the first interface for service,
second means for selecting among the terminal units connected to the second interface for service,
each signal source adapted to provide commands, addresses and data to the interface,
said multiplex terminal adapted to provide status information as to its operational state, intelligence conveying data and an address to the interface,
means connected to the interface controls for transferring data between signal sources or between the terminal and a signal source,
and means responsive to signals supplied by a signal source over an interface to operate the terminal according to a mode of operation selected by the signal source.

9. A multiprocessing system comprising:
a first information handling system,
a second information handling system,
a first interface connected to said first information handling system,
a second interface connected to the second information handling system,
and a terminal unit connected to the first and second interfaces, said terminal unit comprising means for transmitting data between the information handling systems on an interlocked basis,
means for providing to either information handling system status information indicative of the operating condition of the terminal,
and means responsive to command signals supplied by one information handling system to initiate corresponding commands from the other information handling system.

10. A multiprocessing system comprising:
a first information handling system,
a second information handling system,
a first interface connected to the first information handling system and to a plurality of terminal units,
a second interface connected to the second information handling system and to a plurality of terminal units,
a multiplex terminal connected to the first and second interfaces,
means for priority selecting among the terminal units and multiplex terminal connected to the interfaces,
said multiplex terminal comprising means responsive to signals supplied by an information handling system to initiate corresponding signals to the other information handling system,
means for matching the signals supplied by an information handling system and the response from the other information handling system before permitting further operation of the terminal,
means for providing status information to an information handling system indicative of the operating condition of the multiplex terminal,
and means for storing said status information in the terminal when an information handling system is unable to accept said status information.

References Cited

UNITED STATES PATENTS

| | | | |
|---|---|---|---|
| 3,251,040 | 5/1966 | Burkholder et al. | 340—172.5 |
| 3,263,219 | 7/1966 | Brun et al. | 340—172.5 |
| 3,303,474 | 2/1967 | Moore et al. | 340—172.5 |
| 3,323,109 | 5/1967 | Hecht et al. | 340—172.5 |
| 3,061,192 | 10/1962 | Terzian | 235—157 |
| 3,283,308 | 11/1966 | Klein et al. | 340—172.5 |

ROBERT C. BAILEY, *Primary Examiner.*

J. P. VANDENBURG, *Assistant Examiner.*